US007439951B2

(12) United States Patent
Rosenberg et al.

(10) Patent No.: US 7,439,951 B2
(45) Date of Patent: *Oct. 21, 2008

(54) POWER MANAGEMENT FOR INTERFACE DEVICES APPLYING FORCES

(75) Inventors: Louis B. Rosenberg, Pleasanton, CA (US); Adam C. Braun, Sunnyvale, CA (US); Bruce M. Schena, Menlo Park, CA (US)

(73) Assignee: Immersion Corporation, San Jose, CA (US)

(*) Notice: Subject to any disclaimer, the term of this patent is extended or adjusted under 35 U.S.C. 154(b) by 1 day.

This patent is subject to a terminal disclaimer.

(21) Appl. No.: 11/109,238

(22) Filed: Apr. 18, 2005

(65) Prior Publication Data

US 2005/0195168 A1 Sep. 8, 2005

Related U.S. Application Data

(60) Continuation of application No. 10/079,379, filed on Feb. 19, 2002, now Pat. No. 7,038,657, which is a continuation of application No. 09/258,749, filed on Feb. 26, 1999, now Pat. No. 6,348,911, which is a continuation of application No. 08/825,726, filed on Apr. 2, 1997, now Pat. No. 5,929,607, which is a division of application No. 08/623,660, filed on Mar. 28, 1996, now Pat. No. 5,691,898, which is a continuation-in-part of application No. 08/534,791, filed on Sep. 27, 1995, now Pat. No. 5,739,811, and a continuation-in-part of application No. 08/566,282, filed on Dec. 1, 1995, now Pat. No. 5,734,373.

(51) Int. Cl.
*G09G 5/00* (2006.01)

(52) U.S. Cl. .................... 345/156; 345/161; 715/701

(58) Field of Classification Search ............. 345/156, 345/157, 160, 161, 166; 74/471 XY; 715/701, 715/702

See application file for complete search history.

(56) References Cited

U.S. PATENT DOCUMENTS 3,903,614 A 9/1975 Diamond et al.
(Continued)

FOREIGN PATENT DOCUMENTS

EP 0626634 11/1994
WO WO 95/20788 A1 8/1995

OTHER PUBLICATIONS

Adelstein, Bernard D., "A Virtual Environment System for the Study of Human Arm Tremor," Mechanical Engineering, Jun. 1989, pp. 1-252.

(Continued)

*Primary Examiner*—Sumati Lefkowitz
*Assistant Examiner*—William L Boddie
(74) *Attorney, Agent, or Firm*—Thelen LLP; David B. Ritchie

(57) ABSTRACT

A method and apparatus for providing safe and low-cost force feedback peripherals for consumer applications. A device microprocessor local to an interface device is coupled to the host by a first interface bus. The microprocessor receives host commands from the host computer on the first interface bus, such as an RS-232 interface, and commands an actuator to apply a force to a user object, such as a joystick, in response to host commands. A sensor detects positions of the user object and output signals to the host on a second interface bus, such as a PC game port bus, separate from the first bus. In a "recoil" embodiment, a user initiates force feedback by pressing a button on the joystick, which sends an activation signal to the actuator. In other recoil embodiments, the host computer can transmit one or more enable signals and/or activation signals to the actuator to enable or command forces. A safety switch of the present invention disables the actuator when the interface device is not in use and enables the actuator when an amount of weight over a predetermined amount is placed on the joystick created by a user grasping the joystick a circuit of the present invention includes a capacitor for storing power provided by an input signal and supplied to the actuator when forces are to be output.

26 Claims, 17 Drawing Sheets

U.S. PATENT DOCUMENTS

| | | | |
|---|---|---|---|
| 3,919,691 | A | 11/1975 | Noll |
| 4,236,325 | A | 12/1980 | Hall et al. |
| 4,477,043 | A | 10/1984 | Repperger |
| 4,708,656 | A | 11/1987 | de Vries et al. |
| 4,771,344 | A | 9/1988 | Fallacaro et al. |
| 4,811,921 | A * | 3/1989 | Whitaker et al. ............ 244/234 |
| 4,935,728 | A | 6/1990 | Kley |
| 4,961,038 | A | 10/1990 | MacMinn |
| 4,988,981 | A * | 1/1991 | Zimmerman et al. ........ 345/158 |
| 5,103,404 | A | 4/1992 | McIntosh |
| 5,185,561 | A * | 2/1993 | Good et al. ................. 318/432 |
| 5,186,629 | A | 2/1993 | Rohen |
| 5,186,695 | A | 2/1993 | Mangseth et al. |
| 5,195,179 | A | 3/1993 | Tokunaga |
| 5,264,836 | A | 11/1993 | Rubin |
| 5,298,890 | A | 3/1994 | Kanamaru et al. |
| 5,298,918 | A | 3/1994 | Yen-Chen et al. |
| 5,374,942 | A | 12/1994 | Gilligan et al. |
| 5,389,849 | A | 2/1995 | Asano et al. |
| 5,438,529 | A | 8/1995 | Rosenberg et al. |
| 5,451,924 | A | 9/1995 | Massimino et al. |
| 5,456,341 | A | 10/1995 | Garnjost et al. |
| 5,459,382 | A | 10/1995 | Jacobus et al. |
| 5,461,711 | A | 10/1995 | Wang et al. |
| 5,466,213 | A | 11/1995 | Hogan et al. |
| 5,471,571 | A | 11/1995 | Smith et al. |
| 5,742,278 | A * | 4/1998 | Chen et al. .................. 345/156 |
| 6,004,134 | A * | 12/1999 | Marcus et al. ................ 434/45 |
| 6,422,941 | B1 * | 7/2002 | Thorner et al. ................ 463/30 |

OTHER PUBLICATIONS

Baigre, Stephen A., "Electric Control Loading - A Low Cost, High Performance Alternative," Proceeding of the 12th Interservice/Industry Training Systems Conference, Orlando, Florida, Nov. 1990, pp. 247-254.

Bergamasco, Massimo, "Haptic Interfaces: The Study of Force and Tactile Feedback Systems," Proceedings of the 4th IEEE International Workshop on Robot and Human Communication, Tokyo Japan, 1995, pp. 15-20.

Brooks Jr., Frederick P. et al., "Project GROPE: Haptic Displays for Scientific Visualization," Computer Graphics, vol. 24, No. 4, Aug. 1990, pp. 177-185.

Gotow, Jon K. et al., "Controlled Impedance Test Apparatus for Studying Human Interpretation of Kinesthetic Feedback," Proceedings of the 1989 American Control Conference, Pittsburgh, PA, Jun. 21-23, 1989, pp. 332-337.

Hildreth, Bruce L. et al., "DC Servo-Motors for High Performance, High Reliability Control Loading in Flight Simulators," American Defense Preparedness Association 12th Interservice/Industry Training System Conference, Nov. 6-8, 1990, pp. 255-262.

Iwata, Hiroo, "Artifical Reality with Force-Feedback: Development of Desktop Virtual Space with Compact Master Manipulator," Computer Graphics, vol. 24, No. 4, Aug. 1990, pp. 165-170.

Kelley, A.J. et al., "On the Development of a Force-Feedback Mouse and its Integration into a Graphical User Interface," In: Proceedings ASME Winter Annual Meeting, vol. 55, Dynamic Systems and Control, 1994, pp. 287-294.

Lemkin, M. et al. "Velocity Estimation From Widely Spaced Encoder Pulses," Proceedings of the American Control Conference, Seattle, WA, Jun. 1995, pp. 998-1002.

Minsky, Margaret et al., "Feeling and Seeing: Issues in Force Display," Symposium on Interactive 3D Graphics, Snowbird, UT, 1990, pp. 235-242, 270.

Rinaldi, P., "Digital Control Loading--A Modular Approach," International Air Transport Association, 6th Meeting of the Flight Simulator Technical Sub-Committe, Montreal, Jun. 1-4, 1982, pp. 1-12.

Stanley, Michael C. et al., "Computer Simulation of Interacting Dynamic Mechanical Systems Using Distributed Memnory Parallel Processors," DSC-vol. 42, Advances in Robotics, ASME, 1992, pp. 55-61.

Su, S. Augustine et al., "The Virtual Panel Architecture: A 3D Gesture Framework," 1993 IEEE Virtual Reality Annual International Symposium, Seattle, WA, Sep. 18-22, 1993, pp. 387-393.

* cited by examiner

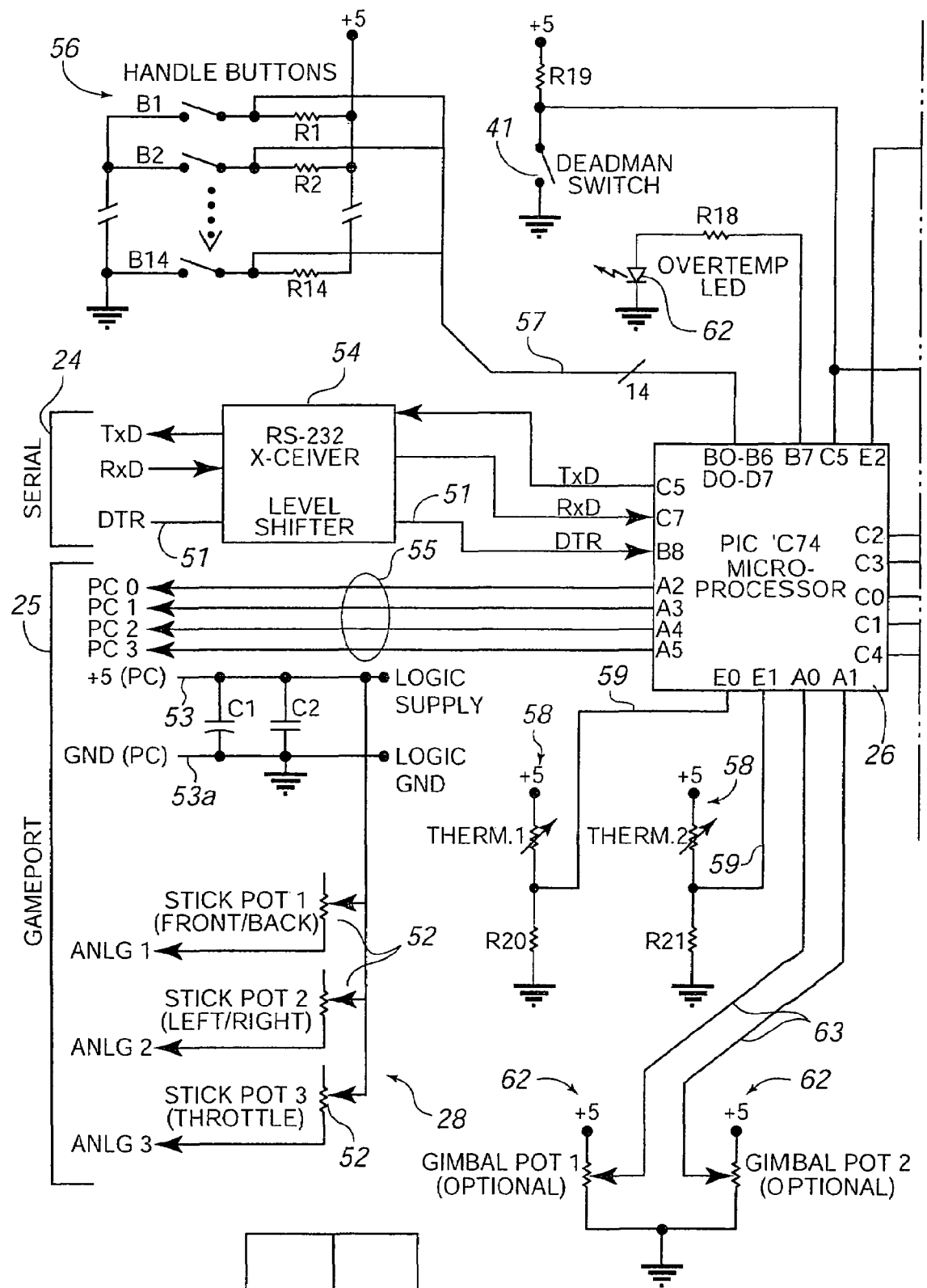

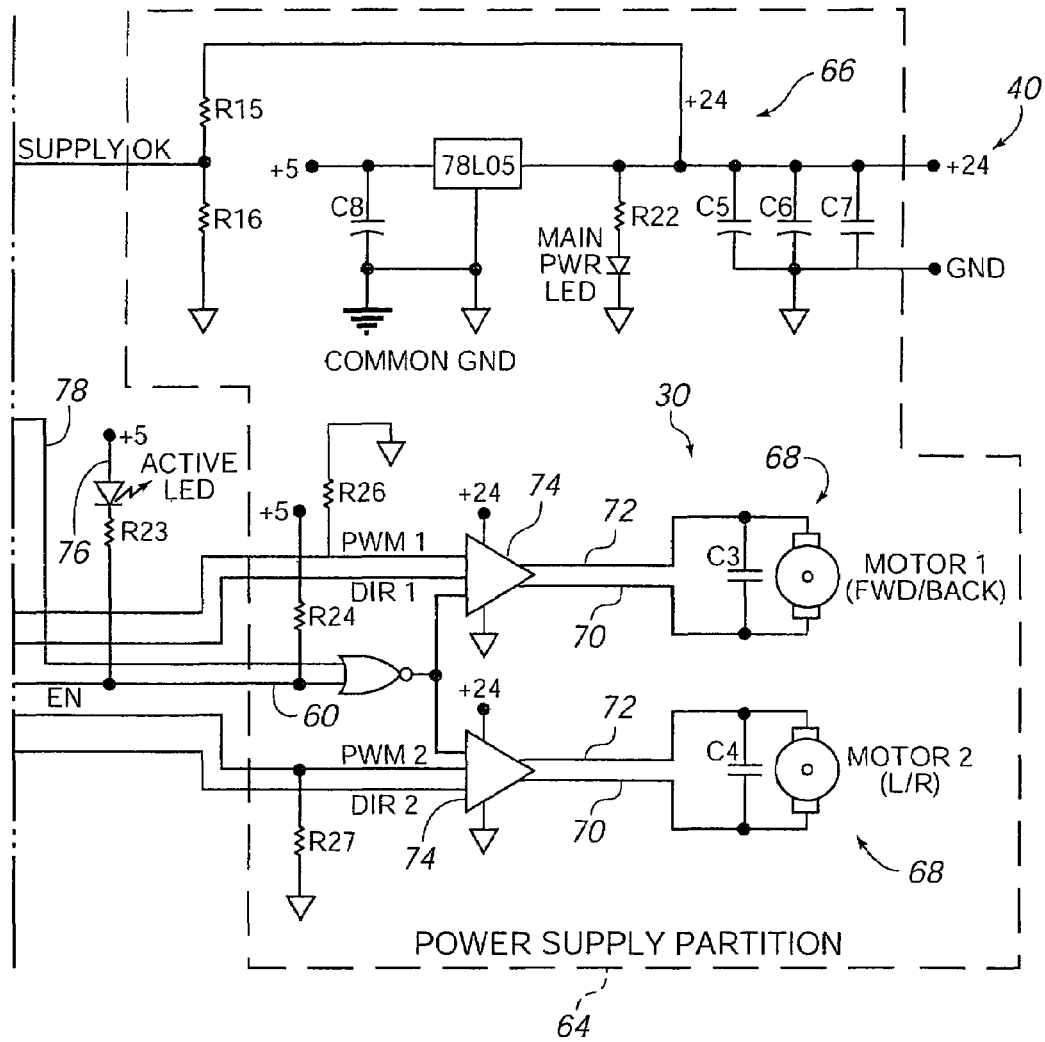
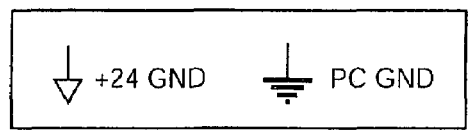
Fig.3B

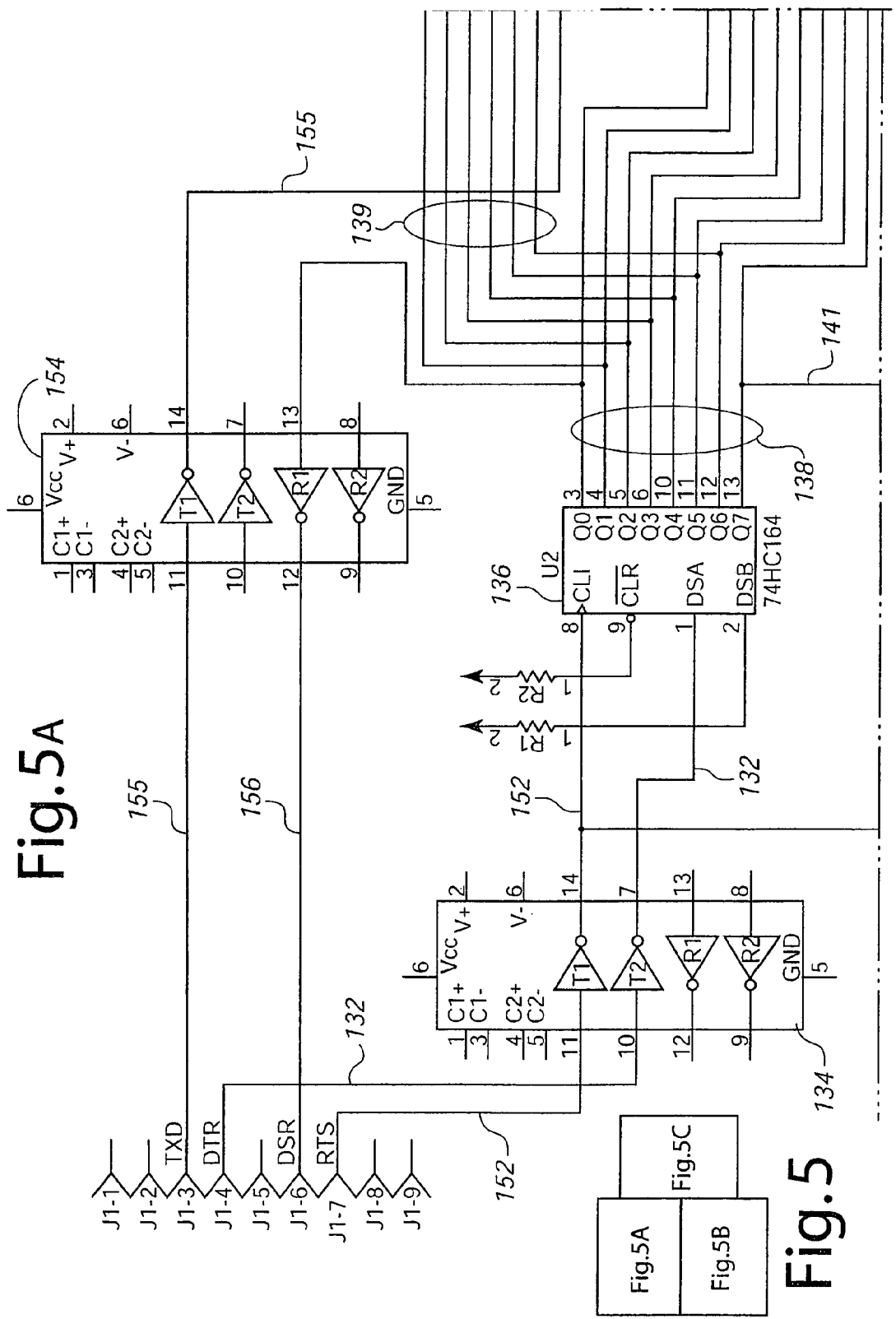

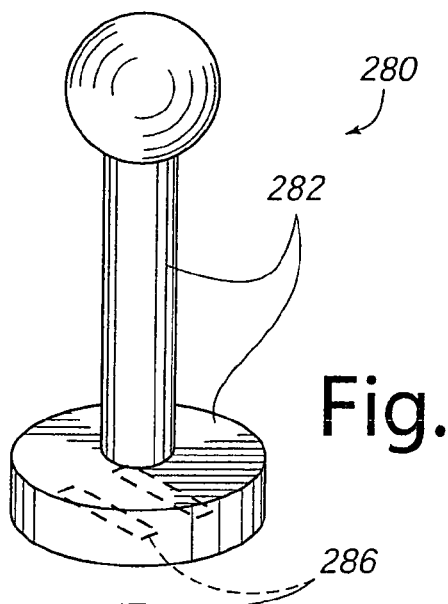
Fig.11
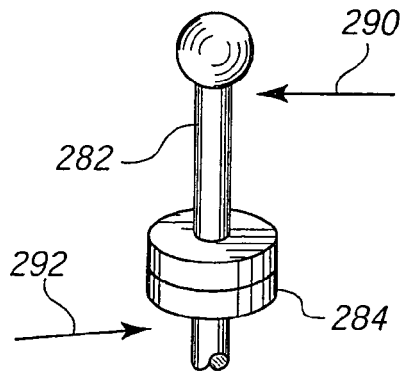
Fig.11a
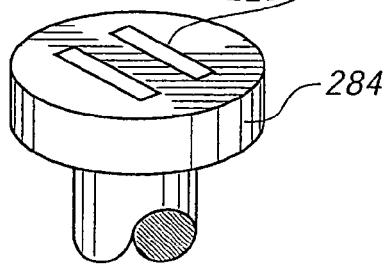
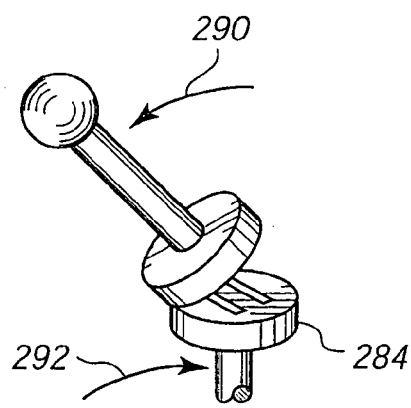
Fig.11b
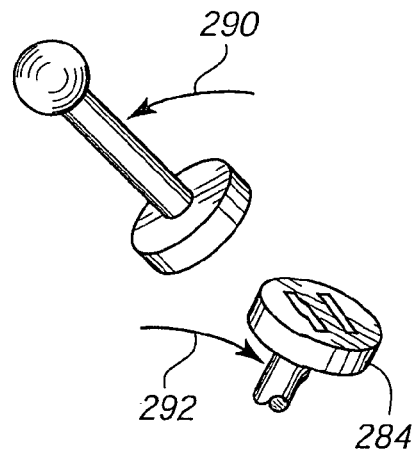
Fig.11c
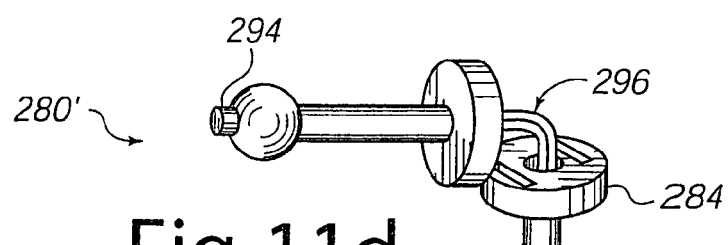
Fig.11d

POWER MANAGEMENT FOR INTERFACE DEVICES APPLYING FORCES

This application is a continuation of U.S. application Ser. No. 10/079,379, filed Feb. 19, 2002 now U.S. Pat. No. 7,038,657, which is a continuation of U.S. application Ser. No. 09/258,749, now U.S. Pat. No. 6,348,911, filed Feb. 26, 1999, which is a continuation of U.S. application Ser. No. 08/825,726, now U.S. Pat. No. 5,929,607, filed on Apr. 2, 1997, which is a divisional application of U.S. application Ser. No. 08/623,660, now U.S. Pat. No. 5,691,898, filed on Mar. 28, 1996, which is a continuation-in-part of U.S. application Ser. No. 08/534,791, now U.S. Pat. No. 5,739,811, filed Sep. 27, 1995 and U.S. application Ser. No. 08/566,282, now U.S. Pat. No. 5,734,373, filed Dec. 1, 1995, all assigned to the assignee of this present application, and all of which are hereby incorporated by reference herein.

BACKGROUND OF THE INVENTION

The present invention relates generally to interface devices between humans and computers, and more particularly to computer interface devices that provide force feedback to the user.

Computer systems are used extensively in many different industries to implement computer controlled simulations, games, and other application programs. More particularly, these types of games and simulations are very popular with the mass market of home consumers. A computer system typically displays a visual environment to a user on a display screen or other visual output device. Users can interact with the displayed environment to play a game, experience a simulation or "virtual reality" environment, or otherwise influence events or images depicted on the screen. Such user interaction can be implemented through the use of a human-computer interface device, such as a joystick, "joypad" button controller, mouse, trackball, stylus and tablet, foot or hand pedals, or the like, that is connected to the computer system controlling the displayed environment. The computer updates the game or simulation in response to the user's manipulation of a moved object such as a joystick handle or mouse, and provides feedback to the user utilizing the display screen and, typically, audio speakers.

In some interface devices, haptic (e.g., tactile) feedback is also provided to the user, more generally known as "force feedback." These types of interface devices can provide physical sensations to the user manipulating the physical object of the interface device. Typically, motors or other actuators are coupled to the interface object and are connected to the controlling computer system. The computer system receives sensor signals from the interface device and sends appropriate force feedback control signals to the actuators of the interface device in conjunction with simulation/game events. The actuators then provide forces on the interface object. The computer system can thus convey physical sensations to the user in conjunction with other visual and auditory feedback as the user is grasping or contacting the object of the interface device. Force feedback interface devices can provide a whole new modality for human-computer interaction.

Force feedback input/output (I/O) devices of the prior art have concentrated on providing maximum haptic fidelity, i.e., the realism of the haptic feedback was desired to be optimized. This is because most of the force feedback devices have been targeted at the specific needs of highly industrial or scientific applications, and not a mass consumer market. To attain such realism, design concerns useful the mass market such as low size and weight, low complexity, programming compatibility, low cost, and safety have been sacrificed in the prior art. As a result, typical force feedback interface devices include complex robotic mechanisms which require precise, bulky, and expensive components that have significant power requirements and are difficult to program for applications.

In addition, the prior art force feedback devices typically use a host computer to close a control loop around the system to generate sensations and maintain safety and stability through direct host control. FIG. 1 illustrates a block diagram of a control system 2 having a typical host controlled loop. A user manipulated object 3, such as a joystick or similar object, is moved by a user to interface with a host computer 4 with a display device 5. Sensors 6 detect the position of the user object in provided degrees of freedom and may also include buttons or other controls that detect user actions such as the press of a button. The sensor data including positional and button data is sent to host computer 4 over a bi-directional communication bus 7 that is typically connected to an interface card plugged into the host computer. To complete the control loop, host computer 4 sends force commands over bus 7 to actuators 8, and the actuators output forces on the object 3 to the user. The functions of reading sensor data and outputting force values to actuators 7 can be a burden on the host processor which detracts from the performance of the host in other host tasks and application execution.

An important concern for a force feedback interface device is communication bandwidth between the controlling computer and the interface device. To provide realistic force feedback, the complex devices of the prior art typically use high speed communication electronics that allow the controlling computer to quickly send and update force feedback signals to the interface device. The more quickly the controlling computer can send and receive signals to and from the interface device, the more accurately and realistically the desired forces can be applied on the interface object. In addition, using a high bandwidth communication interface, force feedback can be accurately coordinated with other supplied feedback, such as images on the video screen, and with user inputs such as movement of the object, activated buttons, etc.

A problem is evident when prior art force feedback interface devices are provided to the mass consumer market. Most home computers have a built-in standard serial communication interfaces, such as an RS-232 interface, RS-422 interface, "game port", Universal Serial Bus interface, or Ethernet interface that may conveniently be used to connect peripherals like a force feedback interface device to the host computer. In addition, manufacturers prefer to provide peripheral devices that use these serial interfaces, since no additional hardware, such as interface cards, needs to be provided with such peripherals. The manufacturing cost of the peripheral device can thus be significantly reduced. However, these standard serial communication interfaces are typically quite slow (i.e. have low bandwidth) compared to other communication interfaces. Realistic and accurate force feedback thus becomes difficult to provide by a controlling computer system to a prior art interface device connected through such a serial interface in comparison with other interfaces such as a direct interface card (e.g., ISA or PCI card) connecting to the data bus of the host computer.

Another important concern in the mass market industry is the issue of user safety. Because a force feedback device can impart physical forces upon the user, the potential for injury must be carefully addressed. To provide a safety measure for the user, the force feedback devices of the prior art typically include a safety or "deadman" switch which the user must activate to allow forces to be applied to the user manipulable object. If the user does not close the switch, no forces can be output. The safety switches of the prior art are typically a button or a pedal which the user must continually press or hold down to allow power to be received by the actuators. However, such safety switches can be cumbersome and/or tiring for the user to close, since the user must constantly maintain a particular grip or position to feel forces. In addition, these types of safety switches are easy to defeat by users; for example, an elastic band can be wrapped around a safety button to keep the button depressed, which defeats the entire safety purpose of the safety switch.

Finally, mass market force feedback interface devices must necessarily be low cost devices that are simple to manufacture so that the device is competitively priced in the high volume, aggressive home computer and home video game markets.

SUMMARY OF THE INVENTION

The present invention is directed to implementations of a human/computer interface device for controlling and providing force feedback to a user. Several implementations are provided to decrease the cost in manufacturing an interface device and making the device safe for the high volume consumer market of computer and video game users.

More particularly, one embodiment of an interface apparatus and method of the present invention for interfacing motion of a user manipulable object with a host computer includes a user object, such as a joystick, physically contacted by a user and having at least one degree of freedom of movement. A device microprocessor local to the interface apparatus and separate from the host computer is coupled to the host by a first interface buses. The microprocessor receives host commands from the host computer on the first interface bus. An actuator applies a force along said degree of freedom to the user object in response to microprocessor force commands produced by the device microprocessor. A sensor for detecting a position of the user object along the degree of freedom and outputs sensor signals. The sensor signals are received by the host computer on a second interface bus separate from the first interface bus. The host computer updates a host application process, such as a simulation or video game, in response to the sensor signals.

Preferably, the first interface bus is an RS-232 interface bus or similar serial standard. The second interface bus is preferably a standard game port interface bus coupled to a game port of the host computer or the equivalent. Force feedback commands are sent by the host over the serial interface bus, and the sensor signals are received by the host in the traditional way via the game port. The interface device can thus be used as a standard joystick without force feedback by utilizing only the game port interface in communication with the host computer, and allows backward compatibility for non-force-feedback functionality via standard game port drivers.

In some embodiments, the device microprocessor receives the sensor signals to compute force values to output to the actuators. A second sensor can be used to detect the position of the joystick independently of the host sensor and output sensor signals to the microprocessor. The local microprocessor receives high-level host commands and can implement independent force routines that receive sensor signals and compute forces. The force routines can be stored in memory local to the interface apparatus. Preferably, a button device is coupled to the interface apparatus that provides a button input signal to the microprocessor when the user presses the button. The microprocessor provides the button input signal to the host computer over the game port interface bus. In addition, the microprocessor preferably deactivates the actuator when at least one of the multiple interface buses is disconnected from the host computer or disconnected from the interface apparatus.

In a different "recoil" embodiment of the interface apparatus, the interface device includes an actuator that applies a force on the user object. A user-selectable control, such as a button provided on the joystick, sends an activation signal to the actuator when the user activates the button and thereby instructs the actuator to apply the force on said user object in a reflex process independent of the host computer. This force, for example, can be a recoil or jolt that is output whenever the user selects the button. In one embodiment, the actuator applies the force on the joystick only when the user activates the button. In a different embodiment, the host computer is coupled to the actuator by a second interface and transmits an enable signal to the joystick. The actuator applies the force only when the user activates the button and when the enable signal is provided. In a yet another embodiment, the host computer may additionally send a simple activation signal to the actuator to command the actuator to apply the force to the user object regardless of whether the button is pressed by the user. The host can control the actuator using only a very small amount of information, and can use a parallel interface or a serial port used as a parallel interface. A user enable switch on said interface device can, when selected or deselected by the user, enable or disable the recoil reflex process.

In a different, more complex "recoil" embodiment, the host computer can send a greater amount of control signals and/or other information to the actuators than in other recoil embodiments of the interface device by providing the control signals serially. One or more shift registers covert the serial data to parallel information that is provided to programmable logic. The logic sends the control signals, such as enable and activation signals, to the actuator and other components as necessary. A sensor outputs sensor signals to the host computer via a second interface bus as described above.

A force feedback interface device of the present invention for safe use by a user includes a sensor for sensing a joystick's position and an actuator for applying a force to the joystick. A safety switch is coupled to the joystick for disabling the actuator when the user is not using the interface device. One safety switch of the present invention enables the actuator when an amount of weight over a predetermined amount is placed on the joystick, such as the amount of weight created by a user grasping the joystick. The joystick includes a handle portion translatably coupled to a base portion. The safety switch includes a contact on the handle portion and a contact on the base portion such that when the predetermined amount of weight is applied to the joystick, the contacts engage to allow electrical current to flow. A spring member forces the portions apart from each other when less than the predetermined amount of weight is applied to the joystick. A different touch plate safety switch feature similarly allows the actuators to be powered only when the user is touching the provided touch plates. A separate break-away joystick safety feature can also be included which comprises a safety break handle that breaks off from the interface apparatus when a force over a predetermined threshold is applied to the joystick. The safety break-away handle can be attached to the interface apparatus, for example, by magnets.

A circuit of the present invention for storing power in a force feedback interface device that interfaces a user with a host computer system includes a capacitor for storing power provided by a signal input to the circuit. A sensing device coupled to the capacitor senses when the capacitor is fully charged by monitoring the input signal to determine when the capacitor is fully charged. A control device provides a control signal to a driver and actuator so that the actuator can apply force to a user object of the interface device. The stored power from the capacitor is supplied to the actuator when applying the force. A current limiter limits the current of the input signal and provides the limited current to the capacitor. The input voltage signal can be received from a game port interface bus coupled to the host computer system or from a power supply included in the interface device.

The interface apparatus of the present invention includes several low cost components that are suitable for providing accurate force feedback for the high volume home consumer market and similar markets. The use of the parallel combination of a serial bus and a game port bus, coupled to two ports of the host computer system, allows one bus to be used to send signals to the host and the other bus to receive force commands from the host, thus providing a very low cost system having realistic force feedback. The local device microprocessor processes commands independently of the host computer, thus saving significant processing time on the host computer. Other low cost embodiments require no or minimal force commands from the host, allowing simple force feedback to be provided to users. The power circuit of the present invention allows smaller power supplies to be used or eliminates the need for a power supply.

The safety features of the present invention herein also are important when supplying force feedback devices to the home consumer market. The hand-weighted safety switch allows a user to conveniently operate the interface device and provides necessary safety shut-down features. The communication line safety feature allows the actuators to be deactivated in the event of a disconnection between interface device and host computer. These improvements allow a computer system to provide accurate and realistic force feedback in a safe, low-cost low bandwidth communication interface and is thus ideal for the mass market of computer and game systems.

These and other advantages of the present invention will become apparent to those skilled in the art upon a reading of the following specification of the invention and a study of the several figures of the drawing.

BRIEF DESCRIPTION OF THE DRAWINGS

FIG. 3 is a schematic diagram of a low-cost embodiment of the force feedback interface device of FIG. 2;

FIG. 9a is a perspective view of an example of a joystick including the touch plate safety switch of FIG. 9;

FIG. 11 is a diagrammatic illustration of a break away joystick safety feature of the present invention; and FIGS. 11a-11d are diagrammatic illustrations of the operation of the joystick of FIG. 9.

DETAILED DESCRIPTION OF PREFERRED EMBODIMENTS

Figure 2:
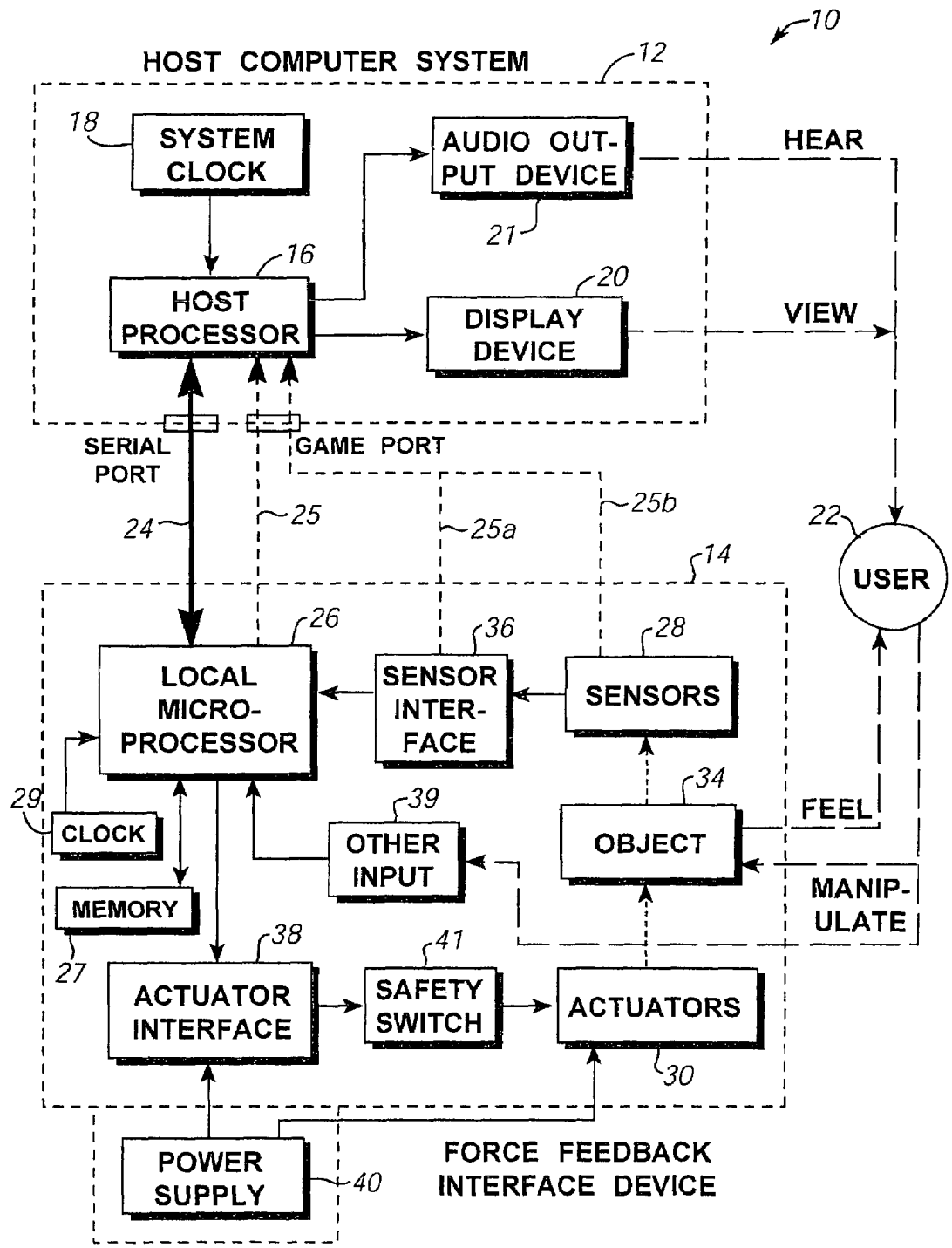
FIG. 2 is a block diagram of a control system in accordance with the present invention for controlling a force feedback interface device from a host computer.

FIG. 2 is a block diagram illustrating a generic control system 10 of the present invention for a force feedback interface device controlled by a host computer system. Control system 10 includes a host computer system 12 and an interface device 14 (or "force feedback peripheral").

Host computer system 12 ("host") is preferably a personal computer, such as an IBM-compatible or Macintosh personal computer, or a workstation, such as a SUN or Silicon Graphics workstation. For example, the host computer system can a personal computer which operates under the MS-DOS or Windows operating systems in conformance with an IBM PC AT standard. Alternatively, host computer system 12 can be one of a variety of home video game systems commonly connected to a television set, such as systems available from Nintendo, Sega, or Sony. In other embodiments, home computer system 12 can be a more application specific "set top box" or "internet computer" which can be used, for example, to provide interactive television or information functions to users.

In the described embodiment, host computer system 12 implements a host application program with which a user 22 is interacting via peripherals and interface device 14. For example, the host application program can be a video game, medical simulation, scientific analysis program, or even an operating system or other application program that utilizes force feedback. Typically, the host application provides images to be displayed on a display output device, as described below, and/or other feedback, such as auditory signals. For example, a graphical user interface used with force feedback is described in co-pending patent application Ser. No. 08/571,606, filed Dec. 13, 1995, by Rosenberg et al., and which is hereby incorporated by reference herein.

Host computer system 12 preferably includes a host microprocessor 16, random access memory (RAM) 17, read-only memory (ROM) 19, input/output (I/O) electronics 21, a clock 18, a display screen 20, and an audio output device 21. Host microprocessor 16 can include a variety of available microprocessors from Intel, Motorola, Advanced Micro Devices, or other manufacturers. Microprocessor 16 can be single microprocessor chip, or can include multiple primary and/or co-processors. Microprocessor preferably retrieves and stores instructions and other necessary data from RAM 17 and ROM 19, as is well known to those skilled in the art. In the described embodiment, host computer system 12 can receive sensor data or a sensor signal via a bus 24 from sensors of interface device 14 and other information. Host microprocessor 16 can receive or transmit data on bus 24 using I/O electronics 21, and can use I/O electronics to control other peripheral devices. Host computer system 12 can also output a "force command" to interface device 14 via bus 24 to cause force feedback by the interface device.

Clock 18 is a standard clock crystal or equivalent component used by host computer system 12 to provide timing to electrical signals used by microprocessor 16 and other components of the computer system. Clock 18 is accessed by host computer system 12 in the control process of the present invention, as described subsequently.

Display screen 20 is coupled to host microprocessor 16 by suitable display drivers and can be used to display images generated by host computer system 12 or other computer systems. Display screen 20 can be a standard display screen or CRT, 3-D goggles, or any other visual interface. In a described embodiment, display screen 20 displays images of a simulation or game environment. In other embodiments, other images can be displayed. For example, images describing a point of view from a first-person perspective can be displayed, as in a virtual reality simulation or game. Or, images describing a third-person perspective of objects, backgrounds, etc. can be displayed. A user 22 of the host computer 12 and interface device 14 can receive visual feedback by viewing display screen 20.

Herein, computer 12 may be referred as displaying computer "objects" or "entities." These computer objects are not physical objects, but are logical software unit collections of data and/or procedures that may be displayed as images by computer 12 on display screen 20, as is well known to those skilled in the art. For example, a cursor or a third-person view of a car might be considered player-controlled computer objects that can be moved across the screen. A displayed, simulated cockpit of an aircraft might also be considered an "object", or the simulated aircraft can be considered a computer controlled "entity."

Audio output device 21, such as speakers, is preferably coupled to host microprocessor 16 via amplifiers, filters, and other circuitry well known to those skilled in the art. Host processor 16 outputs signals to speakers 21 to provide sound output to user 22 when an "audio event" occurs during the implementation of the host application program. Other types of peripherals can also be coupled to host processor 16, such as storage devices (hard disk drive, CD ROM drive, floppy disk drive, etc.), printers, and other input and output devices.

An interface device 14 is coupled to host computer system 12 by an interface bus 24. Bus 24 sends signals in one or both directions between host computer system 12 and the interface device. Herein, the term "bus" is intended to generically refer to any interface, connection, or communication link such as between host computer 12 and a peripheral such as interface device 14 which typically includes one or more connecting wires, lines, cables, or other connections and that can be implemented in a variety of ways. In the preferred embodiment, bus 24 is a serial interface bus providing data according to a serial communication protocol. An interface port of host computer system 12, such as an RS-232 serial interface port, connects bus 24 to host computer system 12. Other standard serial communication protocols can also be used for the serial interface and bus 24, such as RS-422, Universal Serial Bus (USB), MIDI, system-specific ports on a Sega, Sony, etc. game system, or other protocols or standards well known to those skilled in the art.

For example, the USB standard provides a relatively high speed serial interface that can provide force feedback signals in the present invention with a high degree of realism. USB can also source more power to drive peripheral devices. Since each device that accesses the USB is assigned a unique USB address by the host computer, this allows multiple devices to share the same bus. In addition, the USB standard includes timing data that is encoded along with differential data. The USB has several useful features for the present invention, as described throughout this specification.

An advantage of the present invention is that low-bandwidth serial communication signals can be used to interface with interface device 14, thus allowing a standard built-in serial interface of many computers to be used directly. Alternatively, a parallel port of host computer system 12 can be coupled to a parallel bus 24 and communicate with interface device using a parallel protocol, such as SCSI or PC Parallel Printer Bus. In a different embodiment, bus 24 can be connected directly to a data bus of host computer system 12 using, for example, a plug-in interface card and slot or other access of computer system 12. For example, on an IBM AT compatible computer, the interface card can be implemented as an ISA, EISA, VESA local bus, PCI, or other well-known standard interface card which plugs into the motherboard of the computer and provides input and output ports for connecting the main data bus of the computer to bus 24.

In another embodiment, an additional bus 25 can be included to communicate between host computer system 12 and interface device 14. Since the speed requirement for communication signals is relatively high for outputting force feedback signals, the single serial interface used with bus 24 may not provide signals to and from the interface device at a high enough rate to achieve realistic force feedback. In such an embodiment, bus 24 can be coupled to the standard serial port of host computer 12, while an additional bus 25 can be coupled to a second port of the host computer system. For example, many computer systems include a "game port" in addition to a serial RS-232 port to connect a joystick or similar game controller to the computer. The two buses 24 and 25 can be used simultaneously to provide an increased data bandwidth. For example, microprocessor 26 can send sensor signals to host computer 12 via a game port bus 25, while host computer 12 can output force feedback signals from a serial port to microprocessor 26 via a uni-directional bus 24. Such an embodiment is described in greater detail below with respect to FIG. 3. Other combinations of data flow configurations and buses can be implemented in other embodiments. For example, game port bus 25 can be directly connected from the sensors 28 (shown as bus 25a) or from the sensor interface 36 (shown as bus 25b) to the game port of the host computer 12 in some embodiments (as in FIG. 3).

Another important feature that is desirable in the force feedback control system 10 is a communication line between the host computer 12 and the interface device 14 that incorporates user safety. Since forces are being generated on user object 34 by actuators 30 (as explained below), the interface device can potentially present some danger to a user if the buses 24 and/or 25 become disconnected during operation. Once the control of the force feedback from the host computer is disabled, the forces generated can become unpredictable. Thus, it is desirable for the actuators 30 to become deactivated if buses 24 and/or 25 are disconnected during operation. In the present invention, this feature can be implemented by designating one of the lines of bus 24 and/or one of the lines of bus 25 as a "life line." The microprocessor periodically reads the life line signals to check if the buses are still connected. If the device is unplugged, the microprocessor will not detect the signal and will consider the state to be "disconnected." If no signal is detected, then the microprocessor automatically sends a deactivation signal to the actuators. Likewise, in some embodiments, the host computer can periodically check a life line signal output from the microprocessor on one of the buses 24 or 25. If no such signal is detected, the host computer can output a deactivate actuators command on the other bus 24 or 25 (if still connected). In embodiments having no microprocessor 26 (see below), the life line can be coupled to a safety switch 41. For an RS-232, RS-422, or game port interface, one of the control lines in the interface bus can be used as the life line. When using a USB interface, the "Attach-Detach" feature inherent to the USB standard can conveniently be used for the life line.

It should be noted that bus 24 and bus 25 can be provided as either a uni-directional bus or a bi-directional bus. In the embodiment having both buses 24 and 25, they can both be uni-directional buses, which have several advantages for the described embodiments. This allows the full bandwidth of each bus to be used for one direction of data transfer, causing data communication rates to double compared to normal bi-directional use of each bus. Also, the communication protocol for each bus can be simplified in uni-directional operation. In addition, uni-directional driver software on the host computer can be simpler and require less processor time than software for bi-directional communication.

In yet another embodiment, signals traveling between the host computer system 12 and the interface device 14 can be sent and received using wireless transmission. For example, an antenna can be included in both interface device 14 and in host computer 12 to send and receive electromagnetic signals, such as radio signals, infrared signals, or microwave signals. In such an embodiment, a "bus" 24 or 25 can conceptually include a medium or channel of transmission/reception, such as the air.

Figure 1:
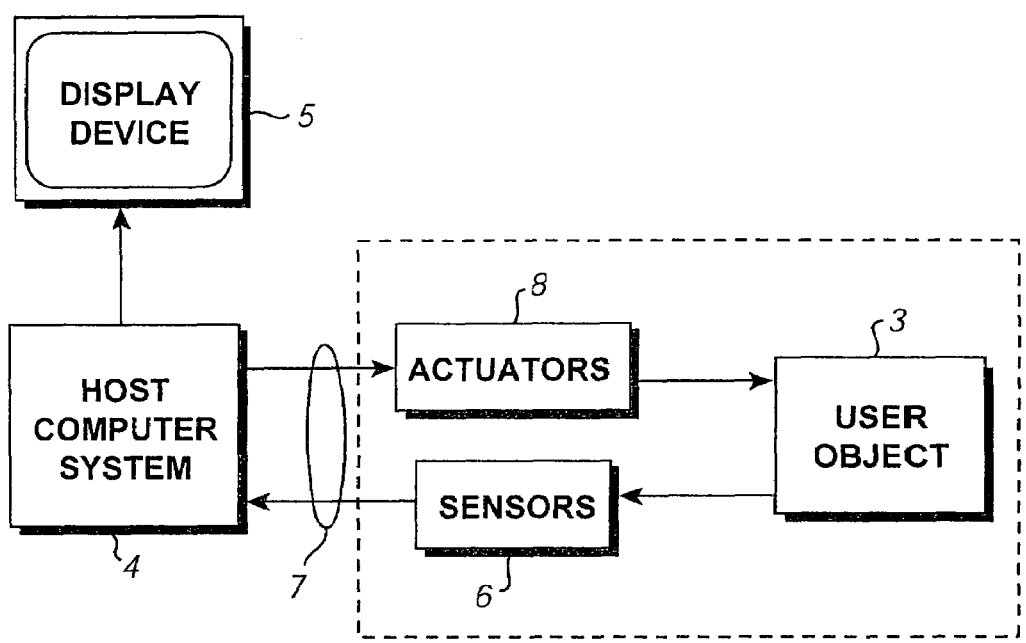
FIG. 1 is a block diagram of a prior art control system for a force feedback interface device.

Interface device 14 is a peripheral for host 12 that includes a local microprocessor 26, sensors 28, actuators 30, a user object 34, optional sensor interface 36, an optional actuator interface 38, and other optional input devices 39. Interface device 14 may also include additional electronic components for communicating via standard protocols on bus 24. For example, a separate Universal Asynchronous Receiver/Transmitter (UART) or level shifter might be included to receive/convert signals on bus 24; or, such components can be included on microprocessor 26. The embodiment of FIG. 2 provides a control loop between microprocessor 26, actuators 30, user object 34, and sensors 28 (which are connected back to microprocessor 26). Unlike the prior art embodiment shown in FIG. 1, the host computer 12 is not included in the control loop, thus freeing the host of many routine tasks and allowing it to allocate host processor time to other tasks. The microprocessor 26 can receive high level commands from the host and handle the routine tasks of the control loop in reflex processes, as discussed below.

In the preferred embodiment, multiple interface devices 14 can be coupled to a single host computer system 12 through bus 24 (or multiple buses 24) so that multiple users can simultaneously interface with the host application program (in a multi-player game or simulation, for example). In addition, multiple players can interact in the host application program with multiple interface devices 14 using networked host computers 12, as is well known to those skilled in the art.

Local microprocessor 26 (or "device microprocessor") is coupled to bus 24 and is preferably included within the housing of interface device 14 to allow quick communication with other components of the interface device. Processor 26 is considered "local" to interface device 14, and is a separate microprocessor from any microprocessors in host computer system 12. For example, the local processor 26 does not share a data bus, address bus, and/or memory with the host processor(s) 16. "Local" also preferably refers to processor 26 being dedicated to force feedback and sensor I/O of interface device 14, and being closely coupled to sensors 28 and actuators 30, such as within the housing for interface device or in a housing coupled closely to interface device 14. Microprocessor 26 is provided with software instructions to instruct the processor to wait for commands or requests from computer host 16, decode and/or parse the commands or requests, manipulate data and select routines, and handle/control input and output signals according to the commands or requests. In addition, processor 26 preferably operates independently of host computer 16 by reading sensor signals and calculating appropriate forces from those sensor signals, time signals, and a "force routine" selected in accordance with a host command, as described with reference to FIG. 7. Suitable microprocessors for use as local microprocessor 26 include the MC68HC711E9 by Motorola and the PIC16C74 by Microchip, for example; other well-known types of microprocessors can also be used. Microprocessor 26 can include one microprocessor chip, or multiple processors and/or co-processor chips. In other embodiments, microprocessor 26 can includes a digital signal processor (DSP) chip. Local memory 27, such as RAM and/or ROM (EPROM, EEPROM, etc.), is preferably coupled to microprocessor 26 in interface device 14 to store instructions for microprocessor 26 and store temporary and other data. Microprocessor 26 can receive signals from sensors 28 and provide signals to actuators 30 of the interface device 14 in accordance with instructions provided by host computer 12 over bus 24.

In addition, a local clock 29 can be coupled to the microprocessor 26 to provide timing data, similar to system clock 18 of host computer 12; the timing data might be required, for example, to compute forces output by actuators 30 (e.g., forces dependent on calculated velocities or other time dependent factors). In alternate embodiments using the USB communication interface, timing data for microprocessor 26 can be retrieved from the USB signal. The USB has a clock signal encoded with the data stream which can be used. Alternatively, the Isochronous (stream) mode of USB can be used to derive timing information from the standard data transfer rate. The USB also has a Sample Clock, Bus Clock, and Service Clock that also may be used.

For example, in the preferred "reflex" embodiment, host computer system 12 provides high level supervisory commands to microprocessor 26 over bus 24, and microprocessor 26 manages low level force control ("reflex") loops to sensors 28 and actuators 30 in accordance with force routines selected by the high level commands. In a different embodiment, host computer 12 can provide low-level force commands over bus 24, which microprocessor 26 directly transfers to actuators 30. These embodiments are described in greater detail with respect to the method of FIG. 7.

Microprocessor 26 preferably also has access to an electrically erasable programmable ROM (EEPROM) or other memory storage device 27 for storing calibration parameters. The calibration parameters can compensate for slight manufacturing variations in different physical properties of the components of different interface devices made from the same manufacturing process, such as physical dimensions. The calibration parameters can be determined and stored by the manufacturer before the interface device 14 is sold, or optionally, the parameters can be determined by a user of the interface device. The calibration parameters are used by processor 26 to modify the input sensor signals and/or output force values to actuators 30 to provide approximately the same range of forces on object 34 in a large number of manufactured interface devices 14. The implementation of calibration parameters is well-known to those skilled in the art.

Microprocessor 26 can also receive commands from any other input devices included on interface apparatus 14 and provides appropriate signals to host computer 12 to indicate that the input information has been received and can send any information included in the input information. For example, buttons, switches, dials, or other input controls on interface device 14 or user object 34 can provide signals to microprocessor 26. Input information might be directly sent to the host computer from the microprocessor, or it may be processed or combined with other data that is sent to the host.

In the preferred embodiment, sensors 28, actuators 30, and microprocessor 26, and other related electronic components are included in a housing for interface device 14, to which user object 34 is directly or indirectly coupled. Alternatively, microprocessor 26 and/or other electronic components of interface device 14 can be provided in a separate housing from user object 34, sensors 28, and actuators 30. Also, additional mechanical structures may be included in interface device 14 to provide object 34 with desired degrees of freedom. An example of such a mechanism is described with reference to FIG. 8.

Sensors 28 sense the position, motion, and/or other characteristics of a user object 34 of the interface device 14 along one or more degrees of freedom and provide signals to microprocessor 26 including information representative of those characteristics. An example of an embodiment of a user object and movement within provided degrees of freedom is described subsequently with respect to FIG. 8. Typically, a sensor 28 is provided for each degree of freedom along which object 34 can be moved. Alternatively, a single compound sensor can be used to sense position or movement in multiple degrees of freedom. An example of sensors suitable for several embodiments described herein are digital optical encoders, which sense the change in position of an object about a rotational axis and provide digital signals indicative of the change in position. The encoder, for example, responds to a shaft's rotation by producing two phase-related signals in the rotary degree of freedom. Linear optical encoders similarly sense the change in position of object 34 along a linear degree of freedom, and can produces the two phase-related signals in response to movement of a linear shaft in the linear degree of freedom. Either relative or absolute sensors can be used. For example, relative sensors only provide relative angle information, and thus usually require some form of calibration step which provide a reference position for the relative angle information. The sensors described herein are primarily relative sensors. In consequence, there is an implied calibration step after system power-up wherein a sensor's shaft is placed in a known position within interface device and a calibration signal is provided to the system to provide the reference position mentioned above. All angles provided by the sensors are thereafter relative to that reference position. Alternatively, a known index pulse can be provided in the relative sensor which can provide a reference position. Such calibration methods are well known to those skilled in the art and, therefore, will not be discussed in any great detail herein. A suitable optical encoder is the "Softpot" from U.S. Digital of Vancouver, Wash.

Sensors 28 provide an electrical signal to an optional sensor interface 36, which can be used to convert sensor signals to signals that can be interpreted by the microprocessor 26 and/or host computer system 12. For example, sensor interface 36 receives the two phase-related signals from a sensor 28 and converts the two signals into another pair of clock signals, which drive a bi-directional binary counter. The output of the binary counter is received by microprocessor 26 as a binary number representing the angular position of the encoded shaft. Such circuits, or equivalent circuits, are well known to those skilled in the art; for example, the Quadrature Chip LS7166 from Hewlett Packard, California performs the functions described above. Each sensor 28 can be provided with its own sensor interface, or one sensor interface may handle data from multiple sensors. For example, the electronic interface described in patent application Ser. No. 08/461,170, incorporated by reference herein, describes a sensor interface including a separate processing chip dedicated to each sensor that provides input data. Alternately, microprocessor 26 can perform these interface functions without the need for a separate sensor interface 36. The position value signals can be used by microprocessor 26 and are also sent to host computer system 12 which updates the host application program and sends force control signals as appropriate. For example, if the user moves a steering wheel object 34, the computer system 12 receives position and/or other signals indicating this movement and can move a displayed point of view of the user as if looking out a vehicle and turning the vehicle. Other interface mechanisms can also be used to provide an appropriate signal to host computer system 12. In alternate embodiments, sensor signals from sensors 28 can be provided directly to host computer system 12, bypassing microprocessor 26. Also, sensor interface 36 can be included within host computer system 12, such as on an interface board or card.

Alternatively, an analog sensor such as a potentiometer can be used instead of digital sensor for all or some of the sensors 28. For example, a strain gauge can be connected to measure forces on object 34 rather than positions of the object. Also, velocity sensors and/or accelerometers can be used to directly measure velocities and accelerations on object 34. Analog sensors can provide an analog signal representative of the position/velocity/acceleration of the user object in a particular degree of freedom. An analog to digital converter (ADC) can convert the analog signal to a digital signal that is received and interpreted by microprocessor 26 and/or host computer system 12, as is well known to those skilled in the art. The resolution of the detected motion of object 34 would be limited by the resolution of the ADC.

Other types of interface circuitry 36 can also be used. For example, an electronic interface is described in U.S. patent application Ser. No. 08/092,974, entitled "3-D Mechanical Mouse", previously incorporated herein. The interface allows the position of the mouse or stylus to be tracked and provides force feedback to the stylus using sensors and actuators. Sensor interface 36 can include angle determining chips to pre-process angle signals reads from sensors 28 before sending them to the microprocessor 26. For example, a data bus plus chip-enable lines allow any of the angle determining chips to communicate with the microprocessor. A configuration without angle-determining chips is most applicable in an embodiment having absolute sensors, which have output signals directly indicating the angles without any further processing, thereby requiring less computation for the microprocessor 26 and thus little if any pre-processing. If the sensors 28 are relative sensors, which indicate only the change in an angle and which require further processing for complete determination of the angle, then angle-determining chips are more appropriate.

Actuators 30 transmit forces to user object 34 of the interface device 14 in one or more directions along one or more degrees of freedom in response to signals received from microprocessor 26. Typically, an actuator 30 is provided for each degree of freedom along which forces are desired to be transmitted. Actuators 30 can include two types: active actuators and passive actuators.

Active actuators include linear current control motors, stepper motors, pneumatic/hydraulic active actuators, voice coils, and other types of actuators that transmit a force to move an object. For example, active actuators can drive a rotational shaft about an axis in a rotary degree of freedom, or drive a linear shaft along a linear degree of freedom. Active transducers of the present invention are preferably bi-directional, meaning they can selectively transmit force along either direction of a degree of freedom. For example, DC servo motors can receive force control signals to control the direction and torque (force output) that is produced on a shaft. The motors may also include brakes which allow the rotation of the shaft to be halted in a short span of time. Other types of active motors can also be used, such as a stepper motor controlled with pulse width modulation of an applied voltage, pneumatic/hydraulic actuators, a torquer (motor with limited angular range), or a voice coil actuator, which are well known to those skilled in the art.

Passive actuators can also be used for actuators 30. Magnetic particle brakes, friction brakes, or pneumatic/hydraulic passive actuators can be used in addition to or instead of a motor to generate a damping resistance or friction in a degree of motion. An alternate preferred embodiment only including passive actuators may not be as realistic as an embodiment including motors; however, the passive actuators are typically safer for a user since the user does not have to fight generated forces. Passive actuators typically can only provide bi-directional resistance to a degree of motion. A suitable magnetic particle brake for interface device 14 is available from Force Limited, Inc. of Santa Monica, Calif.

In alternate embodiments, all or some of sensors 28 and actuators 30 can be included together as a sensor/actuator pair transducer. A suitable transducer for the present invention including both an optical encoder and current controlled motor is a 20 W basket wound servo motor manufactured by Maxon.

Actuator interface 38 can be optionally connected between actuators 30 and microprocessor 26. Interface 38 converts signals from microprocessor 26 into signals appropriate to drive actuators 30. Interface 38 can include power amplifiers, switches, digital to analog controllers (DACs), and other components. In alternate embodiments, interface 38 circuitry can be provided within microprocessor 26 or in actuators 30.

Other input devices 39 can optionally be included in interface device 14 and send input signals to microprocessor 26. Such input devices can include buttons, dials, switches, or other mechanisms. For example, in embodiments where user object 34 is a joystick, other input devices can include one or more buttons provided, for example, on the joystick handle or base and used to supplement the input from the user to a game or simulation. The operation of such input devices is well known to those skilled in the art.

Power supply 40 can optionally be coupled to actuator interface 38 and/or actuators 30 to provide electrical power. Active actuators typically require a separate power source to be driven. Power supply 40 can be included within the housing of interface device 14, or can be provided as a separate component, for example, connected by an electrical power cord.

Alternatively, if the USB interface, game port, or similar communication interface is used, interface device 14 can draw power from the bus 24 and/or 25 and thus have no need for power supply 40. This embodiment is most applicable to a device 14 having passive actuators 30, since passive actuators require little power to operate. For example, active actuators tend to require more power than can be drawn from USB, but this restriction can be overcome in a number of ways. One way is to configure interface 14 to appear as more than one peripheral to host computer 12; for example, each provided degree of freedom of user object 34 can be configured as a different peripheral and receive its own allocation of power. This would allow host 12 to allocate more power to interface device 14. Alternatively, power from the bus 24 and/or 25 can be stored and regulated by interface device 14 and thus used when needed to drive actuators 30. For example, power can be stored over time and then immediately dissipated to provide a jolt force to the user object 34. A capacitor circuit, for example, can store the energy and dissipate the energy when enough power has been stored. Microprocessor may have to regulate the output of forces to assure that time is allowed for power to be stored. This power storage embodiment can also be used in non-USB embodiments of interface device 14 to allow a smaller power supply 40 to be used. A power storage circuit embodiment is described in greater detail with respect to FIG. 6.

Safety switch 41 is preferably included in interface device to provide a mechanism to allow a user to override and deactivate actuators 30, or require a user to activate actuators 30, for safety reasons. Certain types of actuators, especially active actuators such as motors, can pose a safety issue for the user if the actuators unexpectedly move user object 34 against the user with a strong force. In addition, if a failure in the control system 10 occurs, the user may desire to quickly deactivate the actuators to avoid any injury. To provide this option, safety switch 41 is coupled to actuators 30. In the preferred embodiment, the user must continually activate or close safety switch 41 during operation of interface device 14 to activate the actuators 30. If, at any time, the safety switch is deactivated (opened), power from power supply 40 is cut to actuators 30 (or the actuators are otherwise deactivated) as long as the safety switch is open.

For example, a preferred embodiment of safety switch is an optical switch located on user object 34 (such as a joystick) or on a convenient surface of a housing enclosing interface device 14. When the user covers the optical switch with a hand or finger, the sensor of the switch is blocked from sensing light, and the switch is closed. The actuators 30 thus will function as long as the user covers the switch. Such an optical switch can comprise an ambient light detector, which simply senses when detected ambient light has been blocked by the user when the user covers the detector with a hand. Alternatively, an emitter/detector pair can be provided in a small recess on the interface device 14. The emitter emits a particular type of electromagnetic radiation, such as infrared light, out away from the interface device into exterior space. When the user covers the recessed emitter/detector, the emitted radiation reflects from the user's hand or finger so that the detector detects the radiation and activates the motors. Such optical switches are well known to those skilled in the art. Other types of safety switches 41 can be provided in other embodiments. For example, an electrostatic contact switch can be used to sense contact with the user, a button or trigger can be pressed, or a different type of sensor or switch can be used. Further embodiments of safety switches of the present invention are described with reference to FIGS. 9 and 10.

In the preferred embodiment, there is additionally included a "safety ramping routine" which the microprocessor 26 implements when the safety switch 41 is opened and closed. When the safety switch 41 is opened, the forces output by actuators 30 are dropped to zero instantly. However, when the safety-switch is then closed by the user, the output forces jump back up to the same magnitude that these forces were at before the safety switch was opened. This instant increase in the magnitude of forces creates a hazardous condition for the user. To counter this effect, the microprocessor preferably accesses a safety ramping routine in memory 27 that instructs the microprocessor to slowly ramp up the magnitude of the forces over a predefined time interval after the safety switch is closed. After the predefined time interval (e.g., 3 seconds), the forces are output at the full magnitude provided before the switch was opened.

User object 34 is preferably a device or article that may be grasped or otherwise contacted or controlled by a user and which is coupled to interface device 14. By "grasp", it is meant that users may releasably engage a grip portion of the object in some fashion, such as by hand, with their fingertips, or even orally in the case of handicapped persons. The user 22 can manipulate and move the object along provided degrees of freedom to interface with the host application program the user is viewing on display screen 20. Object 34 can be a joystick, mouse, trackball, stylus, steering wheel, hand/foot pedal, medical instrument (laparoscope, catheter, etc.), pool cue, hand grip, knob, button, or other article.

FIG. 3 is a schematic diagram of an example of a specific embodiment 50 of the interface device 14. Local microprocessor 26, in this example, is a PIC16C74 available from Microchip and having 14 address lines and 8 data lines. This microprocessor includes an internal architecture that splits memory into two partitions and allows fast program executions, and is thus well-suited for high speed force feedback processing. This embodiment preferably includes local memory 27, such as ROM, as well as local clock 29 on board the microprocessor.

Interface device 50 is intended to communicate with host computer 12, as explained with reference to FIG. 2, using both a serial interface such as an RS-232 interface as well as a second interface 25, which, in the described embodiment, a game port interface as typically found on an IBM-compatible personal computer (PC).

Sensors 28 are used to sense the position of user object 34 in provided degrees of freedom. In the described embodiment, sensors 28 are potentiometers 52, each potentiometer being coupled to a shaft which rotates in a degree of freedom as the user object 34 is rotated. Each potentiometer outputs an analog voltage signal ("sensor signal") in proportion to the position of the user object in the measured degree of freedom. The potentiometers 52 are powered by a five-volt signal provided on a power line 53 of the game port interface (with reference to a ground line 53a of the game port interface, and where capacitors C1 and C2 are used for filtering the signal, as is well known to those skilled in the art). The potentiometers output their sensor signals on the game port interface bus 25. Each potentiometer can include a trimmer mechanism to allow reorientation with respect to the user object 34 and allows the user object to be recalibrated when in use, as is well known to those skilled in the art. Analog potentiometers are used in this embodiment since the standard game port interface requires this type of sensor. Other types of sensors, such as digital rotary encoders, can be used for sensors 28 in other embodiments using a different type of interface bus 25.

In alternate embodiments, digital switches or contacts can be used in place of analog potentiometers 52. For example, some types of joysticks used by video game systems or computers are "digital joysticks" that provide digital signals corresponding to a position or direction of the joystick. Such digital signals do not typically describe a position of the joystick within a rotary or linear degree of freedom as do "analog joysticks", but instead describe simple directions such as "up", "left", or "diagonal up-left". Contact switches, for example, can be placed at four positions (up, down, left, right) around a joystick to detect eight possible directions (those four directions and the four intermediary diagonal directions). When the joystick is moved in one of these directions, the appropriate contact switch(es) are closed and a corresponding signal is output. "Joypads" and like controllers for video games typically use this arrangement. For the described and other embodiments of the present invention, such a digital joystick can be included to send digital representations of the joystick's direction to host computer 12, while actuators 30 can provide forces on the joystick in provided degrees of freedom.

The game port interface bus 25 is used to send sensor data describing the position of the user object 34 in provided degrees of freedom to the host computer. For example, the potentiometers 52 can detect the position of a joystick within the left/right degree of freedom and within the forward/back degree of freedom. This information is presented to the game port interface and converted to digital signals by RC circuitry typically located in host computer system 12 and used with the game port, as is well known to those skilled in the art. The digital signals are serially transmitted over bus 25 that is connected to the standard game port of host computer 12. In this respect, interface device 50 operates as a typical prior art joystick in reporting the position of the joystick directly to the host computer. The host computer can then update a process such as a game in response to the received position information. The interface device 50 can thus advantageously be used with any available software and hardware that is compatible with a standard joystick.

In the present embodiment, the sensor data is preferably sent directly to the host computer 12 over game port interface bus 25 without being sent to microprocessor 26. This is because the game port interface processes the analog signals into digital signals using the RC circuit, which prevents other components such as microprocessor 26 from also reading the potentiometer data. In some embodiments, the microprocessor may need sensor reading information to provide force commands to the actuators; in such an embodiment, a second set of sensors can be used, as described below.

The present embodiment also includes a second interface bus 24 coupled between the host computer 12 and interface device 50 which is preferably implemented as a serial RS-232, RS-442, or similar interface. In the described embodiment, this interface bus is used exclusively for providing force feedback commands from the host computer to the interface device 50. An RS-232 level shifter 54 converts signals to the appropriate voltage levels for transmission and reception. The host computer 12 sends serial commands out from its standard serial port on line RxD of the RS-232 interface. Shifter 54 receives and converts these commands to the necessary logic level (e.g., 5 volts) and provides the commands to microprocessor 26. Microprocessor controls motors 66 in response to the received commands. The TxD line of the RS-232 interface of the level shifter need not be connected to the host.

Alternatively, the TxD line can be connected between interface device 50 and host computer 12 in some embodiments to provide interface device product information and other required information from the interface device to the host. Such product information can include the serial number, version number of the device 50, version number of firmware of the microprocessor/local memory, release date of the firmware and/or device 50, model number, host commands that are compatible with device 50, the number of axes or degrees of freedom of user object 34 that are available and their description, the resolution of sensors or actuators, and/or copyright information. This information can be stored in ROM or other memory 27 on the interface device 50. Also, status information and sensor data from sensors 28 can be provided on this TxD line if, for example, game port bus 25 becomes disconnected or unused.

Since the entire bandwidth of the serial RS-232 interface is used for receiving force feedback commands from the host computer, a greater transmission rate for force signals can be implemented and a greater degree of realism and control can be provided in the forces output on the user object. In addition, the game port is implemented as in standard joysticks that do not provide force feedback. The interface device 50 can thus be connected to any computer with a game port and can function as a non-force-feedback joystick with any software that is compatible with non-force-feedback joysticks. If software is available on host computer 12 to implement force feedback commands, the interface device 50 can also take advantage of that functionality. This is important in that the interface device is compatible with the presently available software applications and is compatible with new force feedback software as that software is introduced. This provides a more marketable interface device than a pure force feedback joystick until force feedback software is more widely available.

The present embodiment also preferably includes a communication line safety feature as described with reference to FIG. 2. To allow the microprocessor 26 to easily monitor the status of the connection of the serial bus 24, one of the lines of bus 24 is coupled to the microprocessor. In the described embodiment, the DTR line 51 of the RS-232 interface is coupled (through level shifter 54) to a digital input (B6) of the microprocessor. The PIC microprocessor of the described embodiment includes a universal asynchronous receiver/transmitter (UART) on the chip itself. The microprocessor checks for a logical low state on the DTR line to confirm that the serial bus 24 is connected. When the DTR line carries a logical high state, the serial bus/cable is assumed to not be connected, and the microprocessor sends a disable signal to the motors 68 on line 60. The host computer 12 can also control the state of the signal on the DTR line to disable the motors in like manner when desired. In other similar embodiments, a UART could be provided as a separate component. In other embodiments, the host computer can send a signal out to the microprocessor periodically and the microprocessor can check for this signal to ensure the connection of the bus is still intact. The bus 25 is not checked in the described embodiment, but can be monitored in alternate embodiments.

In other embodiments, other types of interfaces can be implemented as serial interfaces to be used as buses 24 and/or 25. For example, video game consoles such as the Sega Saturn or the Sony PlayStation do not have a serial port or a game port as described above, but instead have a control port having a parallel interface. However, a serial interface can be emulated by using the input and output lines of the parallel port. For example, the "up", "down", "left" and "right" control signal lines of the Sega Saturn can be used as lines which encode the sensor data (such as from a digital encoder or potentiometer) and button data and send that data to the host, and the output lines TH, TR, and TL from the Sega Saturn can be used to encode the host commands to the microprocessor 26, thus providing two way communication between host computer 12 and interface device. A serial protocol can be used, where one output line (e.g., TH) is used in place of the TxD line described above. Another line (e.g., TR) can be used in place of the DTR line. Note that the potentiometer data would be read by the microprocessor 26, processed, and sent to the host in such an embodiment. In addition, the power and ground lines can be used from a video game console port similarly to power line 53 of an RS-232 interface.

Handle buttons 56 are included as other input devices 39 as shown in FIG. 2. The buttons 56 include switches and a 5-volt input from the game port interface, as is well known to those skilled in the art. Fourteen buttons are indicated as available in embodiment 50, but a different number of buttons or other types of switches, knobs, or controls can be included in other embodiments. The button input signals are input to data ports D0–D7 of microprocessor 26 on bus 57. Microprocessor 26 outputs the digital button signals on lines 55 of game port interface bus 25.

Thermistors 58 are coupled to the microprocessor 26 and sense the temperature of motors 68. The thermistors convert a sensed temperature into an electrical signal as is well known to those skilled in the art. For example, thermistors such as RL2006-1600-103-D1 available from Keystone Thermometrics can be used. The microprocessor 26 reads the temperature signals on buses 59 to determine if the motors are overheating. The microprocessor can deactivate the motors using the EN signal 60 when an overheating condition is sensed (and can activate overtemp LED 62 to inform the user of the overheated condition). Other types of temperature-sensing components can be used in other embodiments. For example, a temperature sensing integrated circuit can be used. In yet other embodiments, the temperature of the motors can be sensed or determined using other components or steps. For example, the voltage drop across the motor windings can be measured by an analog to digital converter (ADC) that, for example, can be included on the microprocessor 26. The voltage drop across the motor windings is typically a reliable indicator of the temperature of the windings material so that the temperature can be determined by the amount of the voltage drop. Alternatively, a software estimation of the motor temperature can be performed by the microprocessor 26. The microprocessor can keep a running average over time of the amount of current sent to the motors 68. The thermal characteristics of the motors are provided to the microprocessor from memory or in software, and the software on the microprocessor can thus estimate the temperature of the motors at any desired time. This is a low cost solution for providing overheat protection since no extra hardware components are needed, but it may not be reliable in some situations due to variations in ambient air temperature and other factors that can change the thermal response of the motors 68 without the knowledge of the microprocessor.

Secondary potentiometers 62 are optional extra sensors included to provide sensor data to microprocessor 26 describing the position of the user object 34. As explained above, the standard game port interface requires that sensor data be directly sent to host computer 12 from potentiometers 52 and that microprocessor 26 cannot read the sensor signals. However, the microprocessor 26 may still need the sensor data to calculate force values or otherwise determine the control signals sent to actuators 30. Secondary potentiometers 62 can provide sensor data to the microprocessor independently of potentiometers 52 so that the microprocessor receives the needed data. The secondary potentiometers can be analog potentiometers, rotary encoders, or other types of sensors similar to sensors 28. These potentiometers can be coupled to the same rotational shaft (not shown) as potentiometers 52, for example. Microprocessor 26 receives the sensor signals from secondary potentiometers 62 on buses 63.

The 5 volt signal from line 53 of the game port interface is used to power handle buttons 56, LED's on device 50, potentiometers 52 and 62, and other logic components of the interface device 50. The game port power line 53 is preferably used instead of a power signal from interface 24, since the game port interface is always used when the interface device 14 is connected, while the interface 24 may be disconnected for non-force-feedback uses of the interface device 50. The other components, such as motors 68, are powered by the power supply partition, as explained below. In alternate embodiments, power lines from other interfaces can be used.

Power supply partition 64 is preferably a separate power section of interface device 50 that drives the actuators 30 of the interface device. Power supply partition 64 includes actuators 30 and power circuit 66. Actuators 30 preferably are two motors 68, such as 24 V motors available from Mabuchi, Japan in the described embodiment, where each motor is used to provide forces along one degree of freedom of the user object 34. A joystick typically has two degrees of freedom, forward/back and left/right. If additional degrees of freedom are included in interface device 50, then additional motors can be added as appropriate. Microprocessor 16 provides two signals to each motor: a direction (DIR) signal 70 and a pulse width modulation (PWM) signal 72. The direction signal instructs the motor 68 to provide force along one of the two directions within its degree of freedom. The PWM signal controls the magnitude of the force by providing a signal having a constant frequency (e.g., 10 kHz) and a varying duty cycle. A high duty cycle provides high magnitude forces, and vice versa. The DIR and PWM signals from microprocessor 26 are input to driver amplifiers 74 which can be considered as part of actuator interface 38. Amplifiers 74 have 24-volt inputs from a 24-volt power supply 40 and provide the control signals from microprocessor to drive motors 68 at the proper high current level.

Microprocessor outputs an enable signal on line 60 which permits the motors 68 to be activated and to output forces on user object 34. A safety or "deadman" switch 41 is also included in embodiment 50 to allow the user to control when the motors can output forces. Switch 41, as described with reference to FIG. 2, must be closed by the user in order for the motors 68 to be activated. A 5-volt signal from the game port interface is input on line 78 to an NOR gate 70 when the safety switch 41 is open. When the safety switch is closed, the 5-volt signal runs to ground, and a low enable signal is provided to NOR gate 70. The output of the NOR gate is provided to driver amplifiers 74 as an enable input. Thus, if either the safety switch 41 is closed, or if an enable signal is sent by microprocessor 26 on line 60, motors 68 are activated and will output forces according to the control signals on lines 70 and 72. The 5-volt signal on line 78 is also preferably input to microprocessor 26 so the microprocessor can monitor the state of the safety switch. Safety switch 41 can be a device as described with reference to FIG. 2, or can be a safety switch of the present invention described with reference to FIGS. 9 and 10. Preferably, "Active" LED 76 is illuminated when the motors are activated so that the user knows when the motors are exerting force.

Power circuit 66 is also preferably included in power supply partition 60 and is used to convert the 24 volt output from power supply 40 to a 5-volt signal used in various components of power supply partition 64, such as the driver amplifiers 74. The power supply 40 is preferably connected to a standard AC wall socket.

The power supply partition 60 allows the force feedback portion of interface device 50 to be separated and used independently from the other components in the device. Thus, if interface device 50 is being used as a standard joystick and is only connected to the game port interface of host computer 12, then the 5-volt signal from the game port is used while the power supply partition is unused and the 12-volt power supply 40 need not be plugged into an AC wall socket. The 12-volt power supply 40 is plugged into a wall socket if force feedback is to be implemented on device 50.

In an alternate embodiment of interface device 50, microprocessor 26 need not be included and can be replaced by hard-wired logic. The motors 68 can be controlled directly by host computer 12 using low or high level commands as described below with reference to FIG. 7. As in the embodiment described above, game port interface bus 25 sends only sensor signals to the host computer, and the serial interface bus 24 only sends host commands to the interface device. The host computer can calculate force values and send the low level commands to the interface device. A level shifter and shift register, for example, can be used to read in the serial commands and provide the commands to logic provided on a field programmable gate array (FPGA), which can be used to issue force values to the actuators as instructed by the low level commands from the host (as described with reference to FIG. 7). Since serial port interface bus 24 is used exclusively to send low level host commands to the actuators, a greater bandwidth and more realistic force feedback can be provided. In an even simpler embodiment, the logic and shift register need not be used, and the serial interface can be used as simple parallel bit lines to provide high and low logic signals to control the actuators 30. This embodiment is described in greater detail with respect to FIGS. 4a–4f.

In a different embodiment, the interface device 50 (or other interface device embodiments disclosed herein) can be made expandable to be controlled in other ways. For example, the interface device 50 can be provided with a separate "access port" which is connected to both sensors 28 and actuators 30. If the user desires that the host computer 12 directly control the interface device, a parallel bus can be connected between the access port and the host computer (e.g., an interface card can be plugged into the host) so that the host directly receives sensors signals and so that host commands are directly provided to the actuators 30 or the actuator interface 38. Preferably, the user can select a switch on the interface device to switch the communication lines from normal microprocessor control to direct host control through the access port (the microprocessor can be disabled when using direct host control). This would allow the host to provide realistic, direct force feedback to the user, but would put a greater processing burden on the host.

Figure 4A:
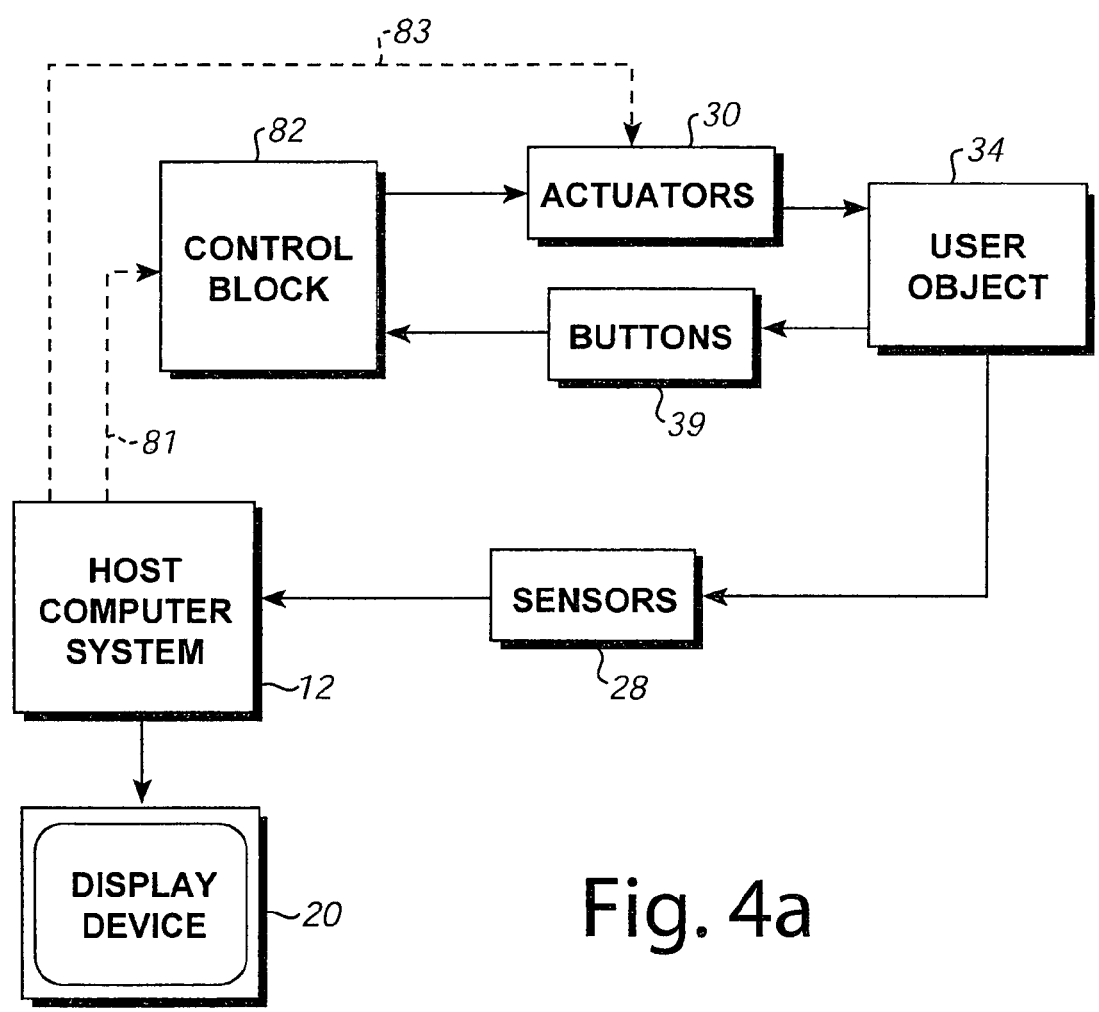
FIGS. 4a-4f are block diagrams of an alternative low-cost "recoil" embodiments of the interface device of FIG. 2.

FIG. 4a is a block diagram of an alternate "recoil" embodiment 80 of the force feedback control system 10 of FIG. 2. In recoil control system 80, a local device microprocessor 26 is not necessary to provide force feedback and the host computer sends no signals, or only minimal signals, to the interface device 14. The recoil embodiment is thus a "reflex" interface device, in that forces are output on user object 34 independently of host computer 12, and these forces depend only on local control events (e.g. a press of a button by the user). The reflex process includes outputting a force when a button is pressed with no communication from the host.

The position of user object 34 is sensed by sensors 28, and the sensors send position or other related signals to the host computer 12. The control loop includes buttons or other input devices 39, which sense actions of the user such as when the user pushes one of the buttons. The buttons 39 provide input signals to a recoil reflex control block 82, which is "hard wired" logic or other components instead of a microprocessor. The control block 82 sends activation signals to motor (or other type of actuator) 30, which outputs forces on user object 34 to complete the loop. In alternate embodiments as disclosed with respect to FIGS. 4c–4f, the host computer 12 can additionally provide simple enable signals on line 81 to the control block 82 or activation signals on line 83 to actuator 30 to provide more realistic force feedback. Since the host computer is not included in the main control loop, the host can devote minimal processing time to the control of force feedback and can process other tasks more efficiently, such as displaying images on display device 20 and other processes. In addition, the lack of a microprocessor 26 simplifies and reduces the cost of the interface device 14, as discussed below.

Figure 4B:
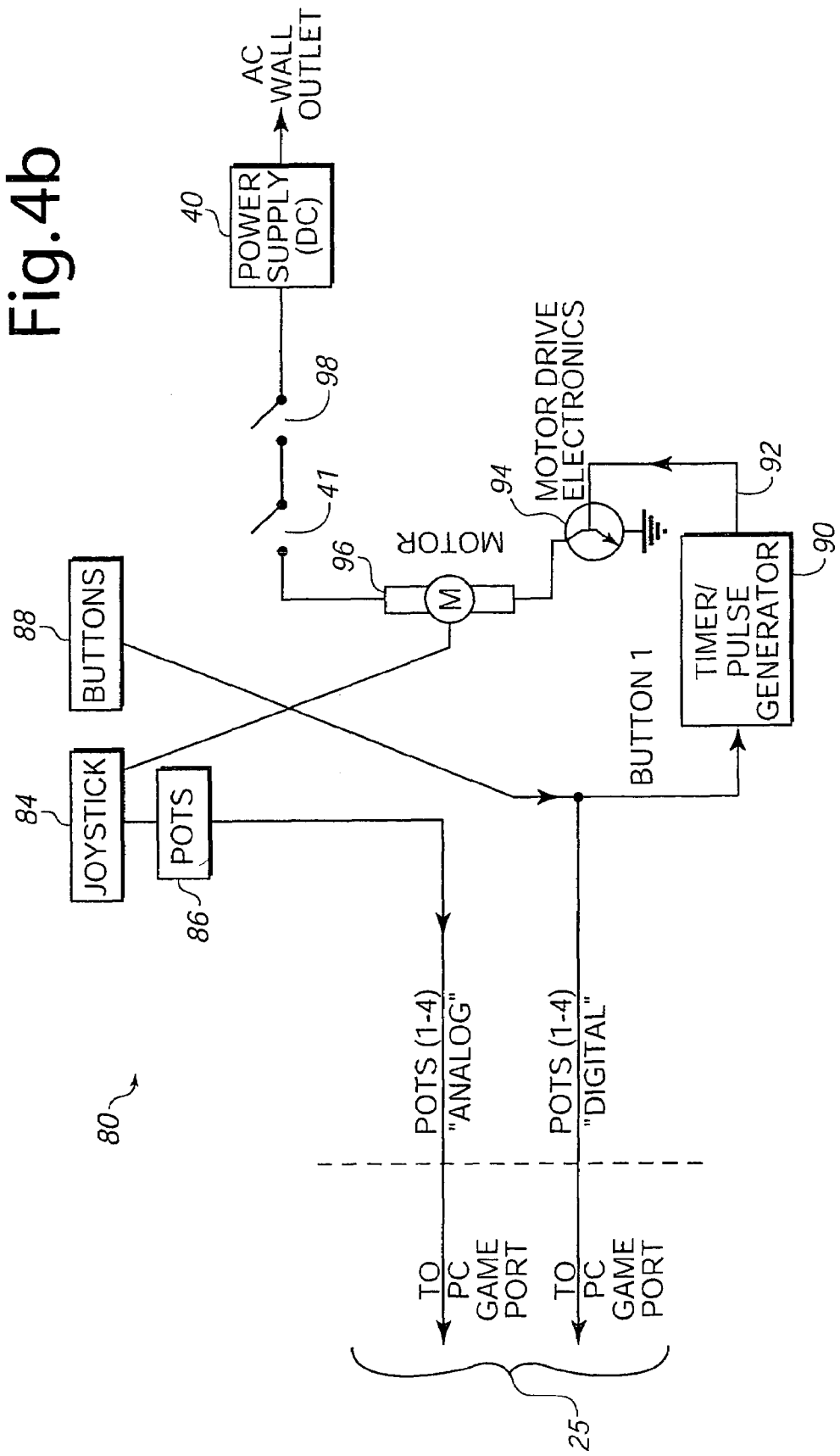

FIG. 4b is a schematic diagram of a first "recoil" embodiment 80 of FIG. 4a Interface device 80 includes a joystick 84 or similar user object 34 that is coupled to (or otherwise sensed by) sensors 28. Sensors 28 provide signals indicating the position of the joystick in the provided degrees of freedom. For example, the sensors 28 preferably are analog potentiometers 86 similar to those described with reference to FIG. 3. Joystick 84 also preferably includes one or more buttons 88 positioned thereon similar to buttons 56 described with reference to FIG. 3. Buttons or other controls can also be provided on a housing or base of the interface device 14 in addition to or in place of buttons on the joystick.

The sensor data from sensors 28 is preferably output on game port interface bus 25 to host computer 12. For example, analog potentiometers are preferably used, and the sensor data is converted to digital form in conformance with the game port interface standard.

In the described embodiment, force feedback is provided when the user activates input devices such as buttons 88. For example, when button #1 on interface device 80 is pressed by the user, the signal from button #1 is sent over game port interface 25 with the other button data to host computer 12. The button #1 data is also sent to a timer/pulse generator 90 included in interface device 80. When timer/pulse generator 90 receives the button #1 signal, it outputs a motor control signal on line 92.

Line 92 is coupled to actuator interface 38, which in the present embodiment includes a transistor 94 used for amplifying the motor control signal. Actuator interface 38 is coupled to motor 96 to provide an appropriate signal to drive the motor. Motor 96 provides a force in a particular degree of freedom to user object 34. A set of motor 96 and actuator interface 38 can be provided for each degree of freedom in which the user object is capable of moving. Alternatively, fewer motors 96 can be included if force is desired to be provided in only selected degrees of freedom.

Power supply 92 powers motor 96 and can be connected to a standard AC wall outlet, for example. Two switches 41 and 98 either activate or deactivate the motor 96 by connecting or disconnecting the power to the motor. Safety switch 41 is similar to the safety switch described with respect to FIG. 3, and is closed when the user is pressing or otherwise closing a switch on the interface device 80. Switch 98 is a "recoil active" switch that is positioned on the exterior of the interface device and can be closed or opened by the user. When closed, the force feedback provided by motor 96 is operational, and when open, the force feedback is turned off. This allows the user to turn on force feedback when the user deems is appropriate to output forces to the joystick in response to a button press. The user can turn off the force feedback when desired and/or when it is inappropriate to cause forces to be output when a button is pressed.

The present embodiment is intended for use as a low-cost "recoil" force feedback interface device which does not require a local microprocessor 26 and does not require the host computer 12 to send force feedback signals to provide forces on user object 34. Rather, the force feedback is initiated whenever the user activates an appropriate control, such as a fire button 88 on a joystick. Thus, the "recoil" force feedback is an independent "reflex process." Although the host computer does not send any signals or commands to initiate force feedback, the forces in this embodiment can still realistically portray force events. For example, the host computer can run a simulation or video game in which the user controls a gun. The force output by motor 96 can be initiated when the user presses a button to fire the gun, and can provide a jolt or similar force to simulate the recoil of the shooting gun. In many such games, a button press will always fire the controlled gun in the game. The forces thus accurately simulate a recoil force when firing a gun during a game, a centrifugal force when activating thrusters on a simulated plane or spacecraft, a vibration force for a certain action, or other force when performing some other action during a simulation or game. The forces can be provided in a predetermined or random direction(s).

This embodiment allows force feedback to be provided to a user in all software that is compatible with a standard joystick or other peripheral connected to a standard game port. No special force-control software is required for the host computer, since the host issues no force commands to the interface device in this embodiment. Button #1, for example, is wired directly to timer/pulse generator 90, which activates the motor 96 when the button #1 is pressed. In one embodiment, the timer/pulse generator can produce a single force jolt while a button is pressed. Alternatively, the pulse generator 90 can cause motor 96 to output a series of force jolts at a predetermined frequency for the length of time that the user continuously presses the button.

Figure 9:
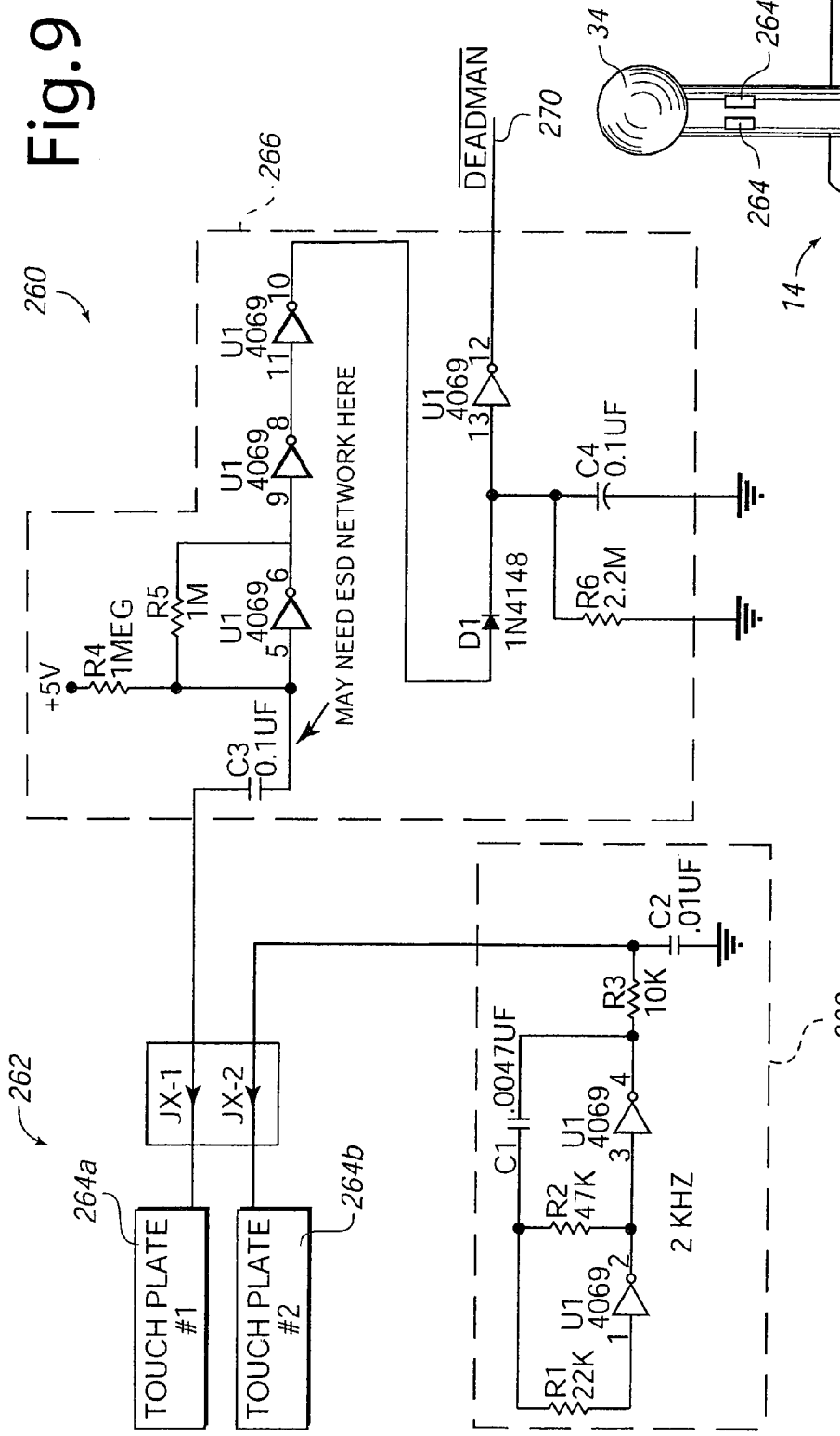
FIG. 9 is a schematic diagram of a circuit for a touch plate safety switch of the present invention.

When the user runs out of ammunition during a game or is otherwise unable to perform a force feedback related action, then the user can open the recoil switch 98 to deactivate the motor. This allows the force feedback to be conveniently disabled when it is not appropriate to the game or simulation. In addition, the user can open recoil switch 98 when the user does not desire to feel forces in response to button presses. The user also can open the safety switch 41 to disable force feedback (unless the hand-weight safety switch of FIG. 9 is being used, in which it would not be possible for the user to operate the joystick without closing the safety switch). Other buttons on the interface device 80 can also be connected to individual motors and timer/generators in a similar fashion, or multiple buttons can be connected to one motor and timer/generator. Different motors can be set up to provide different force sensations depending on the particular button that the user presses, e.g., one motor can provide a gun recoil force on the user object, a different motor can provide a vibration force of a vehicle, etc. Many combinations of button or other control activations and different motor forces can be provided.

Figure 4C:
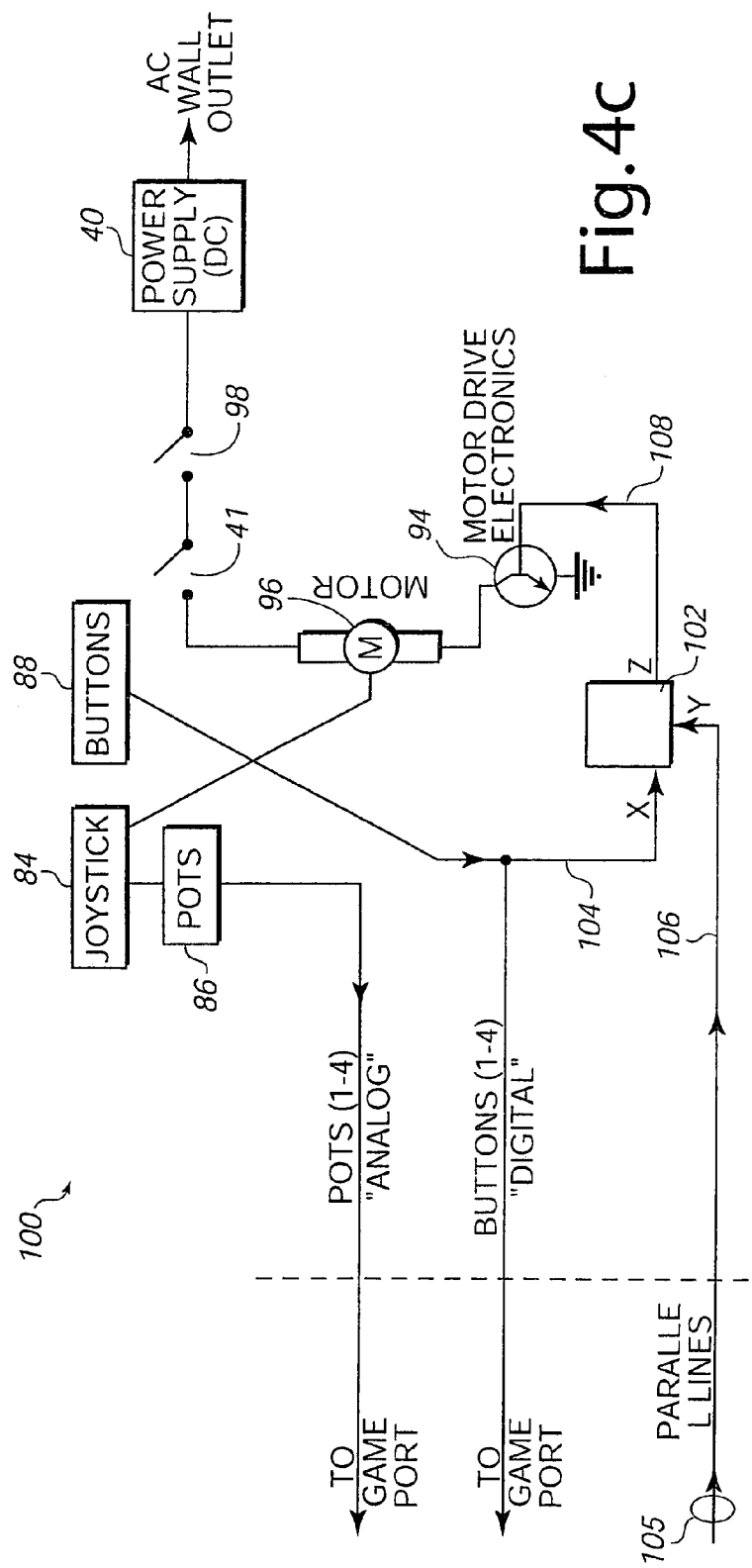

FIG. 4c is a schematic diagram of a second embodiment 100 of the "recoil" interface device of FIG. 4a Interface device 100 is more functional than interface device 80, since simple logic states can be sent by the host computer 12 as a control signal to enable or disable the force feedback on the interface device 100 to help correlate force feedback with game or simulation events implemented by the host. Potentiometers 86, buttons 88, motor 96, motor interface 94, and switches 41 and 98 are similar to the equivalent components described with reference to FIG. 4b.

As referred to herein, the terms "activate" and "deactivate", as applied to actuators or reflex processes, refers to directly causing the actuators to output or remove a force. For example, an activation signal will cause the actuator to output force when the actuator receives the activation signal, and a deactivation signal will turn the actuator off and/or remove output forces (assuming that no other disabling signals are in force). In contrast, the terms "enable" and "disable" refer to either allowing or not allowing the motors to be controlled by other activation or deactivation signals. For example, if a disable signal has been sent to the actuator interface, or if the actuators are disabled by opening recoil switch 98 and cutting power, the actuator will not output forces when an activation signal is received (or at any other time). If an enable signal is sent, the actuators are able to output forces when an activation signal is received and will remove all forces when a deactivation signal is received. An actuator can output forces when all enable signals are set to "enable" and when an activation signal is received. In addition, reflex processes are also referred to herein as being "enabled" or "disabled", where it is meant that the process of outputting forces in response to local events is either operation (enabled) or not operational (disabled). For example, a recoil reflex process that is disabled means that the process of outputting forces in response to the user pressing a button is not functional.

Interface device 100 includes a selection block 102 which is coupled to a control signal line 104 from a button on the interface device. In addition, a host line 106 (or multiple host lines in alternative embodiments) is coupled to the selection block 102 from a parallel bus 105 connected to host computer 12. Host line 106 is used by the host computer to enable or disable motor 96. In the described embodiment, line 106 is connected to a serial port of host computer 12 that is used as a parallel port in the present embodiment. For example, an RS-232 port of the host computer can be coupled to parallel bus 105. The DTR line of the RS-232 interface can be used as a parallel line carrying a low or a high signal. This DTR line would be host line 106 that is used to enable or disable the actuators. Other lines of the RS-232 interface could also be used. The present embodiment thus treats the serial RS-232 interface as a parallel interface and does not require a UART or other serial support chips, thus reducing the cost of the device 100 significantly. In alternate embodiments, other interfaces can be used. For example, parallel bus 105 can be coupled to a standard parallel port of host computer 12.

Figure 4E:
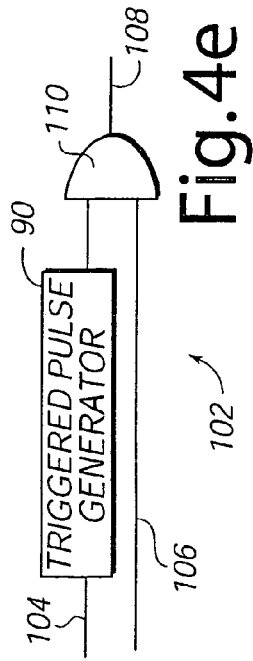
Figure 4D:
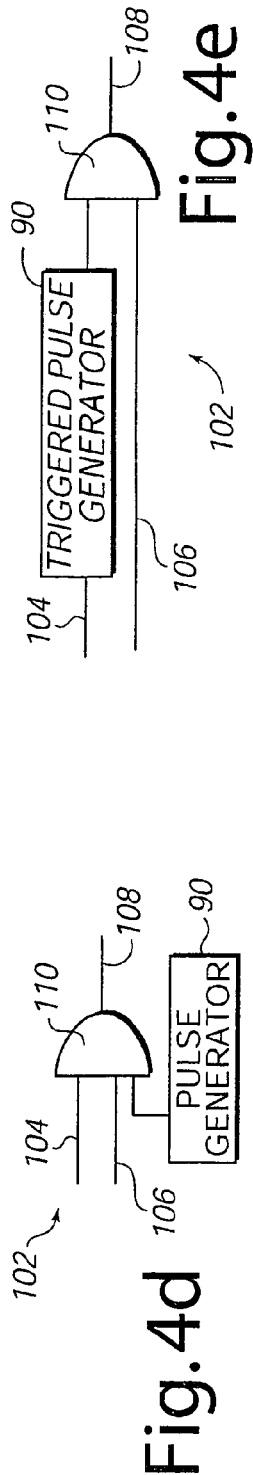

Selection block 102 outputs a pulse signal on control line 108 to activate motor 96 when the button sends an activation signal on line 104 and when the host computer sends an enable signal on line 106. If either of these signals is not in a high state (or equivalent), the motor cannot be activated. The selection block 102 can be implemented in a number of possible ways. For example, FIG. 4*d* illustrates a functional schematic in which button line 104, host line 106, and a line from timing/pulse generator 90 are inputs to an AND gate 110, and the output of AND gate 110 is provided as a control signal on line 108 to motor interface 94. FIG. 4*e* illustrates an alternate schematic in which button line 104 is input to triggered pulse generator 90 that outputs a pulse (or pulses) when a signal is received indicating that a button has been pressed by the user. The output of the triggered pulse generator 90 and the enable line 106 from host computer 12 are input to AND gate 110 which outputs the control signal on line 108 to the motor 94 when both inputs are high.

The enable line 106 from the host computer can be implemented as a direct line from a serial or other port of the host or as a multi-line bus 105 with more information. For example, bus 105 can include separate lines for a clock, data, and clear signal that are input to a latch from the host computer 12, and the output of the latch can be coupled to the selection block as line 106. The latch would provide the enable signal when the clock signal changes to a high state, thus allowing the host to control when the enable signal is sent using synchronous communication.

The interface device 100 is similar to the recoil interface device of FIG. 4*b* in that when a user presses a designated button, force feedback is applied to the user object 34 by motor 96. However, device 100 also includes enable line 106 from the host computer, which allows the host computer to determine when the motor can be activated. The enable line 106 does not allow the host computer to command desired forces, but only allows the host to select when the user will be able to activate the force by pressing a button (thus enabling/disabling the reflex process).

The enable line 106 allows the software process running on the host computer to be better coordinated with the force feedback. For example, when the user's player in a video game runs out of ammunition for a controlled gun, the host computer can send a disable signal to selection block 102, which will immediately deactivate the motor 96 regardless of the state of button 88. Likewise, when the user's player is in a situation in which force feedback can be applied, e.g., if the user picks up more ammunition in a game, the host computer can send an enable signal on line 106, which will allow the motor to output a force when the user selects the button 88. This is an improvement in coordinating forces with a host application over the embodiment of FIG. 4*b*, since, in that embodiment, a user had to manually disable the actuators with recoil switch 98. This configuration is almost as low-cost and simple as the embodiment of FIG. 4*b* while allowing a greater degree of realism and coordination of force feedback with other visual and auditory feedback on the host computer 12. Only a single line 106 is required for the host computer to be able to deactivate force feedback in accordance with game or simulation events. The user can also open or close recoil active switch 94 similarly to the embodiment of FIG. 4*b* to enable or disable the motor.

Figure 4F:
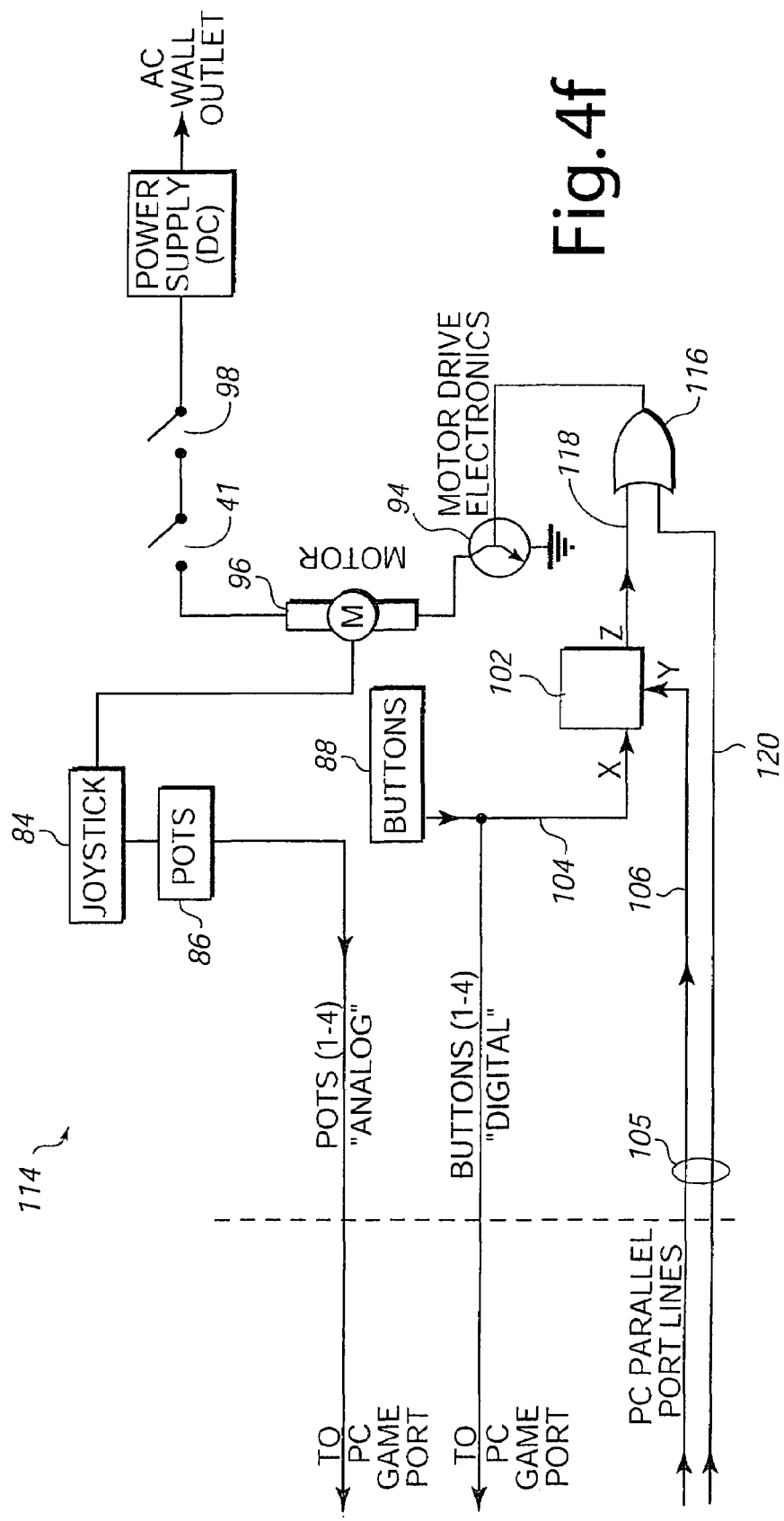

FIG. 4*f* is a third embodiment 114 of the recoil interface device of FIG. 4*a* in which either a button press or a control signal from the host computer can cause force feedback to be output on the user object 34. The interface device 114 includes joystick 84, potentiometers 86, buttons 88, motor 96, motor interface 94, and switches 41 and 98 which are similar to the equivalent components described with reference to FIG. 4*b*. Device 114 also includes a selection block 102 to which lines 104 and 106 are input and which is substantially similar to the selection block 102 described in FIG. 4*c*.

The interface device 114 additionally includes an OR gate 116 or the functional equivalent. The OR gate 116 has two input lines, one line 118 from selection block 102 and a separate activation line 120 from the parallel bus 105 coupled to the host computer. The output of the OR gate 116 is coupled to motor interface 94. The OR gate allows the host computer to activate the motor 96 using an activation signal on activation line 120 regardless of whether a user is pressing any buttons. This activation of motor 96 is simply turning the motor on or off using pulse generator 90, i.e., the pulse generator will send out a predetermined PWM signal or other command to the actuator to implement a predetermined force sensation, such as a vibration, jolt, etc. The host preferably does not send actual force values or directly control the forces of motor 96, and thus cannot alter the magnitude of output forces. Bus 105 can be a standard parallel port interface from the host computer, or the bus can be a serial port that is used to carry serial signals, as explained above.

The host sends the activation signal to coordinate force feedback with events that occur within a computer-implemented process or application program. For example, if an explosion rocks a vehicle the user is controlling in a video game or simulation, the host computer can signal interface device 114 to output force feedback to the user object 34 without regard to the buttons the user is pressing. This adds further functionality over embodiment 100 of FIG. 4*c*, in which the host could only enable or disable force feedback, and could not activate it; in that embodiment, forces triggered from explosions or other events that happen to the user could not be provided. The interface device 114 thus provides yet greater realism in force feedback than the embodiments of FIGS. 4*b* and 4*c* and coordination with the process implemented on host computer 12 since the host can control the actuators in two ways: either enabling or disabling the actuators using control line 104, but letting the user initiate force feedback with a button; or by independently initiating the force feedback regardless of the state of the button. Despite the added functionality, interface device 110 remains low cost and simple, with only a small number of lines from the host needed to control the force feedback and no local microprocessor 26 required. The disadvantage of embodiments 100 and 114 is that specific software is required for host computer 12 to issue enabling and activation commands to the interface device 14.

In alternate embodiments, additional lines of bus 105 can be used for additional functionality. For example, another line, such as the CTS line of an RS-232 interface (normally used for handshaking signals in a serial interface, but used herein as a line in a parallel interface), can be used as the "axis select line" to select particular axes or degrees of freedom in which the force is to be applied. A high signal on the axis select line might indicate that forces are to be applied in both forward/back and left/right axes of a joystick (i.e. two motors), while a low signal might indicate only activate one motor for the left/right axis. Similarly, an additional line (or lines) in the bus 105 can be used to allow the host computer to command a direction of the forces in a particular degree of freedom. Additional lines can also be used to select other motor output configurations. Also, the device 114 can include an additional line in parallel bus 105 to be used as the enable line 104 of FIG. 4c. For example, in the RS-232 interface, the DTR line can be used as the enable line 104, and the TxD line of the RS-232 interface can be used as activation line 120. The RxD line can be used as the "life line" to allow the microprocessor or host to monitor whether the bus has been disconnected, as described above. It should be noted that the RS-232 interface has three lines that are output from the host computer and thus a maximum of three lines can be used as parallel signal lines in bus 105 to interface device 114. If additional control signal lines are needed, the embodiment of FIG. 5, below, can be implemented.

A TxD line can also be used to send more complex host signals that provide a desired force sensation to the user. For example, in the RS-232 interface, a baud rate can be set by a UART on the host computer 12 to establish a rate of transmission of data. Data can be sent as high or low bits on the TxD line at the specified baud rate to turn motors 96 on and off at the desired rate. For example, a byte specified as 01010101 can be provided on line TxD at a baud rate of 9600 bps, so that each bit lasts for ⅟9600=10 ms. Since each "1" bit activates the actuator and each "0" bit deactivates the actuator, a force sensation of vibration results. The frequency of vibration can be adjusted by changing the values or pattern of bits sent and/or by changing the baud rate. In other embodiments, a pulse width modulation (PWM) signal can be sent on the TxD line to control the actuators 30 similarly as described above.

Other interfaces, such as the standard parallel port of host computer 12, can alternatively be used to provide several parallel control signals from the host to the interface device. Alternatively, if a video game console were used as host computer 12, the parallel lines of the control port of the game console can be used, such as the TL, TR, and TL lines of the Sega Saturn control port.

It should be noted that these parallel lines require very little processing by the host computer and require very little communication bandwidth, yet add considerable functionality in correlating force feedback of interface device 14 to application events implemented by the host computer. In addition, all of the embodiments of FIGS. 4b–4f can be used as standard non-force-feedback joysticks or other peripherals that use a standard game port on computers or equivalent ports on other computers or video game consoles.

Figure 5B:
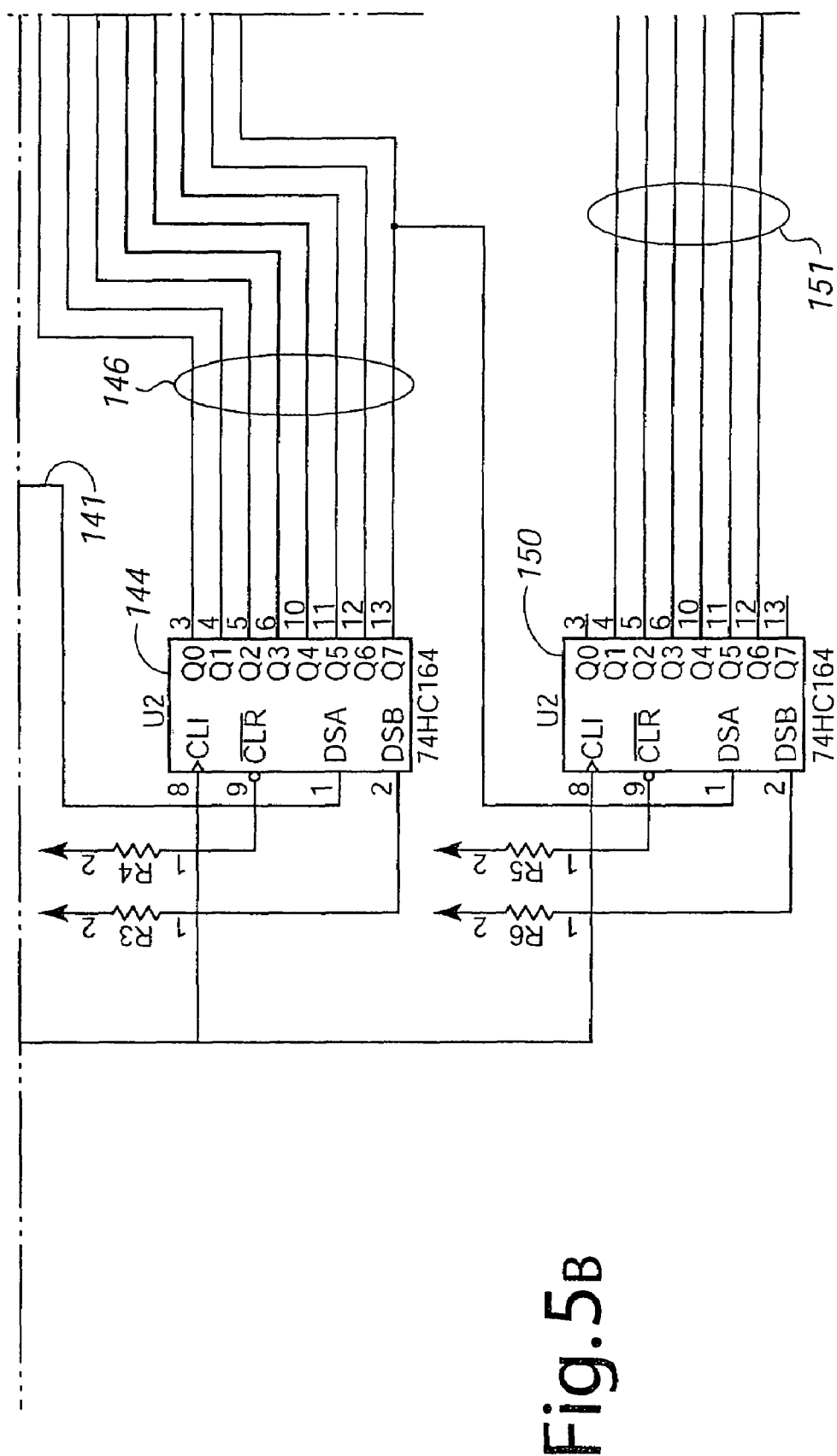
FIG. 5 is a schematic diagram of an alternative low-cost embodiment of the interface device of FIG. 2 having no local microprocessor.
Figure 5C:
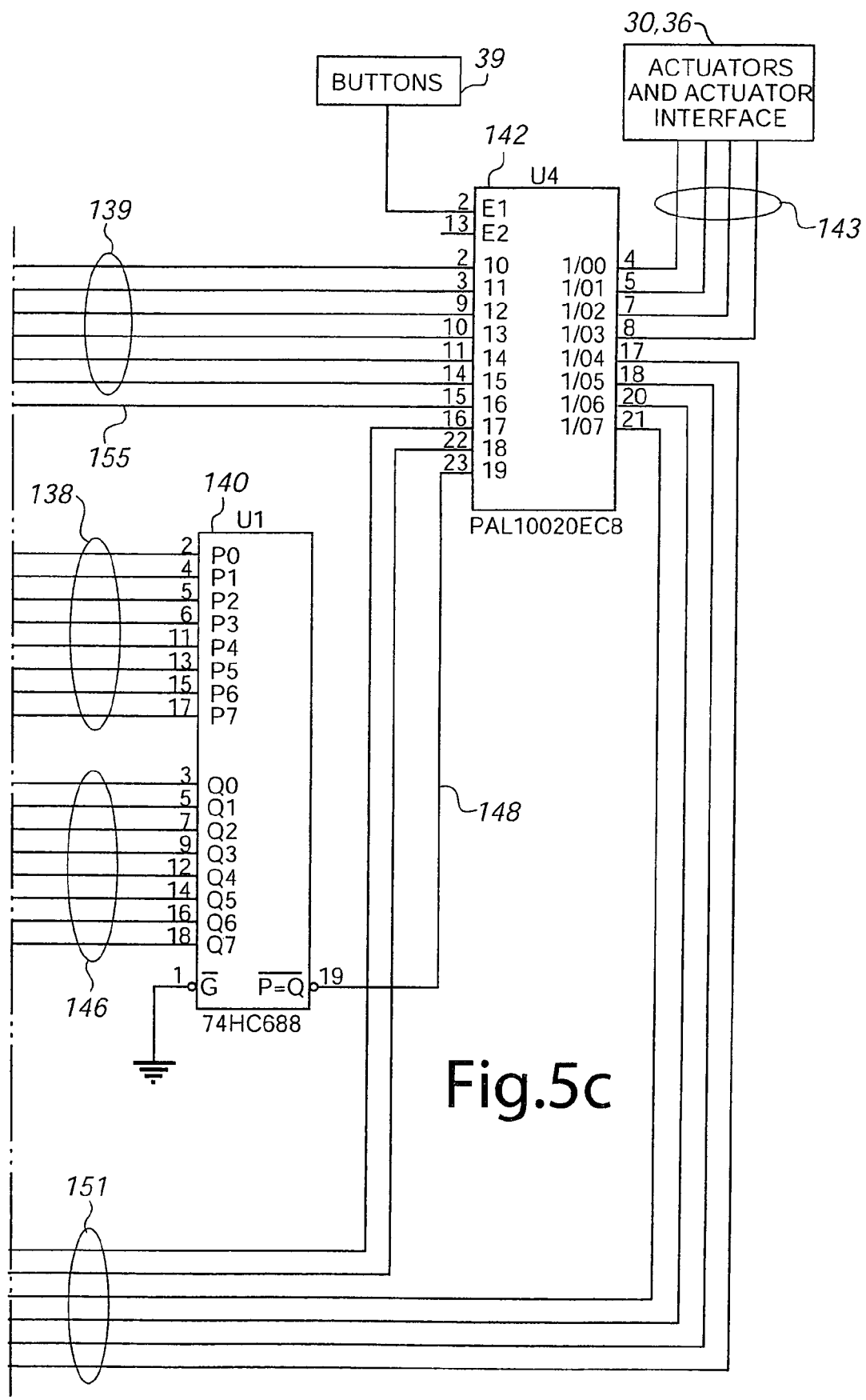

FIG. 5 is a schematic diagram of an alternate embodiment 130 of interface device 14 in which microprocessor 26 is not used in the interface device and where the host computer 12 can more effectively control forces output by actuators 30. This embodiment does not use high level host commands that can be used with the embodiment 80 of FIG. 3, yet this embodiment provides more control signals to the interface device 14 than the embodiments of FIGS. 4a–4f.

Interface device 130 includes a serial interface bus 24 and a game port interface bus 25 (not shown). The game port interface bus (or equivalent) is similar to bus 25 of FIG. 3 and is coupled to potentiometers or similar sensors as described above to provide position data in provided degrees of freedom of user object 34 to the host computer via a game port. In the described embodiment, the interface bus 24 is coupled to a serial port on host computer 12, such as an RS-232 port or similar interface. Alternatively, other interfaces, such as the control port interface of a video game console, can be used.

The interface bus 24 is preferably used to serially transmit host control signals and/or host commands to the interface device 130. However, the standard RS-232 signal lines used for serial transmission are preferably changed in functionality. Signal line TxD is typically used in the RS-232 interface to transmit data in serial fashion, and lines DTR, DSR, and RTS are typically used to send and receive handshaking signals to and from a peripheral. In the present embodiment, line DTR is instead used to serially transmit data, and lines TxD and RTS are used as parallel output control lines having high and low states to allow the host computer to enable and disable functions of the interface device and control forces. The DSR line is used to provide information back to the host. Thus, serial interface bus 24 is used both as a serial bus when transmitting commands over line DTR, and as a parallel bus when utilizing control lines TxD, RTS, and DSR.

DTR line 132 transmits low level host commands serially from the host computer to the interface device 130. DTR line 132 is input to level shifter 134 which converts the RS-232 signal voltage to appropriate logic voltage and outputs the serial data to a first shift register 136. Shift register 136 receives the serial signal at a DSA port and converts the serial information to parallel bits on 8-bit parallel bus 138. The parallel bus 138 is coupled to input ports P0–P7 of an address comparator 140. Also, a bus 139 is coupled to the six bit lines of parallel bus 138 between the most and least significant bit lines. Bus 139 is coupled to input ports of a programmable array logic (PAL) chip 142. In addition, the most significant bit (MSB) line 141 of the parallel bus 138 is coupled to the input DSA port of a second shift register 144. The second shift register 144 converts the input information on line 141 to parallel bits which are output on 8-bit parallel bus 146. Bus 146 is coupled to logic comparator 140 at input ports Q0–Q7.

The shift registers 136 and 144 and comparator 140 provide a circuit for determining when a new byte (actually six bits) of data has been received and is ready to be processed by PAL 142. The shift registers 136 and 144 are cascaded such that shift register 144 receives the bits shifted out of shift register 136. The output bytes on parallel buses 138 and 146 are compared by comparator 140. When the two bytes are identical, a new byte has been fully shifted in and is ready to be processed by PAL 142.

To determine when a full new byte has been input, the most significant bit and the least significant bit of an input byte are provided as "matching bits." The matching bits are used to check when the new byte has been shifted into shift registers 136 and 144, and can be either a 1 (high) value or a 0 (low) value. The host computer 12 preferably inserts a pair matching bits around each 6 bits of data that it transmits serially on DTR line 132. The process of shifting serial data in the two shift registers is described with respect to Table 1, below.

TABLE 1

| | First Shift Register | | | | | | | | Second Shift Register | | | | | | | |
|---|---|---|---|---|---|---|---|---|---|---|---|---|---|---|---|---|
| | Q0 | Q1 | Q2 | Q3 | Q4 | Q5 | Q6 | Q7 | Q0 | Q1 | Q2 | Q3 | Q4 | Q5 | Q6 | Q7 |
| (a) | 1 | X0 | X1 | X2 | X3 | X4 | X5 | 1 | 1 | X0 | X1 | X2 | X3 | X4 | X5 | 1 |
| (b) | 0 | 1 | X0 | X1 | X2 | X3 | X4 | X5 | 1 | 1 | X0 | X1 | X2 | X3 | X4 | X5 |
| (c) | Y3 | Y4 | Y5 | 0 | 1 | X0 | X1 | X2 | X3 | X4 | X5 | 1 | 1 | X0 | X1 | X2 |
| (d) | Y0 | Y1 | Y2 | Y3 | Y4 | Y5 | 0 | 1 | X0 | X1 | X2 | X3 | X4 | X5 | 1 | 1 |
| (e) | 0 | Y0 | Y1 | Y2 | Y3 | Y4 | Y5 | 0 | 1 | X0 | X1 | X2 | X3 | X4 | X5 | 1 |
| (f) | Y2 | Y4 | Y5 | 0 | 0 | Y0 | Y1 | Y2 | Y3 | Y4 | Y5 | 0 | 1 | X0 | X1 | X2 |
| (g) | Y0 | Y1 | Y2 | Y3 | Y4 | Y5 | 0 | 0 | Y0 | Y1 | Y2 | Y3 | Y4 | Y5 | 0 | 1 |
| (h) | 0 | Y0 | Y1 | Y2 | Y3 | Y4 | Y5 | 0 | 0 | Y0 | Y1 | Y2 | Y3 | Y4 | Y5 | 0 |

Table 1 shows the outputs Q0–Q7 of the shift registers 136 and 144 at various stages (a)–(h) when bits of data are being input from the serial data stream on the DTR line 132. The system begins at initial stage (a), in which the outputs Q0–Q7 of register 136 exactly match the outputs Q0–Q7 of register 144. When such an exact match occurs and is read by comparator 140 on buses 138 and 146, the comparator outputs a low signal on line 148 to PAL 142 that indicates a valid, full new byte has been shifted in.

The next bit from the serial data stream is shifted into Q0 of register 136 at stage (b). This is a matching bit since it is the beginning of a new byte of data. This matching bit is intentionally set to zero, the opposite of the matching bits of stage (a), so that a match will not be found with the previous bytes. The other values in the shift registers have all been shifted one output to the right, and the MSB (1) that was at Q7 of the second shift register in stage (a) is discarded.

At stage (c), three more bits Y5, Y4, and Y3 have been shifted in from the serial data stream and the previous bits have been shifted three places to the right. Each of these bits can have either a low or a high value depending on which commands the host computer has sent and how the bits are interpreted. At stage (d) three more bits Y2, Y1 and Y0 have been shifted into the first shift register and the other bits have been correspondingly shifted. At stage (e), the final matching bit of the new byte of data is shifted in. This match bit is intentionally made to be "0" so that no match will occur with the matching bits of the byte in the second shift register.

Although a full new byte has been shifted into the first register at stage (e), there is no match of bits between the first and second registers. Therefore, to recreate a match condition, the host computer 12 shifts the same data byte Y5–Y0 and matching bits (0) into the first register in stages (f)–(h). Until stage (h), the bits of the two registers will not exactly correspond. At stage (h), the bits exactly correspond to indicate a match condition, and comparator 140 outputs a signal on line 148 to indicate to PAL 142 that a new byte has been fully shifted in and validated. PAL 142 then processes the current bits on bus 139 (i.e., bits Y5–Y0) as the new input "byte." Note that PAL 142 continually receives bits on bus 139 throughout the shifting process but only actually processes the incoming data that is present when the validating signal on line 148 is received. New bytes in the data stream are similarly compared and processed by PAL 142 when they have been verified. Note that the host computer should alternate the matching bit of the next byte after stage (h) to a value of "1" so that no match will occur with the present matching bits of "0."

The PAL 142 can process the six bits of information in a variety of ways. Preferably, logic is provided in PAL 142 to process each incoming bit as a control signal or "control bit", so that, effectively, six control signals are received over the serial bus. The six control lines are an improvement over the embodiment of FIG. 4f, which allows only three parallel control signals to be sent over an RS-232 line as explained above. The host can thus control a greater variety of parameters and characteristics of forces using the greater number of control lines. For example, each control bit can control a separate parameter such as an enable signal for actuators 30, a selection bit determining which degrees of freedom are to be provided with forces, or an enable signal to allow buttons 39 to activate forces. Buttons 39 preferably input a signal on line 145 to PAL 142 so that the PAL can directly determine when any of the buttons have been pressed by the user. For example, if a button has been pressed, a validating signal has been received on line 148, and all of the appropriate enable signals from the host have been provided, then the PAL can cause the actuators to output forces on user object 34. If any of these conditions are false, preferably no forces are output.

The PAL includes the appropriate logic to send the control bits to the appropriate components in the interface device 130 using output lines 143, such as actuators 30 and interface 36 or other logic. For example, an enable signal can be sent directly from PAL 142 to actuator interface 36.

Alternatively, low level host commands, such as actual force values, can be sent by the host on serial DTR line 132 to converted to forces output by the actuators. The PAL can include logic to convert the low-level commands to force values and send the force values to the appropriate components in the interface device 130 using output lines 143, such as actuators 30 and interface 36 or other logic. Some of the lines of parallel bus 139 can be utilized as control bits, while other lines can be used to provide a force value or other low level command. Such logic for PAL 142 can be implemented using techniques well-known to those skilled in the art.

In other embodiments, additional lines can be included in bus 139 to provide additional control bits to PAL 142. Also, additional shift registers can be added in alternate embodiments, such as shift register 150. Register 150 is cascaded with second shift register 144 and receives the most significant bit from the second shift register. Using shift register 150 and/or additional shift registers, more incoming data bits can be sent to the PAL at one time, thus providing more control lines to the interface device 130 and/or increasing the speed of processing the input host commands. Additional shift registers such as register 150 can output bits directly to PAL 142; for example, shift register 150 outputs bits to PAL 142 on bus 151 similarly to the bits on parallel bus 139. Since the first and second shift registers 136 and 144 can check when new bytes have shifted in, the additional shift registers do not need to compare their bytes to the bytes of the other shift registers.

In an alternate embodiment, latching shift registers can be used. The latches on the outputs of such shift registers can hold the values until all the values have shifted in, and then send out the parallel data. Only one such shift register need be provided to send the six control bits to PAL 142. However, latching shift registers also require an additional latch clock signal to latch the data. One of the lines of the RS-232 interface can be used as a latch clock signal, such as the TxD signal. However, since the TxD signal is preferably used for other functionality in the present embodiment (as described below), there is not a convenient line available to use as a latch clock line in an RS-232 interface. The matching shift register embodiment described above is therefore more appropriate to the described embodiment and is less expensive than a latching shift register embodiment as well. In other embodiments using a different, non-RS-232 interface bus 24, latching shift registers may be more appropriate.

Host computer 12 also sends signals on TxD line 155 to the interface device 130. Level shifter 154 receives the TxD line 155 from the RS-232 interface bus 24. The TxD line 155 is input to PAL 142 and is used to enable or activate the motors similarly to the embodiment of FIGS. 4c and 3c. The TxD line 155 can also be used to send more complex host signals that provide a desired force sensation to the user. For example, a baud rate can be set by a UART on the host computer 12 to establish a rate of transmission of data. Data can be sent as high or low bits on the TxD line at the specified baud rate to turn actuators 30 on and off at the desired rate, as described above with reference to FIG. 4f. Or, a pulse width modulation (PWM) signal can be sent on TxD line 155 to control the actuators 30 as described above.

The RTS line 152 is input to level shifter 134 and is provided as a clock signal for the shift registers 136 and 144 (and 150, if present) to set the rate of shifting the input bits and providing them to the PAL 142. The clock signal on the RTS line is provided by the host computer at a predetermined frequency. Thus, the RS-232 interface in the current embodiment is used for synchronous serial communication instead of the asynchronous serial communication for which it is normally used.

DSR line 156 is used in the described embodiment as a parallel communication line to provide information to host computer 12. Preferably, the host computer can use DSR line 156 to verify that the interface device 130 exists and is connected to the serial interface bus 24, for safety and other reasons as described above. DSR line 156 is coupled to output Q0 of first shift register 136 and is connected to level shifter 154 to convert the logic level signal to an RS-232 voltage level. The data on DSR line 156 is output from level shifter 154 to host computer 12. The bit on line 156 changes as serial data is clocked into the shift registers on DTR line 132 as described above. The state of the DSR line can thus be clocked back to the host over the interface bus 24. To check whether the interface device 130 is connected, the host can read the DSR line 156 and set the data DTR line to a bit of the opposite state. At this point, the DSR line should still be in its original state. The host would then provide a clock pulse on the RTS line and check to see that the DSR line changes to the same state as the DTR line. If so, the connection between the host and interface device has been verified. If the DTR line does not change states, the interface device may be disconnected. This test can be provided for both states of the DTR data to verify a consistent response.

Control "loop back" lines of a serial or parallel port can be used by the host computer to verify the identity of the interface device 130, especially when non microprocessor 26 is present to provide an identification signal for the interface device. Preferably, non-standard output and input lines of the interface bus are used so that the interface device will not be confused with other types of devices that can be connected to the host computer. For example, when the host wishes to determine what type of peripheral is connected to its serial port, the host can send out a signal on an output line and check the non-standard input line; if the sent signal is detected, then the host knows that the interface device 14 or 130 is connected. This feature can also be used in the embodiments of FIGS. 4a–4f and in other embodiments that do not include a microprocessor 26.

It should be noted that different and equivalent signals to the RS-232 signals described above can be used in alternate embodiments of interface device 130. For example, equivalent signals on RS-422 or video game interfaces can be used similarly.

The embodiment 130 of the interface device has several advantages. Since no local microprocessor 26 or UART are needed in interface device 130, the cost of the interface device is reduced greatly. The implementation of a serial data stream allows the host to send a greater number of control signals and have much greater control than in the embodiments of FIGS. 4a–4f. Many more types of commands can be sent by the host using the serial interface than the three maximum commands allowed in the parallel bus implementation of an RS-232 interface in the above "recoil" embodiments. Also, force values or other commands can be sent by the host to better control the actuators. In addition, the logic components of interface device 130 shown in FIG. 5 can be readily provided on a single chip implemented as an ASIC or FPGA. This allows the circuitry for interface device 130 to be manufactured in high volume at a very low cost.

Figure 6:
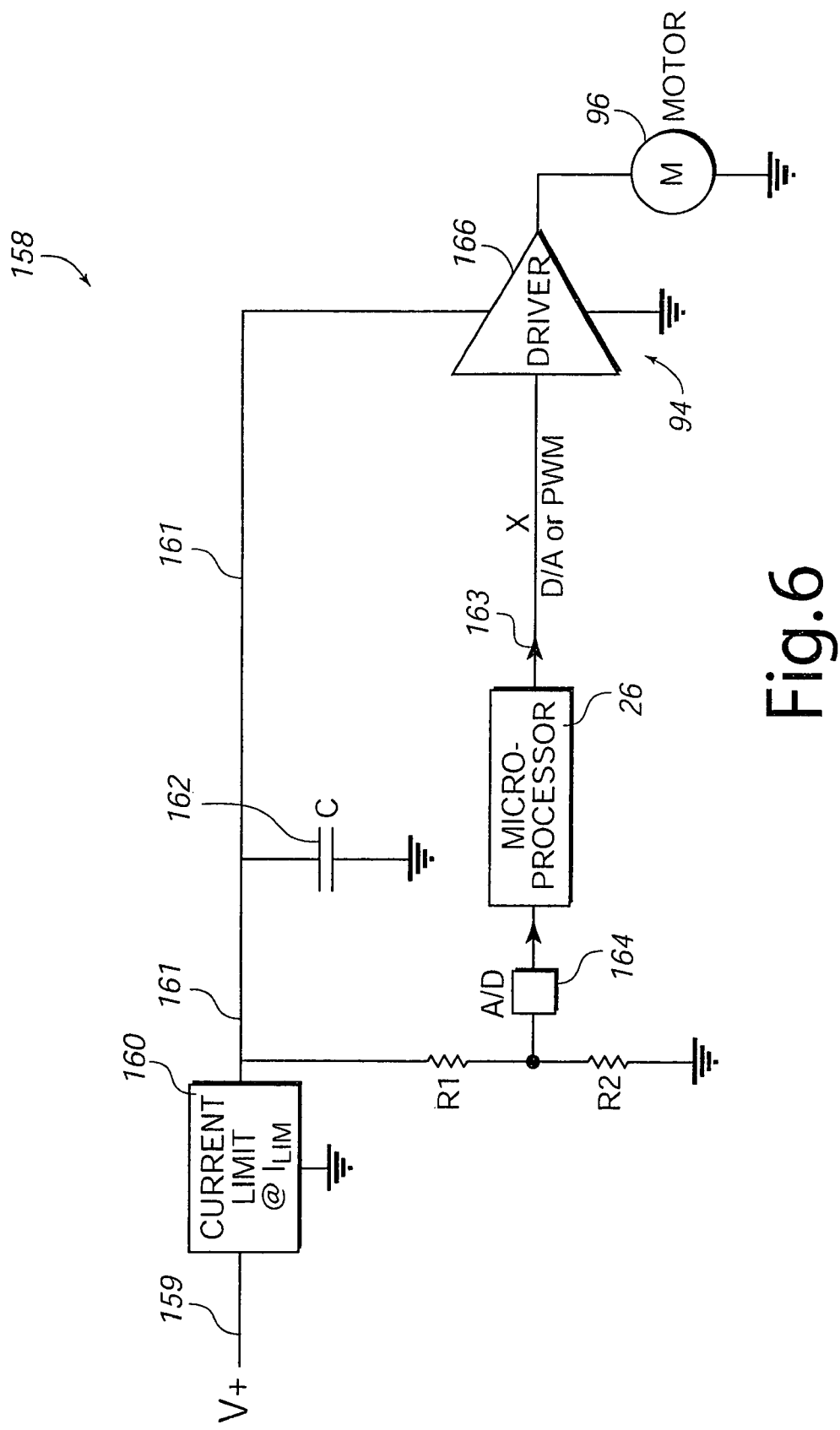
FIG. 6 is a block diagram of a power circuit of the present invention for use with a force feedback interface device.

FIG. 6 is a schematic diagram illustrating a low-cost and compact power circuit 158 of the present invention used for implementing force feedback in interface device 14. Power circuit 158 includes a current limiter 160, a capacitor 162, and an optional analog-to-digital converter 164. Motor 96 (or other type of active actuator) and motor interface 94 are substantially similar to the equivalent components described in the embodiments of FIGS. 2–5.

A voltage V is provided on a line 159. Line 159 can be a line connected to a power supply such as power supply 41, or to the power signal of a game port interface 25. Line 159 can also be connected to a peripheral interface port of video game consoles such as the Sega Saturn or the Sony PlayStation. Line 159 is input to current limiter 160, which can be implemented with several components well known to those skilled in the art. Current limiter 160 limits the current of the input voltage signal on line 159 to a maximum current of $I_{LIM}$. This current has been previously determined to be the desired current to charge the capacitor 162, as shown in Table 2 below.

Capacitor 162 is coupled between an output of current limiter 160 and ground. The capacitor has a capacitance C that has been selected to provide the desired charging characteristics. For example, in the described embodiment, C can be 2,000 to 10,000 microfarads. The factors determining C and other component values are described in greater detail below. Capacitor 162 stores energy from the current-limited signal on line 161 until it is fully charged. The line 161 also is coupled to a voltage bias input of an amplifier 166 included in an actuator interface 94. The capacitor 162 and amplifier ("driver") circuit 166 are configured in such a way so as to allow capacitor C to supply power to the amplifier to amplify a control signal input to the amplifier.

Resistors R1 and R2 are coupled between the output of current limiter 160 and ground. Optional A/D converter 164 has an input coupled to the node between resistors R1 and R2 and has an output coupled to microprocessor 26. Microprocessor 26 receives the digital signal from the A/D converter at an analog input pin. Microprocessor 26 also sends out a motor control signal on line 163 to activate motor 96, similarly to the above-described embodiments.

The power circuit 158 operates as follows. The voltage V from power supply is limited as described above by current limiter 160. The limited voltage signal is output on line 161 and charges capacitor C. The current-limited voltage signal is also provided to the A/D converter 144 which provides a digital representation of the signal to the microprocessor 26. The microprocessor monitors this signal to determine the current charging state of the capacitor 162; the voltage magnitude is indicative of the amount of charge stored in the capacitor. When enough power has been charged in the capacitor to drive motor 96, and if the microprocessor has determined that it is an appropriate time to output forces on user object 34, then the microprocessor signals the motor to be activated on line 163. The activation signal from the microprocessor 26 can be, for example, an analog signal from a D/A converter on the microprocessor, or could be a pulse width modulation (PWM) signal. The power in the capacitor is provided to amplifier 166 and is used to amplify the signal from the microprocessor and drive the motor 96.

The present power circuit configuration offers several advantages over standard prior art power supplies used for force feedback. It has been found that human perception of force sensations is highly focused on transient forces rather than constant forces. For example, a human will easily perceive a change in force but will not as easily sense a steady-state, continuous force. In terms of a force feedback interface device, if an intense force is desired to be output to the user operating the device, then only a short jolt or pulse of force (i.e., change in force) is actually necessary for the user to detect that force; maintaining a continuous magnitude of force over time is not as critical, since the user will not as readily detect that constant force after the change in force has occurred.

This human perceptual condition is highly relevant to the present power circuit. Using the energy stored in capacitor 162 to power amplifier 166, a change in force can be created for a short period of time as the capacitor discharges its energy. Using the added power from the capacitor, the motor 96 can output a stronger force than when using the power supply 41 or other source alone. Thus, strong jolts or other force sensations can be provided above the power supply's maximum force level of the interface device. These sensations do not have to be maintained for very long, since the user will more readily sense the change in force rather than any continuous stronger force output, so that the user can be fooled into thinking a stronger force has been and continues to be output.

This operation can be advantageous in that a smaller power supply can be used to power the motors. The capacitor power can be provided to achieve, for a short period of time, levels of force as great as a larger power supply would provide. A smaller power supply would allow the interface device to be much smaller, less expensive, and lightweight, which are ideal characteristics for force feedback devices intended for the mass market. In addition, since such a smaller power supply would only output the larger magnitude forces for short periods of time instead of continuously, the force feedback device would be safer for the user to operate.

In an ideal embodiment, a power supply 41 would not be required at all when using the power circuit 158. Power can be drawn directly from the host computer 12 over the game port interface 25 or other interface that supplies power from the host computer, such as a USB interface. This power can be supplemented by using the capacitor 162 when high-magnitude forces are required to be output by motor 96. The elimination of a separate power supply 41 allows the interface device to a great deal smaller and less expensive to manufacture, as well as being more convenient for a typical user to operate.

Since the capacitor 162 discharges its energy when the motor is activated, it must be charged again before it is again operative to power the motor 96. The charging time is significant to the design since the microprocessor is limited in the frequency and control of forces according to when the capacitor is ready to provide power. Several different capacitances C of capacitor 162 and other parameters in the circuit have been varied to determine efficient configurations of the circuit.

Table 2 shows sample pulse durations and recharge times for various configurations of supply voltages, currents, and storage capacitances (C).

TABLE 2

| | Configurations | | | |
|---|---|---|---|---|
| | 1 | 2 | 3 | 4 |
| Input Supply Voltage V | 12 | 5 | 12 | 24 |
| Minimum Driver Vcc | 5 | 3 | 5 | 5 |
| Input Current Limit $I_{LIM}$ (mA) | 300 | 300 | 500 | 200 |
| Storage Capacitance C (μF) | 4700 | 10000 | 4700 | 2000 |
| Steady-State Current $I_{SS}$ (mA) | 200 | 200 | 250 | 100 |
| Pulse Current (mA) | 2000 | 2000 | 2000 | 2000 |
| Max Pulse Time (ms) | 19 | 12 | 22 | 21 |
| Recharge Time (ms) | 329 | 200 | 132 | 380 |

Table 3 shows sample storage capacitances and recharge times for various supply voltages, currents, and a pulse duration.

TABLE 3

| | Configurations | | | |
|---|---|---|---|---|
| | 1 | 2 | 3 | 4 |
| Input P. Supply Voltage (V) | 12 | 5 | 12 | 24 |
| Minimum Driver Vcc | 5 | 3 | 5 | 5 |
| Input Current Limit $I_{LIM}$ (mA) | 300 | 300 | 500 | 200 |
| Storage Capacitance C (μF) | 2429 | 8500 | 2143 | 947 |
| Steady-State Current $I_{SS}$ (mA) | 200 | 200 | 250 | 100 |
| Pulse Current (mA) | 2000 | 2000 | 2000 | 2000 |
| Max Pulse Time (ms) | 10 | 10 | 10 | 10 |
| Recharge Time (ms) | 170 | 170 | 60 | 180 |

As shown from Tables 2 and 3, a storage capacitor can supply enough power to provide a significant increase in output force magnitude. For example, as shown in Configuration 4 of Table 1, a 2000 uF capacitor 162 can provide 2000 mA of pulse current to create a jolt force with motor 96 for 21 milliseconds when using a 24 V, 200 mA (Iss) power supply. This allows a jolt force of 10 times the magnitude the power supply alone could output. A charge time of 380 milliseconds does not delay the force jolts significantly for many applications. Note that many different configurations and/or values of the parameters shown in Tables 2 and 3 can be used, and other parameters not shown in the tables can be varied in other embodiments.

Using additional and/or different capacitors 162, as well as additional and/or different power supplies 41, a variety of durations and magnitudes of forces can be created using a combination of capacitor storage abilities and power supply outputs. In addition, multiple motors of interface device 14 can each be provided with its own capacitor circuit to provide power for a dedicated motor.

In an alternative embodiment, microprocessor 26 can be eliminated from the interface device 14. For example, the "recoil" interface devices of FIGS. 4*a*–4*f* provide force feedback without the use of microprocessor 26. In such an embodiment, A/D converter 164 does not need to be used. The recharge time can be estimated and the motor can be deactivated using a timing circuit, for example, until the capacitor is fully charged. In yet other embodiments, the microprocessor 26 can be omitted and the A/D converter 164 can send the converted digital signals to the host computer 12, which determines when the capacitor is fully charged and sends an output activation or enable signal to motor 96 when appropriate.

Figure 7:
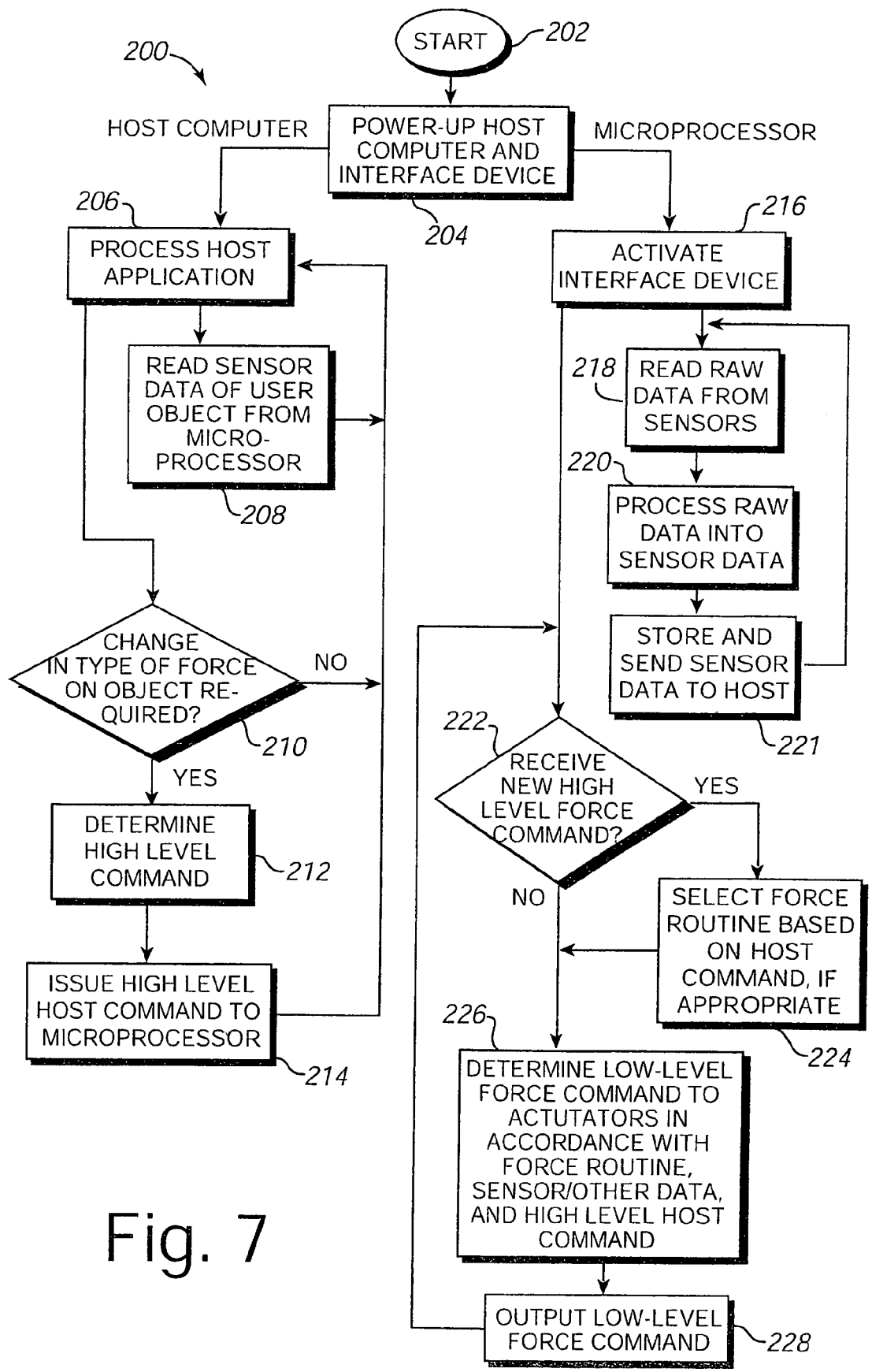
FIG. 7 is a flow diagram illustrating an embodiment of a method of the present invention for controlling a force feedback interface device.

FIG. 7 is a flow diagram illustrating a method 200 for controlling a force feedback interface device of the present invention using microprocessor 26, such as in the interface devices as described with respect to FIG. 2 and FIG. 3. In addition, this method can be adapted for some embodiments not including microprocessor 26, such as the recoil embodiments of FIGS. 4*a*–*f* or embodiment 130 of FIG. 5. In such an embodiment, the microprocessor steps of the process can be implemented by logic or other components, such as in PAL 142 or control block 102.

The process of FIG. 7 is suitable for low speed communication interfaces, such as a standard RS-232 serial interface. However, the embodiment of FIG. 7 is also suitable for high speed communication interfaces such as USB, since the local microprocessor relieves computational burden from host processor 16. In addition, this embodiment can provide a straightforward command protocol, an example of which is described with respect to patent application Ser. No. 08/556,282, incorporated by reference herein, and which allows software developers to easily provide force feedback in a host application. In this reflex embodiment, for example, the slower "interrupt data transfers" mode of USB can be used.

The process of FIG. 7 begins at 202. In step 204, host computer system 12 and interface device 14 are powered up, for example, by a user activating power switches. After step 204, the process 200 branches into two parallel (simultaneous) processes. One process is implemented on host computer system 12, and the other process is implemented on local microprocessor 26. These two processes branch out of step 204 in different directions to indicate this simultaneity.

In the host computer system process, step 206 is first implemented, in which an application program is processed or updated. This application can be a simulation, video game, scientific program, operating system, or other software program. Images can be displayed for a user on output display screen 20 and other feedback can be presented, such as audio feedback.

Two branches exit step 206 to indicate that there are two processes running simultaneously (e.g., multi-tasking, etc.) on host computer system 12. In one of the processes, step 208 is implemented, where sensor data describing the user object is received by the host computer from local microprocessor 26. The local processor 26 continually receives raw data from sensors 28, processes the raw data, and sends processed sensor data to host computer 12. Alternatively, local processor 26 sends raw data directly to host computer system 12. "Sensor data," as referred to herein, can include position values, velocity values, and/or acceleration values derived from the sensors 28 which describe motion of object 34 in one or more degrees of freedom. In addition, any other data received from other input devices 39 can also be considered "sensor data" in step 208, such as signals indicating a button on interface device 14 has been pressed by the user. Finally, the term "sensor data" also can include a history of values, such as position values recorded previously and stored in order to calculate a velocity.

Host computer system 12 receives either raw data (e.g., position data and no velocity or acceleration data) or processed sensor data (position, velocity and/or acceleration data) from microprocessor 26 in step 208. In addition, any other sensor data received from other input devices 39 can also be received by host computer system 12 from microprocessor 26 in step 208, such as signals indicating a button on interface device 14 has been pressed by the user. The host computer does not need to calculate force values from the received sensor data in step 208. Rather, host computer 12 monitors the sensor data to determine when a change in the type of force is required. This is described in greater detail below. Of course, host computer 12 also uses the sensor data as input for the host application to update the host application accordingly.

After sensor data is received in step 208, the process returns to step 206, where the host computer system 12 can update the application program in response to the user's manipulations of object 34 and any other user input received as sensor data in step 208 as well as determine if one or more force commands need to be output to object 34 in the parallel process (step 210). Step 208 is implemented in a continual loop of receiving sets of sensor data from local processor 26. Since the host computer does not need to directly control actuators based on sensor data, the sensor data can be provided to the host at a low speed. For example, since the host computer updates the host application and images on display screen 20 in response to sensor data, the sensor data need only be read at 60–80 Hz (the refresh cycle of a typical display screen) compared to the much higher rate of about 500–1000 Hz (or greater) that would be required to realistically control force feedback signals directly from the host.

The second branch from step 206 is concerned with the process of the host computer determining high-level or supervisory force commands ("host commands") to provide force feedback to the user manipulated object 34.

The second branch starts with step 210, in which the host computer system checks if a change in the type of force applied to user object 34 is required. The "type" of force is intended to generically refer to different force sensations, durations, directions, or other high-level characteristics of forces, or changes in these characteristics, which are controlled by the host computer. For example, a force sensation or profile are types of forces produced by a particular force routine which the local microprocessor 26 can implement independently of the host computer.

The host computer 12 determines whether a change in the type of force is required according to several criteria, the most important of which are the sensor data read by the host computer 12 in step 208, timing data, and the implementation or "events" of the application program updated in step 206. The sensor data read in step 208 informs the host computer how the user is interacting with the application program and when new types of forces should be applied to the object based on the object's current position, velocity, and/or acceleration. The user's manipulations of object 34 may have caused a new type of force to required. For example, if the user is moving a virtual race car within a virtual pool of mud in a video game, a damping type of force should be applied to the object 34 as long as the race car moves within the mud. Thus, damping forces need to be continually applied to the object, but no change in the type of force is required. When the race car moves out of the pool of mud, a new type of force (i.e. a removal of the damping force in this case) is required. The velocity and/or acceleration of the user object can also influence whether a change in force on the object is required. If the user is controlling a tennis racket in a game, the velocity of a user object joystick may determine if a tennis ball is hit and thus if an appropriate force should be applied to the joystick.

Other criteria for determining if a change in the type of force is required includes events in the application program. For example, a game application program may (perhaps randomly) determine that another object in the game is going to collide with a computer object controlled by the user, regardless of the position of the user object 34. Forces should thus be applied to the user object in accordance with this collision event to simulate an impact. A type of force can be required on the user object depending on a combination of such events and the sensor data read in step 208. Other parameters and inputs to the application program can determine if a change in force to the user object is necessary, such as other input devices or user interface devices connected to host computer system 12 which input data to the application program (other interface devices can be directly connected, connected remotely through a network, etc.).

If no change in the type of force is currently required in step 210, then the process returns to step 206 to update the host application and return to step 210 to again check until such a change the type of force is required. When such a change is required, step 212 is implemented, in which host computer 12 determines an appropriate high-level host command to send to microprocessor 26. The available host commands for host computer 12 may each correspond to an associated force routine implemented by microprocessor 26. For example, different host commands to provide a damping force, a spring force, a gravitational pull, a bumpy surface force, a virtual obstruction force, and other forces can be available to host computer 12. These host commands can also include a designation of the particular actuators 30 and/or degrees of freedom which are to apply this desired force on object 34. The host commands can also include other command parameter information which might vary the force produced by a particular force routine. For example, a damping constant can be included in a host command to designate a desired amount of damping force, or a direction of force can be provided. The host command may also preferably override the reflex operation of the processor 26 and include "low-level" force commands, such as direct force values, that can be sent directly to the actuators 30 (described below with respect to step 226).

A preferred command protocol and detailed description of a set of host commands is described in co-pending patent application Ser. No. 08/566,282. Preferably, the commands include direct host commands, "reflex" commands, and custom effects. Some desirable direct host commands include JOLT (a short force pulse), WOBBLE (random force), SPRING (a virtual spring), DAMPER (a damping force), and so on. Each command preferably includes parameters which help the host specify the characteristics of the desired output force. These commands would cause the microprocessor to instantly output the commanded force according to the appropriately-selected force routine. "Reflex" commands, in contrast, provide conditions to the microprocessor so that the desired force is output when the conditions are met. For example, a reflex command of Jolt Button Reflex can instruct the microprocessor to select a force routine that outputs a JOLT force only when a specified button is pressed by the user (or, when the user object is moved in a particular direction). Finally, custom effects can be provided to the microprocessor by the host and then commanded to be output. For example, the host computer can download to the microprocessor a set of force values (a force profile) as a "force profile file" or other collection of data using a host command LOAD_PROFILE, and which can be stored in local memory 27. A separate host command PLAY_PROFILE could then be sent to instruct the microprocessor to output the downloaded force profile as forces on user object 34. Reflex commands can also be used to cause the downloaded profile to be output only when a condition, such as a button press, occurs. Preferably, a force profile file includes an array of force values, size information about the size of the data, and timing information for when to output the various force values (preferably, the force values have "+" or "−" signs to indicate the direction of forces; alternatively, directions can be separately indicated). Numerous force profile files can be downloaded to the microprocessor, and the microprocessor can send back an index or other information to inform the host how to select a particular force profile file. Custom effects can also be downloaded over a computer network, such as the World Wide Web, as described below.

In next step 214, the host computer sends the host command to the microprocessor 26 over bus 24 (or bus 25, if appropriate). The process then returns to step 206 to update the host application and to return to step 210 to check if another change in force is required.

In addition, the host computer 12 preferably synchronizes any appropriate visual feedback, auditory feedback, or other feedback related to the host application with the issuance of host commands and the application of forces on user object 34. For example, in a video game application, the onset or start of visual events, such as an object colliding with the user on display screen 20, should be synchronized with the onset or start of forces felt by the user which correspond to or complement those visual events. The onsets visual events and force events are preferably occur within about 30 milliseconds (ms) of each other. This span of time is the typical limit of human perceptual ability to perceive the events as simultaneous. If the visual and force events occur outside this range, then a time lag between the events can usually be perceived. Similarly, the output of auditory signals, corresponding to the onset of auditory events in the host application, are preferably output synchronized with the onset of output forces that correspond to/complement those auditory events. Again, the onsets of these events occur preferably within about 30 ms of each other. For example, host computer system 12 can output sounds of an explosion from speakers 21 as close in time as possible to the forces felt by the user from that explosion in a simulation. Preferably, the magnitude of the sound is in direct (as opposed to inverse) proportion to the magnitude of the forces applied to user object 34. For example, during a simulation, a low sound of an explosion in the far (virtual) distance can cause a small force on user object 34, while a large, "nearby" explosion might cause a loud sound to be output by the speakers and a correspondingly large force to be output on object 34.

The second process branching from step 204 is implemented by the local microprocessor 26. This process starts with step 216 and is implemented in parallel with the host computer process of steps 206–214 described above. In step 216, the interface device 14 is activated. For example, signals can be sent between host computer 12 and interface device 14 to acknowledge that the interface device is now active and can be commanded by host computer 12. From step 216, two processes branch to indicate that there are two processes running simultaneously (e.g., multi-tasking) on local microprocessor 26.

In the first process branch, step 218 is implemented, in which the processor 26 reads raw data (sensor readings) from sensors 28. Such raw data preferably includes position values describing the position of the user object along provided degrees of freedom. In the preferred embodiment, sensors 28 are relative sensors that provide position values describing the change in position since the last position read. Processor 26 can determine the absolute position by measuring the relative position from a designated reference position. Alternatively, absolute sensors can be used. In other embodiments, sensors 28 can include velocity sensors and accelerometers for providing raw velocity and acceleration values of object 34. The raw data read in step 218 can also include other input, such as from an activated button or other control 39 of interface device 14.

In other embodiments such as the interface device 50 of FIG. 3 and the embodiments of FIGS. 4a–f and 5, either raw data or processed sensor data from sensors 28 can be sent directly to host computer 12 without being received by microprocessor 26. The host can perform any processing that is necessary to interpret the sensor data in these embodiments, such that any or all of steps 218–221 may not be necessary.

In next step 220, microprocessor 26 processes the received raw data into sensor data, if applicable. In the preferred embodiment, this processing includes two steps: computing velocity and/or acceleration values from raw position data (if velocity and/or acceleration are needed to compute forces), and filtering the computed velocity and acceleration data. The velocity and acceleration values are computed from raw position data received in step 218 and a history of stored position and time values (and other types of values, if appropriate). Preferably, processor 26 stores a number of position values and time values corresponding to when the position values were received. Processor 26 can use, for example, local clock 21 to determine the timing data. The velocity and acceleration can be computed using the stored position data and timing data, as is well known to those skilled in the art. The calculated velocity and/or acceleration values can then be filtered to remove noise from the data, such as large spikes that may result in velocity calculations from quick changes in position of object 34. Thus, the sensor data in the described embodiment includes position, velocity, acceleration, and other input data. In an alternate embodiment, circuitry that is electrically coupled to but separate from processor 26 can receive the raw data and determine velocity and acceleration. For example, an application-specific integrated circuit (ASIC) or discrete logic circuitry can use counters or the like to determine velocity and acceleration to save processing time on microprocessor 26. In embodiments where velocity and/or acceleration sensors are used, the calculation of velocity and/or acceleration is omitted.

In next step 221, the processor 26 sends the processed sensor data to host computer 12 and also stores histories of the sensor data in storage devices such as memory 27 for computing forces. The process then returns to step 218 to read raw data. Steps 218, 220 and 221 are thus continuously implemented to provide current sensor data to processor 26 and host computer 12.

The second branch from step 216 is concerned with a "reflex process" or "reflex" in which microprocessor 26 controls the actuators 30 to provide forces to object 34. As mentioned above, a "reflex process" is a force process that outputs forces on user object 34 and is implemented locally to interface device 14, is independent of host computer 12, and depends only on local control events, such as buttons being pressed or user object 34 being moved by the user. The most simple form of reflex is used in the "recoil" embodiments of FIGS. 4a–4f, in which a simple control event, such as the push of a button by the user, causes a force to be output on the user object by actuators 30. The more complex form of reflex process, described in the current method, can calculate and output forces depending on a variety of local control events, such as button presses and the position, velocity, and/or acceleration of user object 34 in provided degrees of freedom.

The second branch starts with step 222, in which processor 26 checks if a host command has been received from host computer 12 over bus 24. Host commands are high-level commands that command changes in forces to the user object, as described with reference to step 214. If a host command has been received, the process continues to step 224, where a "force routine" indicated by or associated with the host command is selected if appropriate. A "force routine", as referred to herein, is a set of steps or instructions for microprocessor 26 to provide low-level force commands to actuators 30. These "low-level" force commands (or "processor force commands") are to be distinguished from the "high-level" host commands issued from the host computer 12. A low level force command instructs an actuator to output a force of a particular magnitude. For example, the low level command typically includes a "force value" or magnitude e.g., equivalent signal(s) to instruct the actuator to apply a force of a desired magnitude value. Low level force commands may also designate a direction of force if an actuator can apply force in a selected direction, and/or other low-level information as required by an actuator.

Force routines determine low level force commands from other parameters, such as sensor data read in step 218 (button press data, position data, etc.) and timing data from clock 18. The force routines can be stored local to microprocessor 26 in, for example, memory 27 such as RAM or ROM (or EPROM, EEPROM, etc.). Thus, the microprocessor might select a particular damping force routine if the host command indicated that the damping force from that particular damping process should be applied to object 34. Other damping force routines might also be available. The available force routines are described in greater detail below and may include algorithms, stored force profiles or values, conditions, etc. Also, the host command received from the host in step 222 may in some instances simply be a low-level force command, or even a single force value, that is to be sent to an actuator 30, in which case a force routine need not be selected.

After a force routine has been selected in step 224, or if a new host command has not been received in step 222, then step 226 is implemented, in which processor 26 determines a processor low-level force command. The low-level force command is derived from either a selected force routine, a resident force routine, any other data required by the force routine, and/or command parameters and/or values included in relevant host commands. As explained above, the required data can include sensor data and/or timing data from local clock 29. If no new high level command was received in step 222, then the microprocessor 26 can determine a force command according to one or more "resident" force routines, i.e., the same force routines that it selected and used in previous iterations of step 226. This is the "reflex" process operation of the interface device that does not require any new input from host computer 12.

In the described embodiment, force routines can include several different types of steps and/or instructions which are followed to determine a low-level force command. One type of instruction in a force routine is a force algorithm, which includes an equation that host computer 12 can use to calculate or model a force value based on sensor and timing data. Several types of algorithms can be used. For example, algorithms in which force varies linearly (or nonlinearly) with the position of object 34 can be used to provide a simulated force like a spring. Algorithms in which force varies linearly (or nonlinearly) with the velocity of object 34 can be also used to provide a simulated damping force or other forces on user object 34. Algorithms in which force varies linearly (or nonlinearly) with the acceleration of object 34 can also be used to provide, for example, a simulated inertial force on a mass (for linear variation) or a simulated gravitational pull (for nonlinear variation). Several types of simulated forces and the algorithms used to calculate such forces are described in "Perceptual Design of a Virtual Rigid Surface Contact," by Louis B. Rosenberg, Center for Design Research, Stanford University, Report number AL/CF-TR-1995-0029, April 1993, which is incorporated by reference herein.

For example, a kinematic equation which calculates a force value based on the velocity of the user object multiplied by a damping constant can be used to determine a damping force on the user object. This type of equation can simulate motion of object 34 along one degree of freedom through a fluid or similar material. A procedure for calculating a damping force on object 34 is described in co-pending patent application Ser. No. 08/400,233, filed Mar. 3, 1995, entitled "Method and Apparatus for Providing Passive Force Feedback", which is incorporated by reference herein. For example, a damping constant can first be selected which indicates the degree of resistance that object 34 experiences when moving through a simulated material, such as a liquid, where a greater number indicates greater resistance. Water would have a lower damping constant than oil or syrup. The microprocessor 26 recalls the previous position of user object 34 (along a particular degree of freedom) from memory 27, examines the current position of the user object, and calculates the difference in position. From the sign (negative or positive) of the difference, the direction of the movement of object 34 can also be determined. The force value is then set equal to the damping constant multiplied by the change in position. Low-level commands that control an actuator based on this algorithm produce a force proportional to the user object's motion to simulate movement through a fluid. Movement in other mediums, such as on a bumpy surface, on an inclined plane, etc., can be simulated in a similar fashion using different methods of calculating the low-level force commands.

The determination of low-level commands from force routines can also be influenced by timing data accessed from system clock 18. For example, in the damping force example described above, the velocity of the user object 34 is determined by calculating the different of positions of the user object and multiplying by the damping constant. This calculation assumes a fixed time interval between data points, i.e., it is assumed that the position data of the object 34 is received by host computer 12 in regular, predetermined time intervals. However, this may not actually occur due to different processing speeds of different computer platforms or due to processing variations on a single host microprocessor 16, such as due to multitasking. Therefore, in the present invention, the host computer preferably accesses clock 12 to determine how much time has actually elapsed since the last position data was received. In the damping force example, the host computer could take the difference in position and divide it by a time measure to account for differences in timing. The host computer can thus use the clock's timing data in the modulation of forces and force sensations to the user. Timing data can be used in other algorithms and force sensation processes of the present invention to provide repeatable and consistent force feedback regardless of type of platform or available processing time on host computer 12.

The velocity and acceleration required for particular force routines can be provided in a number of different ways. The sensor data provided by steps 218–221 can include position data, velocity data, and/or acceleration data. For example, the microprocessor can use the velocity and acceleration data directly in an algorithm to calculate a low-level force command. In an alternate embodiment, only position data might be received from sensors 28, and the microprocessor can calculate the velocity and/or acceleration values using stored histories of values. The microprocessor only calculates the velocity and/or acceleration values when the values are needed by a force routine. Alternatively, the processor can always calculate the velocity and acceleration values regardless of whether the values are used in a force routine.

Other instructions can also be included in a force routine. For example, conditional steps can be included to provide forces under specified circumstances. For example, a force routine might instruct the processor 26 to output a low-level force command only when the user object is moved to a particular position in provided degrees of freedom. Or, to simulate a virtual obstruction such as a wall, forces should be applied in only one direction (uni-directional). For many passive actuators, only bi-directional resistance forces can be applied. To simulate uni-directional resistance using a passive actuator, conditional instructions can be included in a virtual obstruction force routine to output a low-level force command only when the user object is moved in a particular direction at a particular position. Also, a "null" force routine can be available that instructs microprocessor 26 to issue low-level commands to provide zero force (i.e. remove all forces) on user object 34.

Another type of force routine does not use algorithms to model a force, but instead uses force values that have been previously calculated or sampled and stored as a digitized "force profile" in memory or other storage device. These force values may have been previously generated using an equation or algorithm as described above, or provided by sampling and digitizing forces. For example, to provide a particular force sensation to the user, host computer 12 can be instructed by the steps of a force routine to retrieve successive force values of a force profile from a certain storage device, such as memory 27, RAM, hard disk, etc. These force values can be included in low-level commands sent directly to an actuator to provide particular forces without requiring host computer 12 to calculate the force values. In addition, previously-stored force values can be output with respect to other parameters to provide different types of forces and force sensations from one set of stored force values. For example, using system clock 18, one set of stored force values can be output in sequence according to different time intervals that can vary depending on the desired force, thus producing different types of forces on the user. Or, different retrieved force values can be output depending on the current position, velocity, etc. of user object 34.

The low level force command determined in step 226 can also depend on instructions that check for other parameters. These instructions can be included within or external to the above-described force routines. One such parameter can includes values provided by the implemented host application program. The application program may determine that a particular low-level force command should be output or force routine selected based on events occurring within the application program or other instructions. Host commands can be provided by the host application program to output forces independently of sensor data. Also, in a host command, the host can provide its own particular position, velocity, and/or acceleration data to a designated force routine to calculate or provide a force that is not based on the manipulation of user object 34, but is provided to simulate an event in the application program. Such events may include collision events, such as occur when a user-controlled computer image impacts a virtual surface or structure. Also, other input devices connected to host computer 12 can influence events and, therefore, the forces applied to user object 34. For example, the sensor data from multiple interface devices 14 connected to a single host computer can influence the forces felt on other connected interface devices by influencing events and computer-controlled images/objects of the host application program.

Also, the low-level force commands determined in step 226 can be based on other inputs to host computer 12, such as activations of buttons or other input devices in (or external to) interface device 14. For example, a particular force routine might instruct the microprocessor to output a force to a joystick whenever a user presses a button on the joystick. In some embodiments, steps 218, 220, and 221 for reading sensor data can be incorporated in one or more force routines for the microprocessor, so that sensor data is only read once a force routine has been selected and executed. In addition, the host command can include other command parameter information needed to determine a low-level force command. For example, the host command can indicate the direction of a force along a degree of freedom.

Microprocessor 26 can determine a low-level force command in step 226 according to a newly-selected force routine, or to a previously selected force routine. For example, if this is a second or later iteration of step 226, the same force routine as in the previous iteration can be again implemented if a new host command has not been received. This is, in fact, the advantage of an independent reflex process: the microprocessor 26 can continually output forces on user object 34 using sensor data and timing data according to force routines, independently of any commands from the host. Thus, a "virtual wall" force routine would allow the microprocessor to command forces simulating the wall whenever the user's joystick was moved in the appropriate position or direction. The host computer need only command that the virtual wall exists and provide the location of the wall, and the microprocessor 26 will independently implement the wall and the required forces when necessary.

The above-described force routines and other parameters can be used to provide a variety of haptic sensations to the user through the user object 34 to simulate many different types of tactile events. For example, typical haptic sensations may include a virtual damping (described above), a virtual obstruction, and a virtual texture. Virtual obstructions are provided to simulate walls, obstructions, and other uni-directional forces in a simulation, game, etc. When a user moves a computer image into a virtual obstruction with a joystick, the user then feels a physical resistance as he or she continues to move the joystick in that direction. If the user moves the object away from the obstruction, the uni-directional force is removed. Thus the user is given a convincing sensation that the virtual obstruction displayed on the screen has physical properties. Similarly, virtual textures can be used to simulate a surface condition or similar texture. For example, as the user moves a joystick or other user object along an axis, the host computer sends a rapid sequence of commands to repetitively 1) apply resistance along that axis, and 2) to then immediately apply no resistance along that axis, e.g., as according to a force routine. This frequency is based upon the travel of the joystick handle and is thus correlated with spatial position. Thus, the user feels a physical sensation of texture, which can be described as the feeling of dragging a stick over a grating.

In step 228, processor 26 outputs the determined processor force command to actuators 30 to set the output force to the desired level. Before sending out the low-level force command, processor 26 can optionally convert the low-level force command to an appropriate form usable by actuator 30, and/or actuator interface 38 can perform such conversion. The process then returns to step 222 to check if another host command has been received from the host computer 12.

The reflex process of microprocessor 26 (steps 218, 220, 222, 224, 226, and 228) thus operates to provide forces on object 34 independently of host computer 12 according to a selected force routine and other parameters. The force routine instructs how the processor force command is to be determined based on the most recent sensor data read by microprocessor 26. Since a reflex process independently outputs forces depending on the local control events of interface device 14, the host computer is freed to process the host application and determine only when a new type of force needs to be output. This greatly improves communication rates between host computer 12 and interface device 14.

In addition, the host computer 12 preferably has the ability to override the reflex operation of microprocessor 26 and directly provide force values or low level commands. For example, the host command can simply indicate a force value to be sent to an actuator 30. This override mode can also be implemented as a force routine. For example, the microprocessor 26 can select a force routine from memory that instructs it to relay low-level force commands received from host computer 12 to an actuator 30.

Another advantage of the reflex embodiment of FIG. 7, as well as the hardware embodiments of FIGS. 2, 3, 4a–f, and 5, is that the low communication needs between the host computer and the interface device allows force feedback to be easily implemented over computer networks. For example, host computer 12 can be connected to the Internet and the World Wide Web networks as is well known to those skilled in the art. A "web page" or other network site or node can store force feedback information for a user to download and implement using interface device 14. For example, a web page might store a sequence of force values so that the user can interact with a game or simulation implemented on the web page. The host computer 12 can receive the force commands or other force information over the network using, for example, a web browser or software utility such as Netscape from Netscape Communications. As the force information is received by the host, the host can transmit the force information to the microprocessor 26 to control the actuators as described above. Since only high level force commands are needed in the reflex embodiment, the web page need store only a small amount of information to be downloaded to the host computer rather than all the actual force values necessary to control actuators. A high level command protocol allows more realistic force feedback interaction over a global network.

In other embodiments, a "host-controlled" method can be used, in which host computer system 12 provides direct, low-level force commands to microprocessor 26, and the microprocessor directly provides these force commands to actuators 30 to control forces output by the actuators. Such an embodiment is described in greater detail in co-pending patent application Ser. No. 08/534,791 and Ser. No. 08/566,282, both incorporated by reference herein. However, this type of embodiment is not a reflex embodiment since forces output on user object 34 are dependent on active and continuous control from the host computer, which increases the computational burden on the host.

The control process for a host controlled embodiment would be similar to the process of FIG. 7, except the host computer 12 would determine all forces to be output on user object 34. Sensor data is received by the host computer from local microprocessor 26. Processor 26 continually receives signals from sensors 28, processes the raw data, and sends processed sensor data to host computer 12. Alternatively, the processor 26 can provide raw position data and other input data to host computer 12, and the host computer 12 filters and computes velocity and acceleration from the raw position data. In other embodiments, the filtering can be performed on host computer 12 while the other processing can be performed on the processor 26.

In the host-controlled embodiment, the host computer determines the low-level force commands to provide force feedback to the user manipulating object 34. Preferably, force routines are used by the host which are provided local to the host and which are similar to the force routines used by microprocessor 26 as described above. The host computer checks the sensor data to determine if a change in low-level force applied to user object 34 is required. For example, if the user is controlling a simulated race car in a video game, the position of a joystick determines if the race car is moving into a wall and thus if a collision force should be generated on the joystick.

When a change in force is required, host computer 12 outputs appropriate low-level force commands to microprocessor 26 over bus 24. These low-level force commands may include one or more force values and/or directions that were determined in accordance with the parameters described above. The force command can be output as an actual force signal that is merely relayed to an actuator 30 by microprocessor 26; or, the force command can be converted to an appropriate form by microprocessor 26 before being sent to actuator 30. In addition, the low-level force command preferably includes information indicating to microprocessor 26 which actuators are to receive this force value. The host application program is then processed/updated. If no change of force is required, host computer 12 need not issue another command, since microprocessor 26 can continue to output the previous low-level force command to actuators 30. Alternatively, host computer 12 can continuously output low-level commands, even if no change of force is required.

Figure 8:
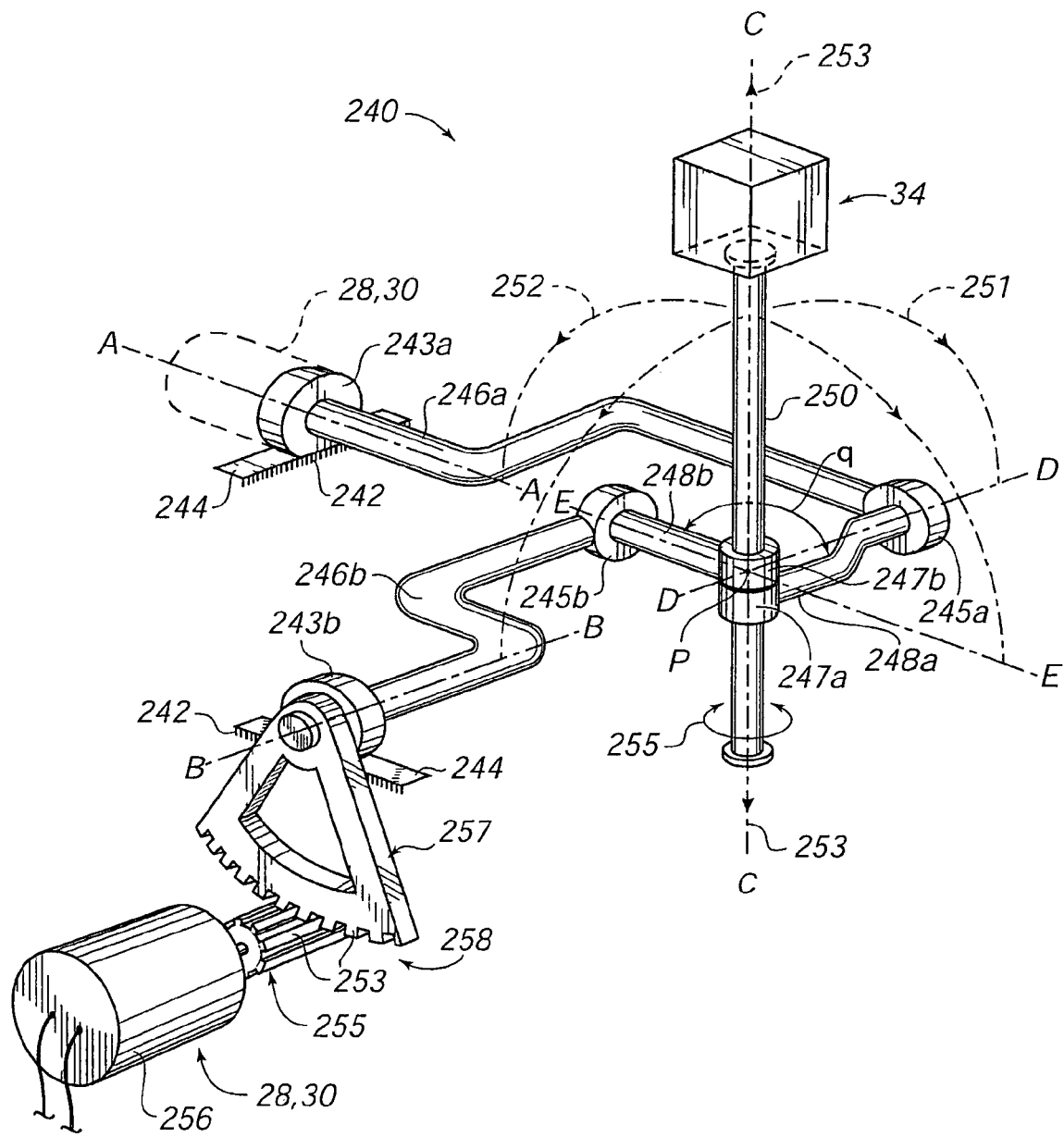
FIG. 8 is a schematic diagram of a five bar linkage mechanism for providing multiple degrees of freedom to the user object of the interface device.

FIG. 8 is a schematic diagram of an example of a user object 34 that is coupled to a gimbal mechanism 240 for providing two or more rotary degrees of freedom to object 34. Gimbal mechanism 240 can be coupled to interface device 14 or be provided with sensors 28 and actuators 30 separately from the other components of interface device 14. Implementation of gimbal mechanism 240 and other types of gimbal mechanisms suitable for use with the present invention, are described in greater detail in co-pending patent application Ser. No. 08/374,288 filed on Jan. 18, 1995; Ser. No. 08/400,233 filed on Mar. 3, 1995; Ser. No. 08/560,091 filed on Nov. 17, 1995; Ser. No. 08/489,068 filed on Jun. 9, 1995; Ser. No. 08/275,120 filed on Jul. 14, 1994; and Ser. No. 08/344,148 filed on Nov. 23, 1994, all of which are hereby incorporated by reference herein.

Gimbal mechanism 38, in the described embodiment, provides support for apparatus 25 on a grounded surface 56 (schematically shown as part of member 46). Gimbal mechanism 38 is preferably a five-member linkage that includes a ground member 46, extension members 48a and 48b, and central members 50a and 50b. Ground member 46 is preferably coupled to a base or surface which provides stability for apparatus 25.

Gimbal mechanism 240 can be supported by a grounded surface 242, which can be, for example, a surface of the housing of interface device 14 (schematically shown as part of member 244), a base, tabletop, or other surface that is fixed in position with reference to the user. Gimbal mechanism 240 is preferably a five-member linkage that includes a ground member 244, extension members 246a and 246b, and central members 248a and 248b. Ground member 244 is coupled to ground surface 242 which provides stability for mechanism 240. Ground member 244 is shown in FIG. 8 as two separate members coupled together through grounded surface 242, but is considered one "member" of the five member linkage.

The members of gimbal mechanism 240 are rotatably coupled to one another through the use of bearings or pivots, wherein extension member 246a is rotatably coupled to ground member 244 by bearing 243a and can rotate about an axis A, central member 248a is rotatably coupled to extension member 246a by bearing 245a and can rotate about a floating axis D, extension member 246b is rotatably coupled to ground member 244 by bearing 243b and can rotate about axis B, central member 248b is rotatably coupled to extension member 246b by bearing 245b and can rotate about floating axis E, and central member 248a is rotatably coupled to central member 248b by bearing 247 at a center point P at the intersection of axes D and E. Preferably, central member 248a is coupled to one rotatable portion 247a of bearing 47, and central member 248b is coupled to the other rotatable portion 247b of bearing 247. The axes D and E are "floating" in the sense that they are not fixed in one position as are axes A and B. Axes A and B are substantially mutually perpendicular. As used herein, "substantially perpendicular" will mean that two objects or axis are exactly or almost perpendicular, i.e. at least within five degrees or ten degrees of perpendicular, or more preferably within less than one degree of perpendicular.

Gimbal mechanism 240 is formed as a five member closed chain or loop, such that a first member of the chain is coupled to the last member in the chain. Each end of one member is coupled to the end of another member. The five-member linkage is arranged such that extension member 246a, central member 248a, and central member 248b can be rotated about axis A in a first degree of freedom. The linkage is also arranged such that extension member 246b, central member 248b, and central member 248a can be rotated about axis B in a second degree of freedom. When object 34 is positioned at the "origin" as shown in FIG. 3, an angle θ between the central members 248a and 248b is about 90 degrees. When object 34 is rotated about one or both axes A and B, central members move in two fashions: rotation about axis D or E by bearing 245b and/or 245a, and rotation about axis C by bearing 247 such that angle θ changes. For example, if the object 34 is moved into the page of FIG. 3 away from the viewer, or out of the plane of the page toward the viewer, then the angle θ will decrease. If the object is moved to the left or right as shown in FIG. 3, the angle θ will increase.

Linear axis member 250 is preferably an elongated rod-like member which is coupled to central member 248a and central member 248b at the point of intersection P of axes A and B. Linear axis member 250 can be used as a shaft of user object 34, or, in other embodiments, linear axis member 250 can be coupled to a different object. Linear axis member 250 is coupled to gimbal mechanism 240 such that it extends out of the plane defined by axis D and axis E. Linear axis member 250 can be rotated about axis A (and E) by rotating extension member 246a, central member 248a, and central member 248b in a first revolute degree of freedom, shown as arrow line 251. Member 250 can also be rotated about axis B (and D) by rotating extension member 250b and the two central members about axis B in a second revolute degree of freedom, shown by arrow line 252. Linear axis member can also be translatably coupled to the ends of central members 248a and 248b, and thus can be linearly moved, independently with respect to the gimbal mechanism 240, along floating axis C, providing a third degree of freedom as shown by arrows 253. Axis C can, of course, be rotated about one or both axes A and B as member 250 is rotated about these axes. In addition, linear axis member 250 in some embodiments can rotated about axis C, as indicated by arrow 255, to provide an additional degree of freedom. These additional degrees of freedom can also be associated with additional sensors and actuators to allow processor 26/host computer 12 to read the position/motion of object 34 and apply forces in those degrees of freedom.

Also preferably coupled to gimbal mechanism 240 and/or linear axis member 250 are transducers, such as the sensors 28 and actuators 30 of FIG. 2. Such transducers are preferably coupled at the link or bearing points between members of the apparatus and provide input to and output from microprocessor 26 and/or host computer system 12. For example, a sensors/actuator transducer 256 can be coupled to extension member 246b by a gear drive 258. Gear drive 258 can include a drive wheel 255 and a rotatable cam 257 that interlock using gear teeth 253. Cam 257 is rigidly coupled to extension member 246b and is rotatable with the member 246b with respect to ground 242. Drive wheel is rigidly coupled to a rotating shaft of transducer 256 such that transducer 256 can rotate drive wheel 255, cam 257, and member 246b to output forces on user object 34 about axis B/D. Likewise, transducer 256 can sense rotation about axis B/ID when member 246b, cam 257, and drive wheel 255 rotate. A similar gear drive system can be provided at bearing 243a to sense and actuate movement about axis A/E. In alternate embodiments, different drive systems and transducers, sensors, and actuators can be used, as described above with reference to FIG. 2 and in copending patent application Ser. No. 08/560,091. For example, a capstan drive or friction drive can be provided, and actuators and sensors can be provided for rotary or linear degrees of freedom of user object 34.

User object 34 is coupled to mechanism 240 and is preferably an interface object for a user to grasp or otherwise manipulate in three dimensional (3D) space. User object 34 may be moved in both (or all three or four) degrees of freedom provided by gimbal mechanism 240 and linear axis member 250. As object 34 is moved about axis A, floating axis D varies its position, and as object 34 is moved about axis B, floating axis E varies its position.

The preferred embodiment for gimbal mechanism 240 is for a joystick user object that can be moved in two rotary degrees of freedom about axes A/E and B/D. For example, linear axis member 250 can be replaced by a joystick handle that is rigidly coupled to central member 248b. Another preferred embodiment includes a third degree of freedom in which the joystick handle can rotate or "spin" about axis C. These embodiments are most appropriate for video games and certain virtual reality type applications such as controlling a vehicle, first person point of view, etc. Other embodiments include medical simulation and operation, for which the four degrees of freedom described above are more appropriate.

FIG. 9 is a schematic diagram of circuit 260 for a touch plate safety switch 262 of the present invention. Like the optical and contact safety switches described with reference to FIG. 2, the touch plate safety switch is designed to be contacted by a user while the interface device is in use. When the user does not contact the safety switch, the actuators 30 of the interface device are deactivated and pose no hazard to the user.

Touch plate safety switch 262 is designed so that the user does not have to press a button or otherwise actively control a switch, which can be awkward and tiresome during operation of the joystick or other user object 34. Two touch plates 264 are provided on the exterior of the interface device 14, preferably in a position which is naturally underneath the grip of a user who is grasping the user object 34. For example, the two plates can be provided on a joystick handle, as shown in FIG. 9a, near the midsection of the handle where users typically contact it. Or, the contacts might be additionally or alternately provided on the top portion of the joystick 34.

Touch plates 264 are preferably made of a metal or other conductive material. When the user touches both plates with skin, a circuit is closed through the user, providing a deadman signal to the microprocessor, host computer, and/or actuators 30 that the safety switch is closed and that the actuators can be enabled. Then the user does not contact both plates 264, no current can flow and the safety switch is open, disabling the actuators 30 from functioning.

Touch plate 264a is coupled to a circuit 266 which outputs a "deadman" signal 270 as a high (5 V) signal when the user contacts both plates. Circuit 266 includes two capacitors, three resistors, 4 inverters, and a diode. Touch plate 26b is coupled to a circuit 268 which allows the current to flow to ground. Circuit 268 includes three resistors, two capacitors, and two inverters. The function and implementation of these components are well known to those skilled in the art. Other equivalent circuits can also be used to perform substantially the same functions, and are well known to those skilled in the art.

Figure 10:
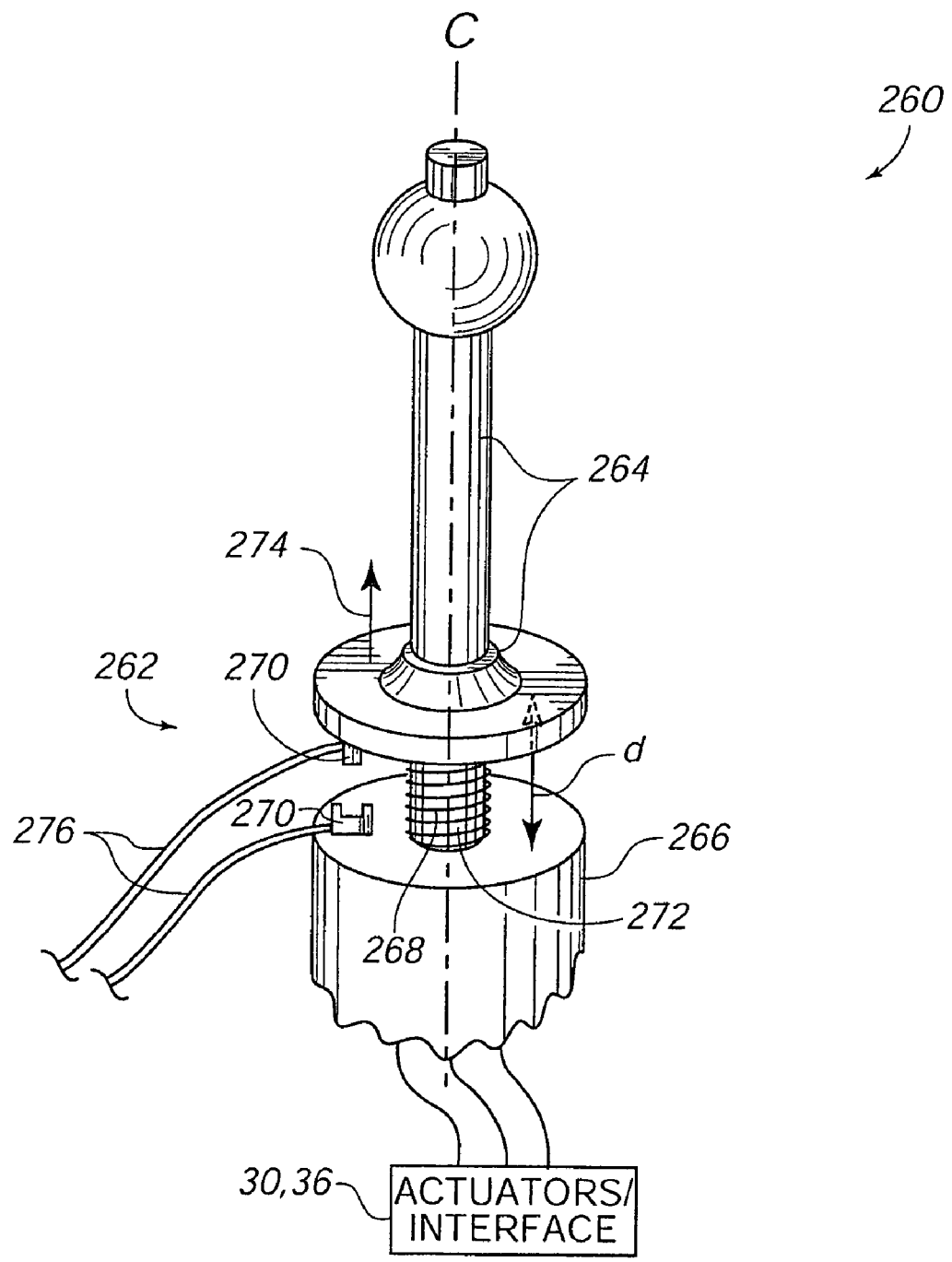
FIG. 10 is a diagrammatic illustration of a hand weight safety switch of the present invention.

FIG. 10 is a diagrammatic illustration of a joystick 280 including a hand-weight safety switch of the present invention. The safety switch 41, as described in FIGS. 2 and 9, is included in joystick 260 so that the user must activate the switch before actuators 30 are able to output forces. This is a safety feature that prevents the user object from unexpectedly moving and impacting the user when the user is not controlling the user object. Safety switches such as contact switches, light detectors, and other types of switches were described above which the user contacts or covers during operation of the joystick and are located on the user object or housing of the interface device 14. This can be awkward during operation of the stick since the user must constantly contact or cover a specific area of the user object or device housing.

Joystick 260 includes a hand-weight safety switch 262 which can be used to replace or supplement safety switch 41 and is more convenient for the user. Joystick 260 includes a translatable handle 264, a base 266, a spring 268, and switch contacts 270. Handle 264 is a standard joystick handle, but can also be replaced with other user objects 34 as described above. Handle 264 can be moved along axis C within a range distance d of the base 266 preferably on an extension member 272 or other similar guide. Distance d is preferably relatively small, such as 1 millimeter, and is exaggerated in FIG. 8 for clarity. Pre-loaded spring 268 preferably forces the handle 264 up away from base 266 in a direction indicated by arrow 274 to an "open" position when no weight is placed on handle 264. Preferably, a stop (not shown) coupled to the top of member 272 or to the bottom of handle 264 prevents the handle from being detached from the base 266. A similar limit to movement of handle 264 in the direction of base 266 is provided by the physical engagement of the handle and base.

Switch contacts 270 are provided between the base 266 and handle 264 of joystick 260. Contacts 270 are connected by lines 276 to microprocessor 26, which can monitor when the contacts are touching. When the handle 264 is in the open position, contacts 270 are separated and no electrical current can flow between them, and thus no electrical current or power can flow to the motors from the power supply. Alternatively, contacts 270 can be connected to microprocessor 26 or another selecting component which can detect the open state of the contacts and can deactivate actuators 30 with a safety disable signal when the open state is detected. The actuators 30 are thus prevented from outputting forces when the user does not have control of the joystick handle 264 and the interface device 14.

When a user grasps handle 264, the weight of the user's hand forces the handle 264 down to engage the base 266. Switch contacts 270 connect from this engagement and allow current to flow between them. Since the contacts 270 complete the circuit from the actuators to the power supply, power is thus allowed to flow from the power supply to the actuators. Alternatively, microprocessor 26 detects the closed contact condition and discontinues sending a safety disable signal to actuators 30. This allows the actuators 30 to be controlled and activated by host computer 12 and microprocessor 26 normally. When the user releases the handle 264 from his or her grasp, the spring 268 forces the handle 264 away from base 266, which separates contacts 270 and deactivates the actuators 30.

The hand-weight safety switch has several advantages over other types of safety switches. The user can simply grasp or hold the handle in a normal, comfortable fashion and still activate the safety switch due to the weight of the user's hand. Thus, the user need not cover or press an awkwardly-located switch in a particular location of the handle or housing. Another advantage is concerned with the transportability of the interface device 14. The use of smaller power supplies, especially with respect to the features of the power circuit of FIG. 6 of the present invention and the use of interface device 14 for home applications, results in a more lightweight interface device. Thus, users can pick up the interface device easily and move it to desired locations. A natural way for a user to pick up a joystick is to hold and pull on the handle 264. A standard force feedback joystick may present some danger to a user when picked up by the handle, since the actuators 30 will cause the base of the joystick to move and flail about. When using the hand-weight safety switch 262 of the present invention, this danger does not exist: the actuators are activated only if the user provides weight on the handle, and the pulling and carrying of the handle will not provide this weight and will not activate the actuators.

FIG. 11 is a diagrammatic illustration of a break-away joystick 280 of the present invention. Since forces are exerted on the user object 34 and the user from actuators 30, there is a potential for too strong a force to be output and to injure a user. As a safety measure, a break-away joystick 280 or other break-away user object 34 can be implemented. Break-away joystick 280 includes a handle 282, a base 284, and a securing device 286. In normal operation, handle 282 is secured to base 284 through securing device 286. Securing device 286 can be, for example, magnets that hold the base and handle together by magnetic fields. Oppositely-polarized magnets can be provided in the contacting portions of the base and handle. The magnets can be particularly chosen to provide a predetermined attachment strength. A user applies force to handle 282 during operation of the interface device, and the actuators 30 apply forces to base 284 to provide force feedback to the user. A total force on the handle and base is thus equal to the sum of the force on the handle from the user and the force in the opposite direction on the base from the actuators. When a total force greater than a predetermined magnitude is applied to the break-away joystick, then the handle detaches from the base. In other embodiments, other securing devices or materials can be used, such as velcro, mechanical or electromechanical fastening devices, etc.

FIGS. 11*a*–11*c* show the break-away joystick in operation. In FIG. 11*a*, a user grasps handle 282 and forces the handle in direction of arrow 290. At the same time, an actuator 30 provides force in a direction of arrow 292 to base 284. Combined, these forces add up to a total force greater than the predetermined force which the securing device can withstand. As shown in FIGS. 11*b* and 11*c*, the handle breaks away from the base in the direction the user was forcing the handle while the base moves in the direction forced by the actuators 30.

In addition, stops may be provided in the degrees of freedom of the joystick to provide limits to the movement of the joystick. The handle may detach if the force from the user on the handle is over the predetermined limit when the base is positioned against a stop such that the stop provides a force in the opposite direction to the user's force.

FIG. 11*d* shows an alternate embodiment 280' of the break-away joystick 280. Joystick 280' includes one or more controls 294 on the handle 282 that are available for the user to manipulate to provide other input 39, such as buttons, switches, or other input devices. Since input signals from control 294 are provided to the microprocessor and/or host computer 12, the signals are routed from the control 294 on the handle through a wire bundle 296. Wire bundle 296 is provided with extra length so that when handle 282 breaks from base 284, the wire bundle will not break. The wire bundle is routed through base 284 through an aperture 298 and is coupled to the microprocessor or is directly routed to host computer 12 as explained in the above described embodiments.

In an alternative embodiment to the embodiment 280' of FIG. 1*d*, wire bundle 296 need not be used. Instead, handle 282 and base 284 can be provided with mating conductive pads that are in contact when the handle 282 is mated with the base 284 and allow button signals to be transmitted to base 284 only when the handle and base are engaged. The handle conductive pad is coupled to the button 294 and the base conductive pad is coupled to a wire that runs to the microprocessor or other control components of the interface device. Signals from button 294 can thus be transmitted through joystick 280 when the handle and base are engaged and the conductive pads are in contact. When the joystick handle 282 breaks away from base 284, the conductive pads are no longer in contact and no signals from button 294 are transmitted to base 284.

While this invention has been described in terms of several preferred embodiments, it is contemplated that alterations, modifications and permutations thereof will become apparent to those skilled in the art upon a reading of the specification and study of the drawings. For example, many different types and standards of communication interfaces can be used with the interface device closed herein. Various signal lines can be used to provide communication between host computer and interface device depending on the desired control that the host computer has over output forces. In addition, many different types of gimbal mechanisms or other mechanisms can be provided to allow movement of the user object in desired degrees of freedom. A variety of different types of actuators, sensors, and other devices, as well as the necessary power supplies, can also be used to sense the position of an object and apply forces to the object along degrees of freedom. The different low-cost and safety embodiments disclosed herein can be combined in multiple configurations for various applications.

Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. An interface apparatus for interfacing motion of a user manipulable object with a host computer and enabling said host computer to track motion of said user manipulable object and to command feedback forces to said user manipulable object, said interface apparatus comprising:
   a user object being physically contacted and manipulable by a user and having at least one degree of freedom of movement with respect to a ground surface;
   a device microprocessor provided local to said interface apparatus and separate from said host computer and being controlled by software instructions stored in a memory device separate from said host computer, said microprocessor being coupled to said host computer by a first interface bus and receiving host commands from said host computer on said first interface bus;
   an actuator coupled to said user object for applying a force along said degree of freedom to said user object, wherein said actuator applies said force in response to microprocessor force commands produced by said device microprocessor;
   a sensor coupled to said user object for detecting a position of said user object along said degree of freedom and for outputting a locative sensor signal which represents said position of said user manipulable object, said locative sensor signal being received by said host computer, wherein said host computer modifies a displayed process in response to said locative sensor signal; and
   a thermal sensor for detecting a temperature of said actuator, said thermal sensor providing a temperature signal to said microprocessor such that said microprocessor can deactivate said actuator when said temperature of said actuator rises above a predetermined threshold.

2. An interface apparatus as recited in claim 1 wherein said first interface bus is a serial interface bus for transmitting and receiving data serially.

3. An interface apparatus as recited in claim 2 wherein said first interface bus is an RS-232 interface bus coupled to an RS-232 interface port of said host computer.

4. An interface apparatus as recited in claim 3 wherein said user object includes a joystick.

5. An interface apparatus as recited in claim 3 wherein said sensor is a first sensor and said locative sensor signal is a first locative sensor signal, and further comprising a second sensor coupled to said device microprocessor, wherein said first sensor outputs said first locative sensor signal to said host computer on said first interface bus, and wherein said second sensor detects said position of said joystick along said degree of freedom independently of said first sensor and outputs a second locative sensor signal to said microprocessor.

6. An interface apparatus as recited in claim 5 further comprising a button device coupled to said interface apparatus, said button device providing a button input signal to said microprocessor when said user activates said button, said microprocessor providing said button input signal to said host computer using said game port interface bus.

7. An interface apparatus as recited in claim 6 wherein said microprocessor, said first sensor, said second sensor, and said button are powered by said host computer using a power line of said RS-232 interface bus.

8. A force feedback interface device as recited in claim 2 further comprising a power store circuit coupled to said actuator, said power store circuit storing power from a power source and providing said stored power to said actuator when said actuator applies said force to said user object, said power store circuit including a capacitor that charges to store said power and discharges said stored power for said actuator.

9. An interface apparatus as recited in claim 4 wherein said microprocessor deactivates said actuator when said bus is disconnected from said host computer or disconnected from said interface apparatus.

10. An interface apparatus as recited in claim 4 further comprising a safety switch for said user, wherein said actuator is operative to output said force only when said safety switch is closed.

11. An interface apparatus as recited in claim 10 wherein said safety switch is a hand-weight safety switch coupled to said joystick, said hand weight safety switch being closed by said user when said user applies weight to said joystick by grasping said joystick.

12. An interface apparatus as recited in claim 4 wherein said joystick includes a safety break-away handle that breaks off from said interface apparatus when a force over a predetermined threshold is applied to said joystick.

13. An interface apparatus as recited in claim 12 wherein said safety break-away handle is attached to said interface apparatus by a magnet.

14. An interface apparatus as recited in claim 5 further comprising a local memory device separate from said host computer, said local memory device storing at least one force routine, wherein said microprocessor selects a force routine in accordance with said at least one of said host commands, said force routine determining said microprocessor force commands, at least in part, from said sensor signals of said microprocessor sensors.

15. An interface apparatus as recited in claim 1 wherein said selected force routine retrieves a plurality of digital force values stored in said local memory device and outputs said stored force values to said actuator.

16. An interface apparatus for interfacing motion of a user manipulable object with a host computer and enabling said host computer to track motion of said user manipulable object and to command feedback forces to said user manipulable object, said interface apparatus comprising:
   a user object being physically contacted and manipulable by a user and having at least one degree of freedom of movement with respect to a ground surface;
   a device microprocessor provided local to said interface apparatus and separate from said host computer and being controlled by software instructions stored in a memory device separate from said host computer, said microprocessor being coupled to said host computer by a first interface bus and receiving host commands from said host computer on said first interface bus, said first interface bus being a serial RS-232 interface bus coupled to an RS-232 interface port of said host computer and configured to transmit and receive data serially;
   an actuator coupled to said user object for applying a force along said degree of freedom to said user object, wherein said actuator applies said force in response to microprocessor force commands produced by said device microprocessor; and
   a sensor coupled to said user object for detecting a position of said user object along said degree of freedom and for outputting a locative sensor signal which represents said position of said user manipulable object, said locative sensor signal being received by said host computer, wherein said host computer modifies a displayed process in response to said locative sensor signal,
   wherein said user object includes a joystick that includes a safety break-away handle attached to said interface apparatus by a magnet, the safety break-away handle being configured to breaks off from said interface apparatus when a force over a predetermined threshold is applied to said joystick.

17. An interface apparatus as recited in claim 16 wherein said sensor is a first sensor and said locative sensor signal is a first locative sensor signal, and further comprising a second sensor coupled to said device microprocessor, wherein said first sensor outputs said first locative sensor signal to said host computer on said first interface bus, and wherein said second sensor detects said position of said joystick along said degree of freedom independently of said first sensor and outputs a second locative sensor signal to said microprocessor.

18. An interface apparatus as recited in claim 17 further comprising a button device coupled to said interface apparatus, said button device providing a button input signal to said microprocessor when said user activates said button, said microprocessor providing said button input signal to said host computer using said game port interface bus.

19. An interface apparatus as recited in claim 18 wherein said microprocessor, said first sensor, said second sensor, and said button are powered by said host computer using a power line of said RS-232 interface bus.

20. A force feedback interface device as recited in claim 16 further comprising a power store circuit coupled to said actuator, said power store circuit storing power from a power source and providing said stored power to said actuator when said actuator applies said force to said user object, said power store circuit including a capacitor that charges to store said power and discharges said stored power for said actuator.

21. An interface apparatus as recited in claim 16 further comprising a thermal sensor for detecting a temperature of said actuator, said thermal sensor providing a temperature signal to said microprocessor such that said microprocessor can deactivate said actuator when said temperature of said actuator rises above a predetermined threshold.

22. An interface apparatus as recited in claim 17 wherein said microprocessor deactivates said actuator when said bus is disconnected from said host computer or disconnected from said interface apparatus.

23. An interface apparatus as recited in claim 1 further comprising a safety switch for said user, wherein said actuator is operative to output said force only when said safety switch is closed.

24. An interface apparatus as recited in claim 23 wherein said safety switch is a hand-weight safety switch coupled to said joystick, said hand weight safety switch being closed by said user when said user applies weight to said joystick by grasping said joystick.

25. An interface apparatus as recited in claim 17 further comprising a local memory device separate from said host computer, said local memory device storing at least one force routine, wherein said microprocessor selects a force routine in accordance with said at least one of said host commands, said force routine determining said microprocessor force commands, at least in part, from said sensor signals of said microprocessor sensors.

26. An interface apparatus as recited in claim 16 wherein said selected force routine retrieves a plurality of digital force values stored in said local memory device and outputs said stored force values to said actuator.

* * * * *